(12) United States Patent
Wagner et al.

(10) Patent No.: US 12,031,033 B2
(45) Date of Patent: Jul. 9, 2024

(54) ZWITTERIONIC POLYSILOXANE FOR BIOMEDICAL DEVICES

(71) Applicant: University of Pittsburgh—Of the Commonwealth System of Higher Education, Pittsburgh, PA (US)

(72) Inventors: William R. Wagner, Gibsonia, PA (US); Sang Ho Ye, Cheswick, PA (US); Seungil Kim, Pittsburgh, PA (US); Sung Kwon Cho, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 269 days.

(21) Appl. No.: 17/398,618

(22) Filed: Aug. 10, 2021

(65) Prior Publication Data

US 2022/0049098 A1 Feb. 17, 2022

Related U.S. Application Data

(60) Provisional application No. 63/064,063, filed on Aug. 11, 2020.

(51) Int. Cl.
*C08L 83/04* (2006.01)
*C08G 77/06* (2006.01)
*C08K 5/17* (2006.01)

(52) U.S. Cl.
CPC .............. *C08L 83/04* (2013.01); *C08G 77/06* (2013.01); *C08K 5/17* (2013.01)

(58) Field of Classification Search
CPC ......... C08L 83/04; C08L 83/10; C08G 77/06; C08G 18/61; C08K 5/17
See application file for complete search history.

(56) References Cited

U.S. PATENT DOCUMENTS 6,225,430 B1 5/2001 Fong et al.
6,313,254 B1 11/2001 Meijs et al.
(Continued)

FOREIGN PATENT DOCUMENTS

EP 1405869 A1 4/2004

OTHER PUBLICATIONS

Wagner et al ("A biostable, anti-fouling zwitterionic polyurethane-urea based on PDMS for use in blood-contacting medical devices", J. Mater. Chem. B, Aug. 2020, 8305, published on Jul. 27, 2020). (Year: 2020).*

(Continued)

*Primary Examiner* — Robert S Jones, Jr.
*Assistant Examiner* — Jiangtian Xu
(74) *Attorney, Agent, or Firm* — The Webb Law Firm

(57) ABSTRACT

A zwitterionic polysiloxane polymer (e.g., a polyurethane elastomer) composition having poly(dialkylsiloxane) blocks and a zwitterionic moiety is prepared by the copolymerization of a poly(dialkylsiloxane) diol, a diisocyanate, a tertiary amine alkyl diol, and a poly(dialkylsiloxane) diamine to form a poly(urethane urea) copolymer. A substituted saturated heterocylic compound is reacted with the tertiary amine of the poly(urethane urea) copolymer to introduce a zwitterionic group into the poly(urethane urea) copolymer backbone. A polysiloxane polymer having a zwitterionic moiety is prepared by reacting a diallyl tertiary amine compound and a substituted saturated heterocylic compound to form a diallyl zwitterionic macromer and cross-linking a vinyl terminated poly(dialkylsiloxane) and the diallyl zwitterionic macromer with a curing agent to introduce a zwitterionic group into the poly(dialkylsiloxane) polymer.

4 Claims, 23 Drawing Sheets

(56) References Cited

U.S. PATENT DOCUMENTS

| | | |
|---|---|---|
| 7,022,135 B2 | 4/2006 | Zilla et al. |
| 8,629,210 B2 | 1/2014 | Webster et al. |
| 2008/0213599 A1 | 9/2008 | Webster et al. |

OTHER PUBLICATIONS

Adipurnama et al., "Surface modification and endothelialization of polyurethane for vascular tissue engineering applications: a review", Biomater. Sci., 2017, pp. 22-37, vol. 5, The Royal Society of Chemistry.

Cheng et al., "The synthesis and characterization of carboxybetaine functionalized polysiloxanes for the preparation of anti-fouling surfaces", RSC Advances, 2014, pp. 1-9, The Royal Society of Chemistry.

Collin, "Chemical Basis of Reactive Oxygen Species Reactivity and Involvement in Neurodegenerative Diseases", International Journal of Molecular Sciences, 2019, pp. 1-17, vol. 20.

Dabaghi et al., "An artificial placenta type microfluidic blood oxygenator with double-sided gas transfer microchannels and its integration as a neonatal lung assist device", Biomicrofluidics, 2018, pp. 1-16, vol. 12a, AIP Publishing.

Eash et al., "Evaluation of plasma resistant hollow fiber membranes for artificial lungs", ASAIO J., 2004, pp. 491-497, vol. 50, American Society of Artificial Internal Organs.

Gökaltun et al., "Simple Surface Modification of Poly(dimethylsiloxane) via Surface Segregating Smart Polymers for Biomicrofluidics", Sci. Rep., 2019, pp. 1-14, vol. 9.

Gu et al., "Biodegradable, elastomeric coatings with controlled anti-poliferative agent release for magnesium-based cardiovascular stents", Colloids and Surfaces B: Biointerfaces, 2016, pp. 170-179, vol. 144, Elsevier B.V.

Ji et al., "Progress in polydimethylsiloxane-modified waterborne polyurethanes", RSC Adv., 2017, pp. 34086-34095, vol. 7, The Royal Society of Chemistry.

Jiang et al., "Amphiphilic Zwitterionic Poly(dimethylsiloxane) (PDMS)-Contained Poly(Ether amine) (Z-SiPEA) as the Responsive Polymeric Dispersant", ACS Applied Materials & Interfaces, 2011, pp. 1749-1756, vol. 3, American Chemical Society.

Jo et al., "Three-Dimensional Micro-Channel Fabrication in Polydimethylsiloxane (PDMS) Elastomer", Journal of Microelectromechanical Systems, 2000, pp. 76-81, vol. 9, IEEE.

Kim et al., "Reversibly pH-responsive polyurethane membranes for on-demand intravaginal drug delivery", Acta Biomater., 2017, pp. 100-112, vol. 47, Elsevier Ltd.

Kim et al., "Smart and Biostable Polyurethanes for Long-Term Implants", ACS Biomater. Sci. Eng., 2018, pp. 1479-1490, vol. 4, American Chemical Society.

Kim et al., "Development and processing of a biostable, anti-fouling zwitterionic polyurethane-urea based on PDMS for blood-contacting applications" [Poster], US-Korea Conference on Science, Oct. 2019.

Leigh et al., "Anti-fouling photograftable zwitterionic coatings on PDMS substrates", Langmuir, 2019, pp. 1100-1110, vol. 35, No. 5.

Merkel et al., "Gas sorption, diffusion, and permeation in poly(dimethylsiloxane)", J. Polym. Sci. Part B: Polym. Phys., 2000, pp. 415-434, vol. 38, John Wiley & Sons, Inc.

Naito et al., "Substrate-bound fibrinogen, fibrin and other cell attachment-promoting proteins as a scaffold for cultured vascular smooth muscle cells", Atherosclerosis, 1992, pp. 227-234, vol. 96, Elsevier Scientific Publishers Ireland, Ltd.

Pashneh-Tala et al., "The Tissue-Engineered Vascular Graft—Past, Present, and Future", Tissue Engineering: Part B, 2016, pp. 68-100, vol. 22, No. 1, Mary Ann Liebert, Inc.

Pasman et al., "Flat and microstructured polymeric membranes in organs-on-chips", J. R. Soc. Interface, 2018., pp. 1-15, vol. 15, The Royal Society.

Rumens et al., "Swelling of PDMS networks in solvent vapours; applications for passive RFID wireless sensors", J. Mater. Chem. C, 2015, pp. 10091-10098, vol. 3, No. 39, The Royal Society of Chemistry.

Singha et al., "A review of the recent advances in antimicrobial coatings for urinary catheters", Acta Biomater., 2017, pp. 20-40, vol. 50.

Sutherland et al., "Degradation of Biomaterials by Phagocyte-derived Oxidants", J. Clin. Invest, 1993, pp. 2360-2367, vol. 92, The American Society for Clinical Investigations, Inc.

Wang et al., "Evaluation of the in vitro cytotoxicity of crosslinked biomaterials", Biomacromolecules, 2013, pp. 1321-1329, vol. 14.

Weisel et al., "Fibrin Formation, Structure and Properties", Subcell. Biochem., 2017, pp. 405-456, vol. 82.

Wu et al., "Lung assist device: development of microfluidic oxygenators for preterm infants with respiratory failure", LabChip, 2013, pp. 2641-2650, vol. 13.

Xuehai et al., "Poly(dimethylsiloxane)-Polyurethane Elastomers: Synthesis and Properties of Segmented Copolymers and Related Zwitterionomers", Journal of Polymer Science-Physics, 1984, pp. 1-39.

Zhang et al., "Anti-fouling Coatings of Poly(dimethylsiloxane) Devices for Biological and Biomedical Applications", J. Med. Biol. Eng., 2015, pp. 143-155, vol. 35.

\* cited by examiner

| | CK (%) | NK (%) | OK (%) | SiK (%) | SK (%) |
|---|---|---|---|---|---|
| 0 to 75 | 37 ±8 | 0 | 17 ±5 | 15 ±4 | 0 |
| 75 to 150 | 47.9 ±0.1 | 0 | 25.4 ±0.3 | 21.8 ±0.2 | 0 |
| 150 to 225 | 43 ±8 | 0 | 22 ±5 | 18 ±4 | 0 |

| | CK (%) | NK (%) | OK (%) | SiK (%) | SK (%) |
|---|---|---|---|---|---|
| 0 to 75 | 41.8 ±0.3 | 7.9 ±0.2 | 25.6 ±0.3 | 24.5 ±0.1 | 0.10 ±0.03 |
| 75 to 150 | 41.6 ±0.3 | 8.2 ±0.1 | 26.1 ±0.9 | 23.9 ±0.5 | 0.10 ±0.03 |
| 150 to 225 | 41.9 ±0.1 | 8.1 ±0.3 | 25.9 ±0.1 | 24.0 ±0.2 | 0.06 ±0.02 |

| | CK (%) | NK (%) | OK (%) | SiK (%) | SK (%) |
|---|---|---|---|---|---|
| 0 to 75 | 41.2 ±0.1 | 7.9 ±0.1 | 25.3 ±0.2 | 25.3 ±0.2 | 0.13 ±0.04 |
| 75 to 150 | 41.2 ±0.2 | 7.66 ±0.05 | 24.5 ±0.2 | 26.62 ±0.04 | 0.10 ±0.03 |
| 150 to 225 | 41.2 ±0.3 | 7.7 ±0.3 | 25.1 ±0.2 | 25.87 ±0.06 | 0.10 ±0.06 |

PDMS-SB-UU coated

ZWITTERIONIC POLYSILOXANE FOR BIOMEDICAL DEVICES

CROSS REFERENCE TO RELATED APPLICATIONS

This application claims the benefit of U.S. Provisional Patent Application No. 63/064,063 filed Aug. 11, 2020, the disclosure of which is incorporated herein by reference in its entirety.

STATEMENT REGARDING FEDERALLY SPONSORED RESEARCH

This invention was made with government support under Grant No. EB023620 awarded by the National Institutes of Health. The government has certain rights in the invention.

The present disclosure is directed to a zwitterionic polysiloxane polymer composition, bodily-fluid contacting devices coated with a zwitterionic polysiloxane polymer composition, and polysiloxane elastomers comprising a zwitterionic moiety.

Polydimethylsiloxanes (PDMS) are polymeric organosilicon compounds with unique properties such as low glass transition temperatures and low surface energies. Cured PDMS films exhibit high gas permeability, a highly hydrophobic surface, and very good stability to heat and oxidative stress. These properties are explained by a structure composed of inorganic Si—O bonds and an organic grafted methyl group. PDMS has been widely used in the fabrication of medical devices such as implantable components and microfluidic systems primarily due to its low cytotoxicity, stability, and elastomeric characteristics. Nevertheless, PDMS compositions suffer from nonspecific adsorption of proteins and platelet deposition from blood.

Surface modification strategies have been studied as a means to improve the hemocompatibility of PDMS-based materials (See, e.g., Zhang, H. et al. Anti-fouling Coatings of Poly(dimethylsiloxane) Devices for Biological and Biomedical Applications. *J. Med. Biol. Eng.*, 2015, 35:143-155). These studies have shown improved blood-compatibility via covalently or non-covalently immobilized moieties that increase hydrophilicity or interact with specific proteins. However, most surface modification procedures are complex and require several steps, including oxidation of PDMS (See, e.g., Gökaltun, A. et al., Simple Surface Modification of Poly(dimethylsiloxane) via Surface Segregating Smart Polymers for Biomicrofluidics. *Sci. Rep.*, 2019, 9, 1-14).

As such, easily-made, and effective polysiloxane polymers, such as polymer compositions comprising PDMS blocks, are desired.

SUMMARY

A method of preparing a polysiloxane composition comprising a zwitterionic moiety is provided; the method comprising:
mixing a vinyl-terminated poly(dialkylsiloxane) and a diallyl zwitterionic monomer with a curing agent and curing the mixture to introduce a zwitterionic group into the poly(dialkylsiloxane), or
mixing a vinyl-terminated poly(dialkylsiloxane) and a diallyl tertiary amine compound with a curing agent; curing the mixture to form a cross-linked tertiary amine-modified poly(dialkylsiloxane); and reacting the cross-linked tertiary amine-modified poly(dialkylsiloxane) with a substituted saturated heterocylic compound to introduce a zwitterionic group into the cross-linked tertiary amine-modified poly(dialkylsiloxane).

A crosslinked copolymer composition is provided, comprising:
a poly(dialkylsiloxane) residue;
an N-dialkyl monomer residue comprising a zwitterion moiety comprising a quaternary amine and an anionic moiety pendant from the quaternary amine. A body fluid-contacting device coated with the crosslinked copolymer composition also is provided.

A method of preparing a coated bodily fluid-contacting device is provided, comprising:
coating one or more surfaces of a device comprising one or more surfaces, with a zwitterionic polymer composition, the zwitterionic polymer composition comprising poly(dialkylsiloxane) blocks and a zwitterionic moiety, wherein the polymer is prepared by:
copolymerization of a poly(dialkylsiloxane) diol, a diisocyanate, a tertiary amine alkyl diol, and a poly(dialkylsiloxane) diamine to form a poly(urethane urea) copolymer; and reacting the poly(urethane urea) copolymer with a substituted saturated heterocyclic compound with the tertiary amine of the poly(urethane urea) copolymer to introduce a zwitterionic group into the poly(urethane urea) copolymer backbone; or
mixing a vinyl-terminated poly(dialkylsiloxane) and a diallyl zwitterionic monomer with a curing agent and curing the mixture to introduce a zwitterionic group into the poly(dialkylsiloxane); or
mixing a vinyl-terminated poly(dialkylsiloxane) and a diallyl tertiary amine compound with a curing agent; curing the mixture to form a cross-linked tertiary amine-modified poly(dialkylsiloxane); and reacting the cross-linked tertiary amine-modified poly(dialkylsiloxane) with a substituted saturated heterocylic compound to introduce a zwitterionic group into the cross-linked tertiary amine-modified poly(dialkylsiloxane).

The following numbered clauses describe various aspects, embodiments, or examples of the present invention.

Clause 1. A method of preparing a polysiloxane composition comprising a zwitterionic moiety, the method comprising:
mixing a vinyl-terminated poly(dialkylsiloxane) and a diallyl zwitterionic monomer with a curing agent and curing the mixture to introduce a zwitterionic group into the poly(dialkylsiloxane), or
mixing a vinyl-terminated poly(dialkylsiloxane) and a diallyl tertiary amine compound with a curing agent; curing the mixture to form a cross-linked tertiary amine-modified poly(dialkylsiloxane); and reacting the cross-linked tertiary amine-modified poly(dialkylsiloxane) with a substituted saturated heterocylic compound to introduce a zwitterionic group into the cross-linked tertiary amine-modified poly(dialkylsiloxane).

Clause 2. The method of clause 1, comprising mixing a vinyl-terminated poly(dialkylsiloxane) and a diallyl zwitterionic monomer with a curing agent and curing the mixture to introduce a zwitterionic group into the poly(dialkylsiloxane).

Clause 3. The method of clause 2, further comprising reacting a diallyl tertiary amine compound with a substituted saturated heterocylic compound to produce the diallyl zwitterionic monomer.

Clause 4. The method of clause 1, comprising:
mixing a vinyl-terminated poly(dialkylsiloxane) and a diallyl tertiary amine with a curing agent;

curing the mixture to form a cross-linked tertiary amine modified poly(dialkylsiloxane); and reacting the cross-linked tertiary amine modified poly(dialkylsiloxane) with a substituted saturated heterocylic compound to introduce a zwitterionic group into the cross-linked tertiary amine-modified poly(dialkylsiloxane).

Clause 5. The method of clause 4, wherein the diallyl tertiary amine has the structure:

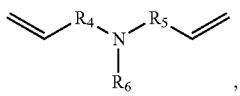

wherein $R_4$, and $R_5$ are independently

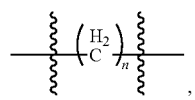

where n is at least one, and $R_6$ is linear alkyl.

Clause 6. The method of clause 5, wherein $R_4$, $R_5$, and $R_6$ are each, independently, linear $C_1$-$C_{100}$ alkyl.

Clause 7. The method of clause 5, wherein n=1 for both of $R_4$ and $R_5$, and $R_6$ is methyl.

Clause 8. The method of any one of clauses 1-7, wherein the molar ratio of vinyl terminated poly(dialkylsiloxane) to the diallyl zwitterionic monomer or the molar ratio of vinyl terminated poly(dialkylsiloxane) to the diallyl tertiary amine is 1-5:1-12.

Clause 9. The method of any one of clauses 1-8, wherein the curing agent comprises a polysiloxane, and the reaction is catalyzed using a platinum or ruthenium hydrosilylation catalyst.

Clause 10. The method of any one of clauses 1-9, wherein the vinyl-terminated poly(dialkylsiloxane) comprises one or more of: a dimethyl siloxane; a diphenylsiloxane; a diethylsiloxane; a trifluoropropyl methyl siloxane; a phenylmethylsiloxane; a copolymer of dimethylsiloxane with one or more of a diphenylsiloxane, a diethylsiloxane, a trifluoropropyl methyl siloxane, a phenylmethylsiloxane; and/or n aminopropylmethylsiloxane-(dimethylsiloxane).

Clause 11. The method of clause 10, wherein the vinyl terminated polysiloxane is a vinyl terminated dimethyl siloxane, such as Sylgard® 184.

Clause 12. The method of any one of clauses 1 and 3-11, wherein the substituted saturated heterocyclic compound comprises one or more heteroatoms independently selected from the group consisting of oxygen, sulfur, and phosphorous.

Clause 13. The method of clause 12, wherein the substituted saturated heterocylic compound comprises a ring having three to six members.

Clause 14. The method of clause 12, wherein the substituted heterocyclic compound comprises one or more substituents selected from O and a halogen.

Clause 15. The method of clause 12, wherein the substituted heterocyclic compound is selected from:

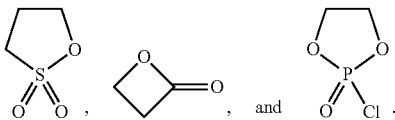

Clause 16. The method of any one of clauses 1-15, further comprising coating an article with the polysiloxane composition.

Clause 17. The method of clause 16, wherein the article is a blood-contacting article.

Clause 18. The method of clause 17, wherein the blood-contacting article is a stent, a coil, a catheter, a vascular graft, an artificial valve, a gas-permeable membrane, or a microfluidic device.

Clause 19. A crosslinked copolymer composition, comprising:
a poly(dialkylsiloxane) residue;
an N-dialkyl monomer residue comprising a zwitterion moiety comprising a quaternary amine and an anionic moiety pendant from the quaternary amine.

Clause 20. The copolymer composition of clause 19, wherein the zwitterionic N-dialkyl macromer residue has the structure:

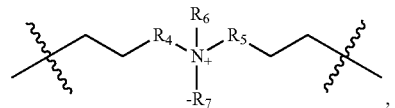

where:
$R_4$ and $R_5$ are independently

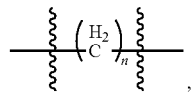

where n is at least one,
$R_6$ is linear alkyl, and
$R_7$ is an anionic moiety forming a betaine with the quaternary amine.

Clause 21. The copolymer composition of clause 20, wherein $R_4$, $R_5$, and $R_6$ are each independently linear $C_1$-$C_{100}$ alkyl, such as linear $C_1$-$C_{24}$ alkyl, such as linear $C_{10}$ alkyl.

Clause 22. The copolymer composition of clause 20, wherein n is one for both $R_4$ and $R_5$, and $R_6$ is methyl.

Clause 23. The copolymer composition of any one of clauses 19-22, wherein the poly(dialkylsiloxane) residue is a poly(dimethylsiloxane) residue.

Clause 24. The copolymer composition of any one of clauses 19-23, wherein the anionic moiety pendant from the quaternary amine comprises a sulfonate ($-SO_3^-$) moiety.

Clause 25. The copolymer composition of any one of clauses 19-23, wherein the betaine moiety is a sulfobetaine or carboxybetaine moiety.

Clause 26. A polymer composition prepared according to the method of any one of clauses 1-18.

Clause 27. A method of preparing a polysiloxane composition comprising a zwitterionic moiety, comprising:
copolymerizing a poly(dialkylsiloxane) diol, a diisocyanate, a tertiary amine alkyl diol, and a poly(dialkylsiloxane) diamine to form a poly(urethane urea) copolymer; and,
reacting a substituted saturated heterocylic compound with a tertiary amine of the poly(urethane urea) copolymer to introduce a zwitterionic group into the poly(urethane urea) copolymer backbone.

Clause 28. The method of clause 27, wherein the poly(dialkylsiloxane) diol and the poly(dialkylsiloxane) diamine independently comprise one or more of a dimethyl siloxane; a diphenylsiloxane; a diethylsiloxane; a trifluoropropyl methyl siloxane; a phenylmethylsiloxane; a copolymer of dimethylsiloxane with one or more of a diphenylsiloxane, a diethylsiloxane, a trifluoropropyl methyl siloxane, a phenylmethylsiloxane; and/or an aminopropylmethylsiloxane-dimethylsiloxane).

Clause 29. The method of clause 28, wherein the poly(dialkylsiloxane) diol and the poly(dialkylsiloxane) diamine comprise dimethyl siloxane.

Clause 30. The method of clause 29, wherein the poly(dialkylsiloxane) diol and the poly(dialkylsiloxane) diamine independently have a number average (Mn) molecular weight of about 1,000 to about 10,000.

Clause 31. The method of clause 30, wherein the poly(dialkylsiloxane) diol has a Mn ranging from about 4,000 to 6,000.

Clause 32. The method of clause 30, wherein the poly(dialkylsiloxane) diamine has a Mn ranging from about 1,500 to about 3,500.

Clause 33. The method of any one of clauses 27-32, wherein the diisocyanate is an aromatic diisocyanate or an aliphatic diisocyanate.

Clause 34. The method of clause 33, wherein the diisocyanate is an aromatic diisocyanate selected from the group consisting of 4,4'-diphenylmethane diisocyanate, 2,6-toluene diisocyanate, 2,4-toluene diisocyanate, tetramethyl xylene diisocyanate, tetramethyl xylene diisocyanate, and trans-1,4-cyclohexane diisocyanate.

Clause 35. The method of clause 34, wherein the diisocyanate is 4,4'-diphenylmethane diisocyanate.

Clause 36. The method of clause 33, wherein the diisocyanate is an aliphatic diisocyanate selected from the group consisting of lysine methyl ester diisocyanate, 1,1,6,6-tetrahydroperfluorohexamethylene diisocyanate, hexamethylene diisocyanate, and tetramethylene diisocyanate.

Clause 37. The method of clause 27, wherein the tertiary amine alkyl diol has the structure:

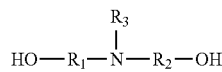

wherein $R_1$, $R_2$, and $R_3$ are independently linear alkyl.

Clause 38. The method of clause 37, wherein $R_1$, $R_2$, and $R_3$ are, independently, linear $C_1$-$C_{100}$ alkyl.

Clause 39. The method of clause 37, wherein $R_1$ and $R_2$ are each independently a linear $C_1$-$C_3$ alkyl and $R_3$ is a linear $C_1$-$C_4$ alkyl.

Clause 40. The method of clause 37, wherein $R_1$ and $R_2$ are each ethyl, and $R_3$ is methyl.

Clause 41. The method of clause 27, wherein the substituted saturated heterocyclic compound comprises one or more heteroatoms independently selected from the group consisting of oxygen, sulfur, and phosphorus.

Clause 42. The method of clause 41, wherein the substituted saturated heterocyclic compound comprises a ring having three to six members.

Clause 43. The method of clause 42, wherein the substituted saturated heterocyclic compound comprises one or more substituents selected from O and a halogen.

Clause 44. The method of clause 43, wherein the substituted saturated heterocyclic compound is selected from

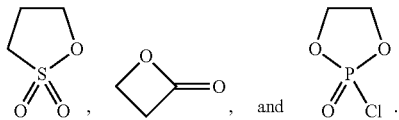

Clause 45. The method of clause 44, wherein the substituted saturated heterocyclic compound is:

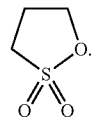

Clause 46. The method of clause 27, wherein the ratio of moles of poly(dialkylsiloxane) diol to diisocyanate to tertiary amine alkyl diol to poly(dialkylsiloxane) diamine of the copolymer is 0.5-1.5:2-6:1-3:0.5-1.5, 0.75-1.25:3-5:1.5-2.5:0.75-1.25, e.g., 1:42:1, and the molar ratio of diols:diisocyanate:diamine is 0.5-1.5:1-3:0.5-1.5, 0.75-1.25:1.5-2.5:0.75-1.25, e.g., 1:2:1.

Clause 47. The method of any one of clauses 27-46, further comprising coating an article with the polysiloxane composition comprising a zwitterionic moiety.

Clause 48. The method of clause 47, wherein the article is a blood-contacting article.

Clause 49. The method of clause 48, wherein the blood-contacting article is a stent, a coil, a catheter, a vascular graft, an artificial valve, a gas-permeable membrane, or a microfluidic device.

Clause 50. A polysiloxane composition comprising a zwitterionic moiety, prepared according to a method as described in any one of clauses 27-46.

Clause 51. A bodily fluid-contacting device comprising one or more surfaces, wherein one or more of the surfaces comprise or are coated with the zwitterionic polymer composition of any one of clauses 19-26 or 50.

Clause 52. The device of clause 52, wherein the device is a blood-contacting device.

Clause 53. The device of clause 53, wherein the device is non-thrombogenic when contacted with blood.

Clause 54. The device of clause 52, wherein the blood-contacting device is a stent, coil, catheter, vascular graft, artificial valve, microfluidic device, or a gas exchange fiber membrane of an extracorporeal membrane oxygenator.

Clause 55. The device of clause 51, wherein the device comprises polydimethylsiloxane, polyurethane, or polypropylene.

Clause 56. The device of clause 51, wherein the device is coated by electrospinning, dip coating, an interpenetrating polymer network technique, spray coating, curtain coating, or doctor (or draw-down) blade coating.

Clause 57. The device of clause 51, wherein the device is a microfluidic device used for the analytical analysis of bodily-fluids.

Clause 58. A small-diameter vascular graft formed by electrospinning the zwitterionic polymer composition of any one of clauses 19-26 or 50.

Clause 59. The small-diameter vascular graft of clause 58, wherein the vascular graft has an internal diameter of less than 6 millimeters.

Clause 60. The small diameter vascular graft of clause 59, wherein the vascular graft has an internal diameter of 1 to 2 millimeters.

Clause 61. A method of preparing a coated bodily fluid-contacting device, comprising:
    coating one or more surfaces of a device comprising one or more surfaces, with a zwitterionic polymer composition, the zwitterionic polymer composition comprising poly(dialkylsiloxane) blocks and a zwitterionic moiety, wherein the polymer is prepared by:
    copolymerization of a poly(dialkylsiloxane) diol, a diisocyanate, a tertiary amine alkyl diol, and a poly(dialkylsiloxane) diamine to form a poly(urethane urea) copolymer; and reacting the poly(urethane urea) copolymer with a substituted saturated heterocyclic compound with the tertiary amine of the poly(urethane urea) copolymer to introduce a zwitterionic group into the poly(urethane urea) copolymer backbone; or
    mixing a vinyl-terminated poly(dialkylsiloxane) and a diallyl zwitterionic monomer with a curing agent and curing the mixture to introduce a zwitterionic group into the poly(dialkylsiloxane); or
    mixing a vinyl-terminated poly(dialkylsiloxane) and a diallyl tertiary amine compound with a curing agent; curing the mixture to form a cross-linked tertiary amine-modified poly(dialkylsiloxane); and reacting the cross-linked tertiary amine-modified poly(dialkylsiloxane) with a substituted saturated heterocylic compound to introduce a zwitterionic group into the cross-linked tertiary amine-modified poly(dialkylsiloxane).

DETAILED DESCRIPTION

Figure 1:
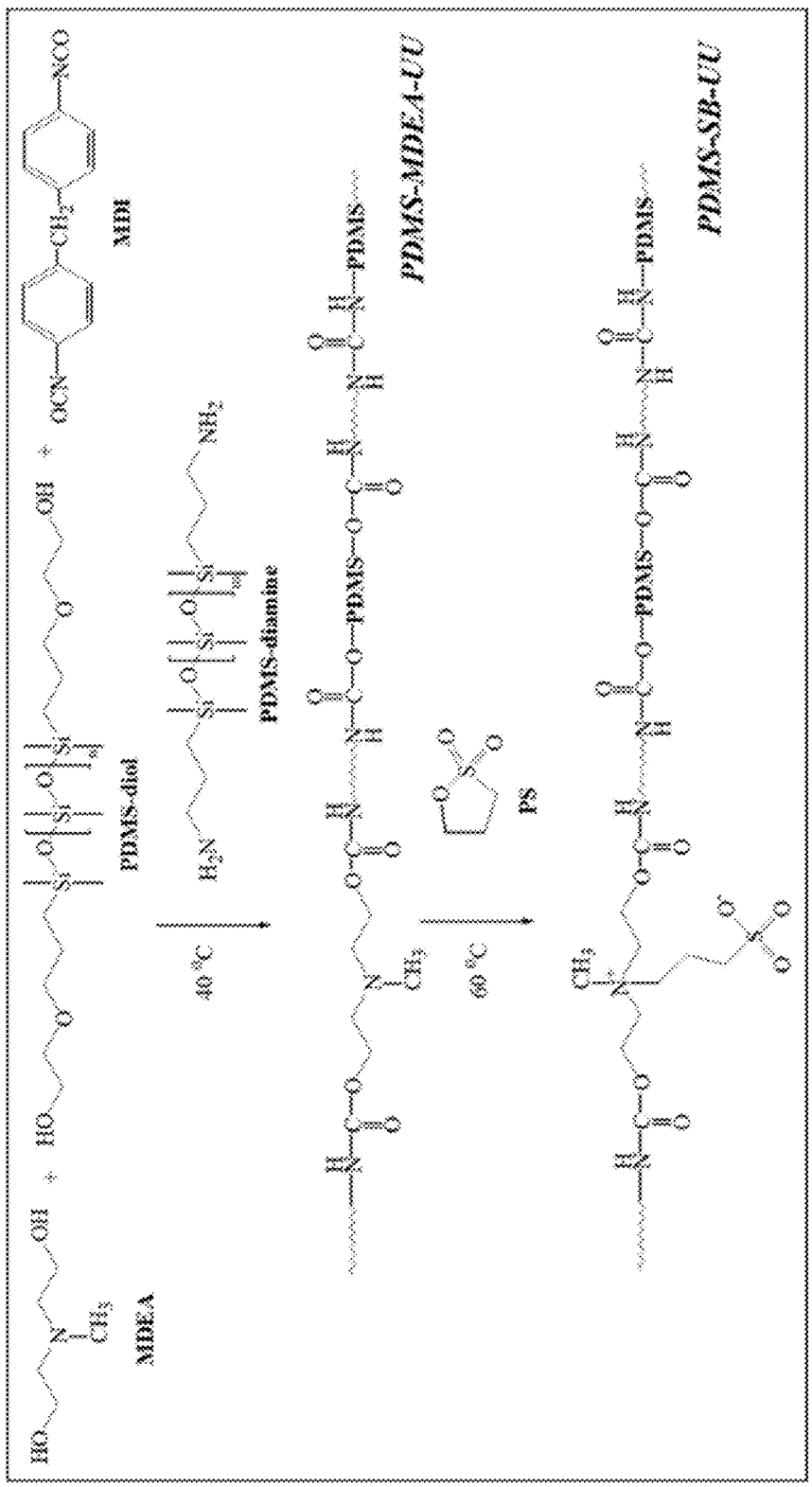
FIG. 1 is an exemplary synthesis schematic of PDMS-based polyurethane-urea (PDMS-MDEA-UU) and zwitterionic polyurethane-urea (PDMS-SB-UU).

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values.

As used herein, the terms "comprising," "comprise" or "comprised," and variations thereof, are meant to be open ended. The terms "a" and "an" are intended to refer to one or more.

The term "polymer composition" is a composition comprising one or more polymers. As a class, "polymers" can include, without limitation, homopolymers, heteropolymers or copolymers, block polymers, block copolymers, and can be both natural and synthetic. Homopolymers contain one type of building block, or monomer, whereas copolymers contain more than one type of monomer. An "oligomer" can be a polymer that comprises a small number of monomers, such as, for example, from 3 to 100 monomer residues. The term "prepolymer" means a compound, monomer or oligomer used to prepare a polymer, and includes without limitation both homopolymer and copolymer oligomers.

A "block polymer" refers to a polymer comprising one or more homopolymeric subunits covalently linked to, or separated by, subunits of a different chemical nature or by a coupling group of low molecular weight. A block copolymer refers to a block polymer containing stretches of two or more different homopolymeric subunits linked in any topology.

As used herein, the term "elastomer" refers to a polymeric material which at a temperature, such as room temperature (e.g., 20° C.-30° C.), or physiological temperature (e.g., 35° C.-40° C.), is capable of repeatedly recovering in size and shape after removal of a deforming force. An elastomer may be a material which can be repeatedly stretched to at least 1.5×, at least 2×, or at least 3× its original length and will repeatedly return to its approximate original length on release of the stress.

A polymer "comprises" or is "derived from" a stated monomer if that monomer is incorporated into the polymer. Thus, the incorporated monomer that the polymer comprises is not the same as the monomer prior to incorporation into a polymer, in that at the very least, certain linking groups are incorporated into the polymer backbone or certain groups are removed in the polymerization process. A polymer is said to comprise a specific type of linkage if that linkage is present in the polymer. A "residue" refers to that part of a compound or molecule remaining when incorporated into a larger molecule, such as a polymer, a macromer, or another macromolecule. In the context of a polymer an incorporated monomer can be a "residue" of that monomer. A "macromer" or "macromonomer" refers to a monomeric subunit for incorporation into a (co)polymer, and can be a macromolecule that has at least one end-group which enables it to act as a monomer molecule. It may be a combination product of two or more smaller monomer residues.

As used herein, the "number average (Mn) molecular weight" is the total weight of a polymer divided by the total number of molecules of the polymer. Unless indicated to the contrary, molecular weight of a polymer refers to its Mn.

As described herein, a "fiber" an elongated, slender, thread-like and/or filamentous structure. A "matrix" is any two- or three-dimensional arrangement of elements (e.g., fibers), either ordered (e.g., in a woven or non-woven mesh) or randomly-arranged (as is typical with a mat of fibers typically produced by electrospinning) and can be isotropic or anisotropic.

As used herein, the phrase "reaction product of" means chemical reaction product(s) of the recited components, and can include partial reaction products as well as fully reacted products.

As used herein, the term "polymer composition" is intended to encompass a product comprising the specified monomeric or macromonomeric ingredients in the specified amounts, as well as any product which results, directly or indirectly, from combinations of the specified ingredients in the specified amounts in formation of a polymer.

As used herein, a "moiety" is a part of a molecule, and can include as a class "residues", which are the portion of a compound or monomer that remains in a larger molecule, such as a polymer chain, after incorporation of that compound or monomer into the larger molecule, and "functional groups", which are specific substituents or moieties to which a characteristic chemical reactivity, non-covalent interactivity, physical characteristic, or other chemical or physical properties may be attributed.

As used herein, "alkyl" refers to straight, branched chain, or cyclic hydrocarbon groups including, for example, from 1 to about 100 carbon atoms, for example and without limitation $C_{1-3}$, $C_{1-4}$, $C_{1-10}$ groups, for example and without limitation, straight, branched chain alkyl groups such as methyl, ethyl, propyl, butyl, pentyl, hexyl, heptyl, octyl, nonyl, decyl, undecyl, dodecyl, and the like. An alkyl group can be, for example, a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. Non-limiting examples of straight alkyl groups include methyl, ethyl, propyl, butyl, pentyl, hexyl, heptyl, octyl, nonyl, and decyl. Branched alkyl groups comprise any straight alkyl group substituted with any number of alkyl groups. Non-limiting examples of branched alkyl groups include isopropyl, isobutyl, sec-butyl, and t-butyl. Non-limiting examples of cyclic alkyl groups include cyclopropyl, cyclobutyl, cyclopentyl, cyclohexyl, cycloheptyl, and cyclooctyl groups. Cyclic alkyl groups also comprise fused-, bridged-, and spiro-bicycles and higher fused-, bridged-, and spiro-systems. A cyclic alkyl group can be substituted with any number of straight, branched, or cyclic alkyl groups. "Substituted alkyl" can include alkyl substituted at 1 or more (e.g., 1, 2, 3, 4, 5, or even 6) positions, which substituents are attached at any available atom to produce a stable compound, with substitution as described herein. "Optionally substituted alkyl" refers to alkyl or substituted alkyl. "Alkylene" and "substituted alkylene" can include divalent alkyl and divalent substituted alkyl, respectively, including, without limitation, methylene, ethylene, trimethylene, tetramethylene, pentamethylene, hexamethylene, hepamethylene, octamethylene, nonamethylene, or decamethylene. "Optionally substituted alkylene" can include alkylene or substituted alkylene.

"Alkene or alkenyl" can include straight, branched chain, or cyclic hydrocarbyl groups including, e.g., from 2 to about 20 carbon atoms, such as, without limitation $C_{2-3}$, $C_{2-6}$, $C_{2-10}$ groups having one or more, e.g., 1, 2, 3, 4, or 5, carbon-to-carbon double bonds. The olefin or olefins of an alkenyl group can be, for example, E, Z, cis, trans, terminal, or exo-methylene. An alkenyl or alkenylene group can be, for example, a $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, $C_{40}$, $C_{41}$, $C_{42}$, $C_{43}$, $C_{44}$, $C_{45}$, $C_{46}$, $C_{47}$, $C_{48}$, $C_{49}$, or $C_{50}$ group that is substituted or unsubstituted. A halo-alkenyl group can be any alkenyl group substituted with any number of halogen atoms. "Substituted alkene" can include alkene substituted at 1 or more, e.g., 1, 2, 3, 4, or 5 positions, which substituents are attached at any available atom to produce a stable compound, with substitution as described herein. "Optionally substituted alkene" can include alkene or substituted alkene. Likewise, "alkenylene" can refer to divalent alkene.

Examples of alkenylene include without limitation, ethylene (—CH═CH—) and vinyl ($H_2C$═CH—) all stereoisomeric and conformational isomeric forms thereof. "Substituted alkenylene" can refer to divalent substituted alkene. "Optionally substituted alkenylene" can refer to alkenylene or substituted alkenylene. As used herein, "vinyl" is a $H_2C$═CH— group and "allyl" is a $H_2C$═CH—$CH_2$— group.

As used herein, "saturated" refers to a compound in which the atoms are linked by single bonds.

"Heteroatom" refers to any atom other than carbon or hydrogen, for example, N, O, P, and S. Compounds that contain N or S atoms can be optionally oxidized to the corresponding N-oxide, sulfoxide or sulfone compounds. "Heterocyclic compound" refers to an organic compound in any embodiment described herein in which one or more carbon atoms in a cycloalkyl ring are substituted with any atom other than carbon or hydrogen, for example, N, O, P, or S. Where a cycloalkyl group is substituted with an O, forming one or more ether groups (—C—O—C) within the ring, the group can be referred to as "cycloether," for example furanyl and tetrahydrofuranyl groups are $C_4$ cycloethers.

"Substituted" or "substitution" refer to replacement of a hydrogen atom of a molecule with one or more atoms or groups (substituents), such as, for example and without limitation: halogen, alkyl, alkoxy, alkylthio, trifluoromethyl, acyloxy, hydroxy, mercapto, carboxy, carbonyl, aryloxy, aryl, arylalkyl, heteroaryl, amino, alkylamino, dialkylamino, morpholino, piperidino, pyrrolidin-1-yl, piperazin-1-yl, thiol, nitro, nitrate, guanidinium, sulfo, sulfate, ═O (e.g., carbonyl), or other groups. "Halogen," "halide," and "halo" refers to —F, —Cl, —Br, and/or —I, and "halo-substituted", refers to substitution of one or more atom or group, such as a hydrogen, with a halide. In aspects or embodiments, substituents may be, independently, and without limitation: ═O or a halogen.

Figure 2:
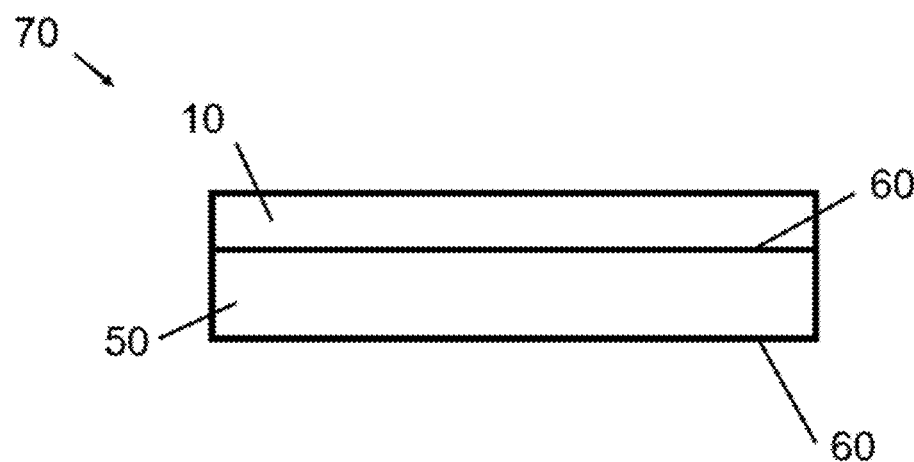
FIG. 2 depicts schematically a bodily-fluid contacting device coated with a zwitterionic polymer composition as described herein.

As described herein, a "zwitterion" or a "zwitterionic" moiety refers to a moiety having an equal number of positively-charged and negatively-charged functional groups, e.g., at its isoelectric point (pH(I)), or a specific pH, such as a neutral or physiological pH (e.g., pH ranging from 7 to 8, such as 7.4), such that the net charge of the moiety is zero. An example of a zwitterionic moiety is a betaine moiety, which is a neutral moiety comprising a positively-charged (cationic) functional group that bears no hydrogen, such as a quaternary ammonium or phosphonium group, and a negatively-charged (anionic) functional group, such as a carboxylate group, such as trimethylglycine. A sulfobetaine is a zwitterionic compound or moiety comprising a sulfur, for example and without limitation the reaction product of 1,3-propanesultone with a tertiary amine, such as the moiety as shown in FIG. 2.

As used herein, a "patient" can be an animal, such as a mammal, including, but not limited to, a primate (such as a human, a non-human primate, e.g., a monkey, and a chimpanzee), a non-primate (such as a cow, a pig, a camel, a llama, a horse, a goat, a rabbit, a sheep, a hamster, a guinea pig, a cat, a dog, a rat, a mouse, a horse, and a whale), or a bird (e.g., a duck or a goose).

The synthesis of a blood-compatible elastomeric polysiloxane- (e.g., PDMS-) based copolymer may enable simpler medical device fabrication. Such a material might also find application in current (PDMS-based) microfluidic chips, which have been successfully developed for medical diagnosis and screening but also which would benefit from enhanced hemocompatibility for extended contact with whole blood.

A zwitterionic polymer composition comprising a poly (dialkylsiloxane) block and a zwitterionic moiety is provided herein. A zwitterionic polymer composition comprising a poly(dialkylsiloxane) block and a zwitterionic moiety is prepared by the copolymerization of a poly(dialkylsiloxane) diol, a diisocyanate, a tertiary amine alkyl diol, and a poly(dialkylsiloxane) diamine to form a poly(urethane urea) copolymer and reacting a substituted saturated heterocylic compound with the tertiary amine of the poly(urethane urea) copolymer to introduce a zwitterionic group into the poly(urethane urea) copolymer backbone.

The zwitterionic polymer composition can be prepared by any suitable method. The polymer composition may comprise a poly(dialkylsiloxane) portion, an isocyanate derivative, a tertiary amine alkyl diol, and a diamine as a chain extender. For example and without limitation, formation of the polymeric composition comprises at least two steps. In the first step, a prepolymer is formed. For example and without limitation, the prepolymer comprises an isocyanate-terminated copolymer segment, which is formed by reacting a poly(dialkylsiloxane) and a tertiary amine alkyl diol with an isocyanate derivative. In the second step, the prepolymer can be further reacted to form chemical bonds between prepolymer molecules. For example and without limitation, the isocyanate-terminated prepolymer may be reacted with a diamine chain extender, which reacts with the isocyanate moiety to form chemical bonds between prepolymer molecules. Preparation of polymer compositions may include other steps, including, for example and without limitation, catalytic steps, purification steps, and separation steps.

The polymer composition described herein comprises one or more poly(dialkylsiloxane) polymer segments. As used herein, "siloxane" is a compound having one or more Si—O—Si linkages, e.g.,

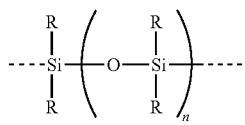

where each instance of R is, independently, an organic group or H, for example, straight or branched-chain $C_1$-$C_4$ alkyl, including methyl, ethyl, propyl, butyl, or phenyl $C_1$-$C_4$ alkyl, such as phenylmethyl or phenylethyl, optionally substituted with one or more halogen atoms. n typically varies from 1-2,000 with number average molecular weight (Mn) of, for example, about 1,000 to about 10,000, including increments therebetween. For polysiloxanes, n is greater than 1, e.g., from 10 to 200 or from 10 to 50, for example, for poly(dimethyl siloxane), n may range from 15 to 175 (approximating Mn=1,000 to 10,000), or from 15 to 35 (approximating Mn=1,000 to 10,000). Combination siloxanes include methylhydrogen, dimethylsiloxane, which includes a mixture of both methylhydrogensiloxyl and dimethylsiloxyl groups. In siloxanes, organic groups, such as without limitation, alkyl, haloalkyl, aryl, haloaryl, alkoxyl, aralkyl and silacycloalkyl groups, and/or more reactive groups, such as alkenyl groups such as vinyl, allyl, propenyl, butenyl, pentenyl, hexenyl, heptenyl, octenyl, nonenyl, and/or decenyl groups may be attached to silicon atoms of the siloxane backbone in any combination. Polar groups, such as acrylate, methacrylate, amino, imino, hydroxy, epoxy, ester, alkyloxy, isocyanate, phenolic, polyurethane oligomeric, polyamide oligomeric, polyester oligomeric, polyether oligomeric, polyol, and carboxypropyl groups may be attached to silicon atoms of the siloxane backbone in any combination and in combination with any groups described herein. Siloxanes may be terminated with any useful group, for example and without limitation, alkenyl, and/or alkyl groups, such as a methyl, ethyl, isopropyl, n-propyl, allyl, and/or vinyl group or combinations thereof. Other groups that may be used to terminate a siloxane include: acrylate, methacrylate, amino, imino, hydroxy, epoxy, ester, alkyloxy, isocyanate, phenolic, polyurethane oligomeric, polyamide oligomeric, polyester oligomeric, polyether oligomeric, polyol, carboxypropyl, and halo, e.g., fluoro groups.

Non-limiting examples of poly(dialkylsiloxanes) suitable for the preparation of the polymers described herein are dimethyl siloxane, e.g.,

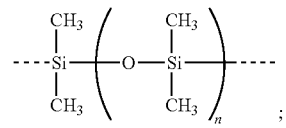

diphenylsiloxane; diethylsiloxane; trifluoropropyl methyl siloxane; phenylmethylsiloxane; a copolymer of dimethylsiloxane with one or more of a diphenylsiloxane, a diethylsiloxane, a trifluoropropyl methyl siloxane, and/or a phenylmethylsiloxane, and an aminopropylmethylsiloxane-dimethylsiloxane. The poly(dialkylsiloxane) diol and the poly(dialkylsiloxane) diamine may comprise dimethyl siloxane.

As described herein, a poly(dialkylsiloxane) diol is a poly(dialkylsiloxane) comprising, e.g., terminated by, hydroxyl (—OH) groups. Non-limiting examples of suitable poly(dialkylsiloxane) diols are bis(hydroxyalkyl) terminated poly(dialkylsiloxane) compounds, e.g.,

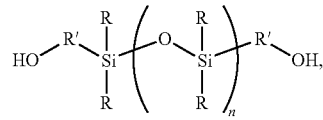

and bis(hydroxypolyether) terminated poly(dialkylsiloxane) compounds, e.g.,

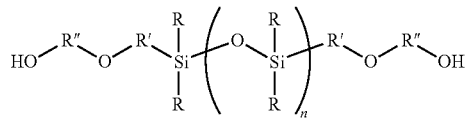

where the R groups are independently organic groups or H, R" are independently a linear or branched alkyl, R' are independently a linear or branched alkyl or a bond, and n is greater than 1, e.g., from 10 to 200 or from 10 to 50, for example, for poly(dimethyl siloxane), n may range from 15 to 175 (approximating Mn=1,000 to 10,000), or from 15 to 35 (approximating Mn=1,000 to 10,000).

The poly(dialkylsiloxane) diol may be a bis(hydroxypolyether) terminated poly(dimethylsiloxane) having the structure

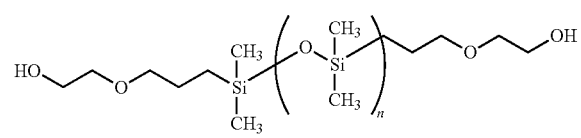

with a Mn of about 4,000 to 6,000.

The polymer compositions described herein may be prepared from a tertiary amine alkyl diol monomer. A tertiary amine alkyl diol has the structure

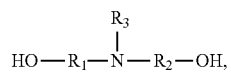

where $R_1$, $R_2$, and $R_3$ are independently a linear or branched alkyl. In some aspects or embodiments, $R_1$ and $R_2$ are independently linear alkyl, such as a $C_1$-$C_3$ alkyl. $R_1$ and $R_2$ may be ethylene (dimethylene) group. $R_3$ may be linear alkyl, such as a $C_1$-$C_4$ alkyl. $R_3$ may be methyl.

Non-limiting examples of suitable tertiary amine alkyl diols are bis(hydroxymethyl)methylamine, bis(hydroxymethyl)aminoethane, (hydroxymethyl (propyl)amino)methanol, (butyl(hydroxymethyl)amino)methanol, methyl diethanolamine, N-ethyldiethanolamine, N-propyldiethanolamine, N-butyldiethanolamine, 3-[3-hydroxypropyl(methyl)amino]propan-1-ol, 3-[ethyl(3-hydroxypropyl)amino]propan-1-ol, 3-[3-hydroxypropyl(propyl)amino]propan-1-ol, and 3-[butyl(3-hydroxypropyl)amino]propan-1-ol.

As described herein, an "isocyanate derivative" is any molecule or group that is terminated by the moiety —N═C═O. Isocyanate derivatives also include, without limitation, monoisocyanates and polyisocyanates, such as diisocyanates and triisocyanates. Isocyanate derivatives also include, without limitation, aliphatic diisocyanates and aromatic diisocyanates. Non-limiting examples of aromatic diisocyanates include 4,4'-diphenylmethane diisocyanate, 2,6-toluene diisocyanate, 2,4-toluene diisocyanate, tetramethyl xylene diisocyanate, tetramethyl xylene diisocyanate, and trans-1,4-cyclohexane diisocyanate. Non-limiting examples of aliphatic diisocyanates include lysine methyl ester diisocyanate, 1,1,6,6-tetrahydroperfluorohexamethylene diisocyanate, hexamethylene diisocyanate, and tetramethylene diisocyanate. In one non-limiting embodiment, the diisocyanate is 4,4'-diphenylmethane diisocyanate.

As described herein, a "chain extender" is any molecule or group that reacts with an isocyanate derivative to extend chains of polymers. The chain extender may be a diamine that allows for extending the chain of the prepolymer. In one example, the diamine is a poly(dialksiloxane) diamine, e.g.

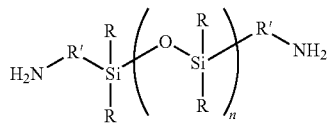

where the R groups are independently organic groups or H, R' is a bond (not present, e.g., a direct bond between the adjacent Si and N) or a linear or branched alkyl, and n is greater than 1, e.g., from 10 to 200 or from 10 to 50, for example, for poly(dimethyl siloxane), n may range from 15 to 175 (approximating Mn=1,000 to 10,000), or from 15 to 35 (approximating Mn=1,000 to 10,000). A suitable poly(dialkylsiloxane) diamine is a poly(dimethylsiloxane) diamine having each R' as a linear $C_3$ alkyl, or propyl, and Mn from about 1,500 to 3,500.

The polymer composition may be a poly(urethane urea) (PUU) elastomer. A non-limiting example of such a PUU is an elastomeric polymer made from a poly(dialkylsiloxane) diol, such as poly(dimethylsiloxane) diol, a tertiary amine alkyl diol, such as methyl diethanolamine, and an aromatic diisocyanate, such as 4,4'-diphenylmethane diisocyanate, using a poly(dialkylsiloxane) diamine chain extender, such as a poly(dimethylsiloxane) diamine, in the presence of a catalyst.

Examples of suitable catalysts include, without limitation, stannous octoate, dibutyltin dilaurate, and/or dibutyltin diacetate.

One non-limiting example or method for preparing a PUU copolymer is a two-step polymerization process whereby poly(dimethylsiloxane) diol (Mn about 5,600), 4,4'-diphenylmethane diisocyanate, methyl diethanolamine, and poly(dimethylsiloxane) diamine (Mn about 2,500) are combined in a mole ratio of 0.5-1.5:2-6:1-3:0.5-1.5, 0.75-1.25:3-5:1.5-2.5:0.75-1.25, e.g., 1:4:2:1, and the molar ratio of diols:diisocyanate:diamine is 0.5-1.5:1-3:0.5-1.5, 0.75-1.25:1.5-2.5:0.75-1.25, e.g., 1:2:1.

In the first step to form the prepolymer, a solution of poly(dimethylsiloxane) diol and methyl diethanolamine in 1,2-dichloroethane (DCE) was mixed with 4,4'-diphenylmethane diisocyanate and stannous octoate, and the mixture was allowed to react at 40 degrees Celsius (° C.) for 3 hours. In the second step, the prepolymer is reacted with poly(dimethylsiloxane) diamine, which is added drop wise while stirring and allowed to react for 12 hours at 40° C., to extend the chain and form the copolymer. After the two step polymerization process, the copolymer solution is washed and precipitated in methanol. Finally, the polymer is dried under vacuum at 60° C.

The copolymers described herein can be functionalized, e.g., at the tertiary amine. For example and without limitation, as shown herein, the PUU copolymer having poly(dialkylsiloxane) blocks may be functionalized with zwitterionic groups. To form the zwitterionic moiety of the polymer composition, zwitterionic groups are attached (for example, covalently) to the backbone of the copolymer through a ring-opening reaction with a substituted saturated heterocyclic compound. In the ring opening reaction, the substituted saturated heterocyclic compound is reacted with the tertiary amine of the copolymer having the poly(dialkylsiloxane) blocks to introduce a zwitterionic group to the copolymer backbone. Non-limiting examples of zwitterionic groups include sulfobetaine (SB), phosphobetaine (PB), and carboxybetaine (CB) groups. The degree of zwitterionic functionalization of the polymer will depend on the number of tertiary amines converted to zwitterions, which will depend on the stoichiometry of the reactants. An excess of the substituted saturated heterocyclic compound as compared to the number of tertiary amines in the polymer can result in full, or essentially full, conversion, while reaction of the tertiary amines with lesser amounts of the substituted saturated heterocyclic compound can result in less than complete conversion of all tertiary amines in the polymer to zwitterionic moieties.

The substituted saturated heterocyclic compound is a compound having one or more heteroatoms. Suitable heteroatoms for the substituted saturated heterocyclic compound are oxygen, sulfur, or phosphorous. The substituted saturated heterocylic compound can comprise one heteroatom, two heteroatoms, or three heteroatoms. For example, a substituted saturated heterocyclic compound can have one oxygen heteroatom. For example, a substituted saturated heterocyclic compound can have one sulfur heteroatom. For example, a substituted saturated heterocyclic compound can have two oxygen heteroatoms. For example, a substituted saturated heterocylic compound can have two oxygen heteroatoms and one phosphorous heteroatom.

The cyclic ring of the substituted saturated heterocyclic compound is a cycloalkyl having three to six members, such as four members or five members. The substituted saturated heterocyclic compound can be substituted with one or more substituents, such as a =O or a halogen. The one or more substituents can be attached to the cycloalkyl ring and/or the one or more heteroatoms. For example, a substituted saturated heterocyclic compound can have one or more substituents attached to a heteroatom and one or more substituents attached to carbon of the cycloalkyl ring. For example, a substituted saturated heterocyclic compound can have one or more substituents attached to the cycloalkyl ring.

Non-limiting examples of substituted saturated heterocyclic compounds include: 1,3-propanesultone, e.g.,

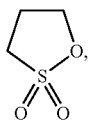

beta (β)-propriolactone, e.g.,

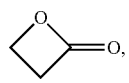

and 2-chloro-1,3,2-dioxaphospholane 2-oxide, e.g.,

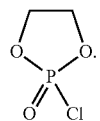

In an exemplary reaction between a tertiary amine and 1,3-propanesultone, the 1,3-propanesultone is susceptible to a Nucleophilic Substitution (SN2) type ring opening reaction, e.g., a tertiary amine, at elevated temperatures.

A method of preparing a zwitterionic polymer composition having poly(dialkylsiloxane) blocks and a zwitterionic moiety is provided herein. The polymer is prepared copolymerizing of a poly(dialkylsiloxane) diol, a diisocyanate, a tertiary amine alkyl diol, and a poly(dialkylsiloxane) diamine to form a poly(urethane urea) copolymer. A substituted saturated heterocyclic compound is reacted with the tertiary amine of the poly(urethane urea) copolymer to introduce a zwitterionic group into the poly(urethane urea) copolymer backbone.

Figure 3:
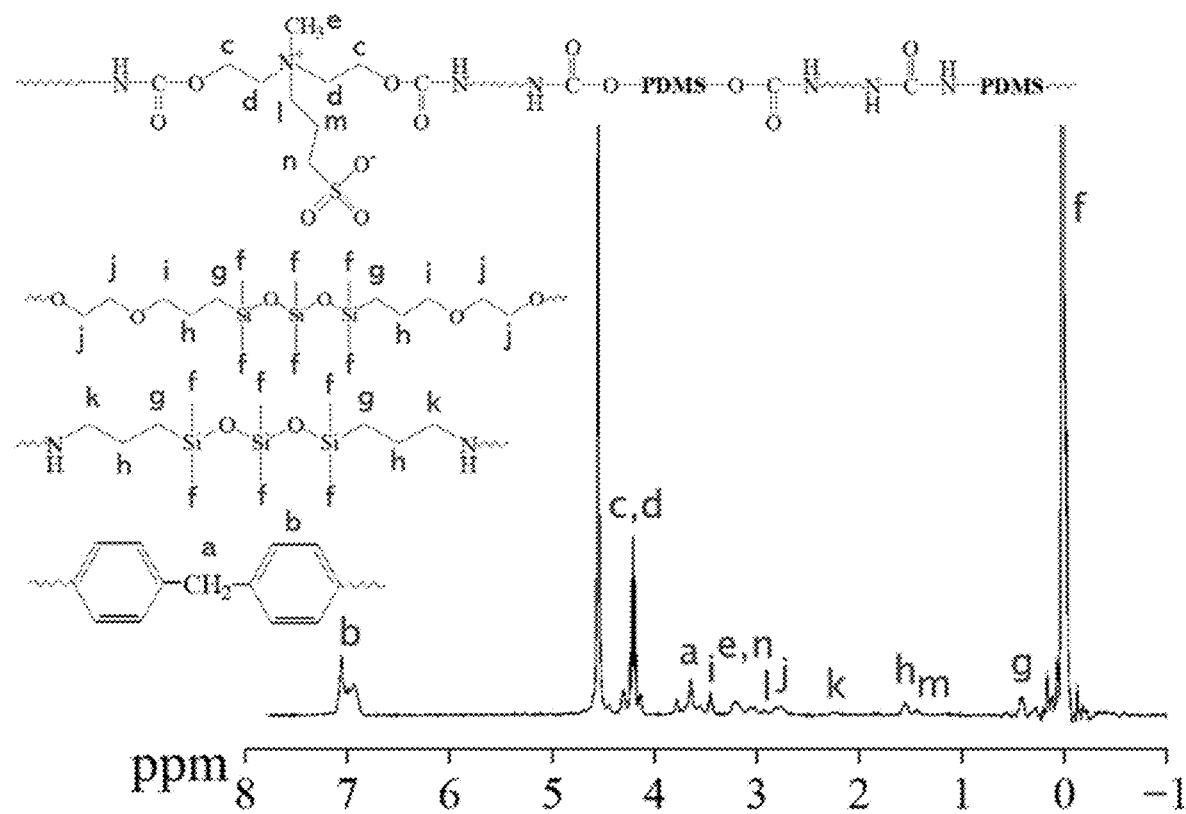
FIG. 3 depicts $^1$H-NMR spectra of (A) an exemplary PDMS-SB-UU in HFIP-d2 and (B) an exemplary PDMS-MDEA-UU in CDCl$_3$.
Figure 4:
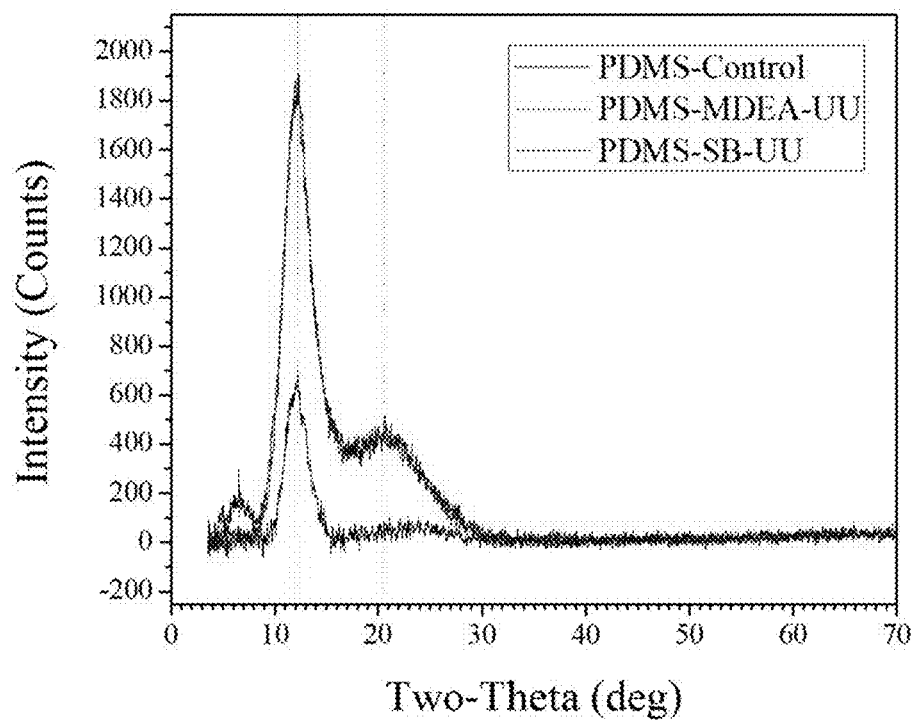
FIG. 4 depicts X-ray diffraction (XRD) spectra of control PDMS, PDMS-MDEA-UU, and PDMS-SB-UU solvent-cast films.

In one aspect or embodiment, a bodily fluid-contacting device 50 comprising one or more surfaces 60 can be coated with a zwitterionic polymer composition 10, as shown in FIG. 3, to form a coated bodily-fluid contacting device 70. In some embodiments, the coated bodily fluid-contacting device 70 is non-thrombogenic when contacted with blood. The coated body fluid-contacting device 70 may be any device used for contact with blood, for example for prolonged contact with blood in vivo, such as a medical implant.

In some aspects or embodiments, the bodily-fluid contacting device 50 is a polydimethylsiloxane, polyurethane, or polypropylene bodily-fluid contacting device. In some aspects or embodiments, the bodily-fluid contacting device 50 is a blood-contacting device. In some aspects or embodiments, the blood-contacting device is device that can be implanted into a patient. Non-limiting examples of blood-contacting implantable devices include stents, coils, catheters, vascular grafts, and artificial valves.

In some aspects or embodiments, the blood-contacting device is a non-implantable device. Non-limiting examples of non-implantable bodily fluid-contacting devices include microfluidic devices and gas exchange fiber membranes of extracorporeal membrane oxygenators. Gas exchange fiber membranes of extracorporeal membrane oxygenators coated with the zwitterionic polymer composition 10 are coated such that the addition of the polymer composition does not substantially affect the gas permeability of the membrane and/or the polymer composition forms part of a gas-permeable membrane. The zwitterionic polymer composition 10 may be coated on the gas exchange fiber membranes of extracorporeal membrane oxygenators at a thickness of less than 1 micron (μm). Microfluidic devices coated with the zwitterionic polymer composition 10 can be used for the analytical analysis of bodily-fluids. The coating thickness can be varied, for example and without limitation, between 0.1 μm and 100 μm in thickness.

The bodily-fluid contacting device 50 can be coated with the zwitterionic polymer composition 10 to form a coated bodily fluid-contacting device 70 by methods known in the art, such as electrospinning, dip coating, an interpenetrating polymer network technique, spray coating, curtain coating, or doctor (or draw-down) blade coating.

The interpenetrating polymer network technique can be used to coat poly(dimethylsiloxane) based bodily-fluid contacting devices. The zwitterionic polymer composition coated bodily-fluid contacting device 70 is contacted with a suitable solvent, such as tetrahydrofuran, to interlace the zwitterionic polymer composition 10 into the poly(dimethylsiloxane) network of the bodily-fluid contacting device 50 (see, also, C. V. Rumens, M. A. Ziai, K. E. Belsey, J. C. Batchelor and S. J. Holder, *J. Mater. Chem. C*, 2015, 3, 10091-10098 for PDMS-swelling solvents).

A method of preparing a body fluid-contacting device coated by a zwitterionic polymer composition is provided herein. In the method, a body fluid-contacting device having one or more surfaces is coated with the zwitterionic polymer composition as described in herein.

An additional method of preparing a body fluid-contacting device coated by a zwitterionic polymer composition is provided herein. In the method, a body fluid-contacting device having one or more surfaces is coated with a poly(urethane urea) copolymer having poly(dialkylsiloxane) blocks, wherein the poly(urethane urea) copolymer is prepared by the copolymerization of a poly(dialkylsiloxane) diol, a diisocyanate, a tertiary amine alkyl diol, and a poly(dialkylsiloxane) diamine. The bodily-fluid contacting device coated with the poly(urethane urea) copolymer is contacted with a substituted saturated heterocyclic compound to react the substituted saturated heterocyclic with the tertiary amine of the poly(urethane urea) copolymer to introduce zwitterionic groups into the poly(urethane urea) copolymer backbone.

The zwitterionic polymer composition 10 prepared according to the present disclosure can be electrospun into small-diameter vascular grafts. The zwitterionic polymer composition 10 can be dissolved in a suitable solvent, such as hexafluoro-2-propanol, to form a polymer-containing fluid.

Electrodeposition, e.g., electrospinning, can be used to deposit the zwitterionic polymer composition described herein, e.g., onto a surface of a blood-contacting device.

Optionally, other liquids, gels, polymers, biological or therapeutic agents, mammalian blood product, cell culture media, buffers, drug products, antibodies, etc. may be co-electrodeposited, e.g., electrospun or electrosprayed with the zwitterionic polymer composition. In its simplest sense, electrodeposition is caused by the deposit of a liquid composition, such as polymer fibers in the case of electrospinning, onto a target surface in the case of a single electrode and/or to a deposition axis or space created by and between spatially distanced electrodes. Electrospinning methods are well-known in the field of tissue engineering and can be conducted in any useful manner.

The process of electrospinning involves placing a polymer-containing fluid (for example, a polymer solution, a polymer suspension, or a polymer melt) in a reservoir equipped with a small orifice, such as a needle, pipette tip, metal tube, or other metal structure referred to herein as a nozzle and also can be referred to as a spinneret, and a metering pump, such as a syringe pump or a peristaltic pump. One electrode of a high voltage source is placed in electrical contact with the polymer-containing fluid or orifice, while another electrode is placed in electrical contact with a target (traditionally, typically a collector screen or rotating mandrel). During electrospinning, the polymer-containing fluid is charged by the application of high voltage to the solution or orifice (for example, about 3-15 kV) and then forced through the small orifice by the metering pump that provides steady flow.

While the polymer-containing fluid at the orifice normally would have a hemispherical shape due to surface tension, the application of the high voltage causes the otherwise hemispherically-shaped polymer-containing fluid at the orifice to elongate to form a conical shape known as a Taylor cone. With sufficiently high voltage applied to the polymer-containing fluid and/or orifice, the repulsive electrostatic force of the charged polymer-containing fluid overcomes the surface tension and a charged jet of fluid is ejected from the tip of the Taylor cone and accelerated towards the target, target deposition axis or target deposition space, which typically is biased (electrically charged) so that the total voltage difference between the nozzle and the target is sufficiently large to cause effective electrodeposition, e.g., 20 kV, though other potentials and polarities are able to achieve effective electrodeposition, for example, between −2 and −20 kV. Optionally, a focusing ring with an applied bias (for example, 1 to 10 kV) can be used to direct the trajectory of the charged jet of polymer-containing fluid.

Relative charges of the nozzle and electrodes may be the reverse polarity e.g., with the target, target deposition axis or target deposition space, which typically is biased (electrically charged) between 2 to 10 kV, and the nozzle being charged between from −3 to −15 kV. As the charged jet of fluid travels towards the biased target, target deposition axis or target deposition space, the solvent typically evaporates during mid-flight, leaving behind a polymer fiber on the biased target, at the target deposition axis, or within the target deposition space. If the fluid is a polymer melt, the molten polymer cools and solidifies in mid-flight and is collected as a polymer fiber on the biased target, at the target deposition axis, or within the target deposition space. As the polymer fibers accumulate on the biased target, at the target deposition axis, or within the target deposition space, a non-woven, porous mesh is formed.

A small-diameter vascular graft electrospun formed from a polymer-containing fluid comprising the zwitterionic polymer composition 10 can have an internal diameter or less than 6 millimeters (mm), such as about 1 mm, 2 mm, 3 mm, 4 mm, or 5 mm. The tubular structure may be formed by electrospinning on a mandrel, by dipping of a form into a polymer solution, by molding, or by any other useful method for formation of polymeric structures.

A polysiloxane elastomer comprising a zwitterionic moiety is provided herein. The polysiloxane elastomer having a zwitterionic moiety can be prepared by reacting a diallyl tertiary amine compound and a substituted saturated heterocylic compound to form a diallyl zwitterionic macromer; and copolymerizing a vinyl terminated poly(dialkylsiloxane) and the diallyl zwitterionic macromer with a curing agent to introduce a zwitterionic group into the poly(dialkylsiloxane) elastomer.

The polysiloxane elastomer comprising a zwitterionic moiety may be formed by cross-linking, where the elastomer is cross-linked by any useful method. For example, in hydrosilation, an olefinic group, e.g., a vinyl group in a vinyl-terminated polysiloxane is crosslinked to an —Si—H group in the presence of a platinum catalyst. According to one non-limiting example, the elastomer is prepared by cross-linking a mixture of: a first composition comprising a vinyl terminated poly(dialkylsiloxane) and a diallyl zwitterionic macromer; and a second composition as a curing agent comprising a polysiloxane, such as one or both of a polydimethylsiloxane and a dimethyl, methylhydrogen siloxane, and a catalyst, such as hexachloro palatinate or a ruthenium-based catalyst.

The vinyl terminated poly(dialkylsiloxane) and the diallyl zwitterionic macromer can be mixed with a curing agent to fully cross-link (including as a class, substantially and essentially fully cross-linked realizing that in reality it may not be possible to cross-link every polysiloxane molecule). Full cross-linking may be achieved by including a sufficient amount of cross-linking compounds in the elastomer.

The vinyl terminated poly(dialkylsiloxane) may be a poly(dialkylsiloxane) having the structure:

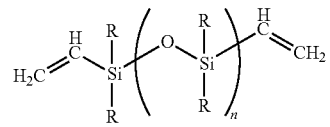

where R is an organic group or hydrogen and n is greater than 1, e.g., from 10 to 200 or from 10 to 50, for example, for poly(dimethyl siloxane), n may range from 15 to 175 (approximating Mn=1,000 to 10,000), or from 15 to 35 (approximating Mn=1,000 to 10,000). As described herein above, non-limiting examples of poly(dialkylsiloxane) are dimethyl siloxane; diphenylsiloxane; diethylsiloxane; trifluoropropyl methyl siloxane; phenylmethylsiloxane; a copolymer of dimethylsiloxane with one or more of a diphenylsiloxane, a diethylsiloxane, a trifluoropropyl methyl siloxane, and/or a phenylmethylsiloxane, and an aminopropylmethylsiloxane-dimethylsiloxane.

The vinyl terminated poly(dialkylsiloxane) can have an Mn of from 250-100,000, such as from 1,000-30,000, e.g., 10,000, or 25,000.

The vinyl terminated poly(dialkylsiloxane) can be poly(dimethyl siloxane). In one non-limiting example, the vinyl-terminated poly(dialkylsiloxane) is Sylgard® 184. Additional vinyl-terminated poly(dialkylsiloxane)s are commercially-available.

Sylgard® 184 is a silicone elastomer comprising a polydimethyl siloxane and an organically-modified silica (e.g., ORMOSIL). Sylgard® 184 is prepared by combining a base (Part A) with a curing agent (Part B). The base includes a siloxane (dimethylvinyl-terminated dimethyl siloxane) and an ORMOSIL (dimethylvinylated and trimethylated silica) in a solvent (ethyl benzene). The curing agent also includes a mixture of siloxanes and an ORMOSIL in a solvent, including: dimethyl, methylhydrogen siloxane; dimethylvinyl-terminated dimethyl siloxane; dimethylvinylated and trimethylated silica; tetramethyl tetravinyl cyclitetra siloxane; and ethyl benzene.

The diallyl tertiary amine compound may have the structure

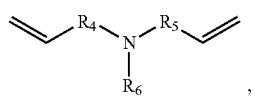

wherein $R_4$, and $R_5$, are independently

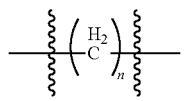

where n is at least one, and $R_6$ is linear alkyl. $R_4$ and $R_5$ each independently may be linear or branched alkyl comprising any number of carbon atoms, for example up to 100, up to 90, up to 75, up to 50, up to 25, up to 20, or up to 10 carbon atoms, such as linear or branched $C_1$-$C_6$ alkyl. $R_6$ may be a linear or branched alkyl comprising any number of carbon atoms, for example up to 100, up to 90, up to 75, up to 50, up to 25, up to 20, or up to 10 carbon atoms, such as linear or branched $C_1$-$C_6$ alkyl. In some aspects or embodiments, $R_6$ is a $C_1$, or methyl. Non-limiting examples of a diallyl tertiary amine compound include diallyl methylamine, diallylethylamine, N,N-diallylpropylamine, N-butyldiallylamine, dodecyl-N,N-diallylamine, or other compounds with longer alkyl chains. In one aspect or embodiment, the diallyl tertiary amine compound is diallyl methylamine.

The diallyl tertiary amine compound may be modified at the tertiary amine to form a zwitterionic group, such as a quaternary amine with a pendant, negatively-charged, (e.g., carboxylate) group, such as a pendant ethanoate group. For example and without limitation, as shown herein, the diallyl tertiary amine compound may be functionalized with a zwitterionic group to form a diallyl zwitterionic macromer. To form the diallyl zwitterionic macromer, zwitterionic groups are attached (for example, covalently) to the diallyl tertiary amine compound through a ring opening reaction with a substituted saturated heterocyclic compound. In the ring opening reaction, the substituted saturated heterocyclic compound is reacted with the tertiary amine of the diallyl tertiary amine compound to introduce a zwitterionic group. Non-limiting examples of zwitterionic groups include sulfobetaine (SB), phosphobetaine (PB), and carboxybetaine (CB) groups.

The substituted saturated heterocyclic compound used to form the diallyl zwitterionic macromer can be any of the substituted saturated heterocyclic compounds described herein above. In one aspect or embodiment, the substituted saturated heterocyclic compound can be 1,3-propanesultone, β-propriolactone, or 2-chloro-1,3,2-dioxaphospholane 2-oxide. In one aspect or embodiment, the substituted saturated heterocyclic compound is 1,3-propanesultone.

A method of forming a polysiloxane elastomer comprising a zwitterionic moiety is provided herein. In the method, a diallyl zwitterionic macromer is prepared by reacting a diallyl tertiary amine compound and a substituted saturated heterocylic compound. A vinyl terminated poly(dialkylsiloxane) and the diallyl terminated zwitterionic macromer are mixed with a curing agent. The mixture is cured to introduce a zwitterionic group into the poly(dialkylsiloxane) elastomer.

In one aspect or embodiment, the vinyl terminated poly(dialkylsiloxane) and diallyl zwitterionic macromer are mixed in a molar ratio of 1-5:1-12, e.g., 1:2, 1:1, or 2:1.

In one aspect or embodiment, the molar ratio of the mixture of vinyl terminated poly(dialkylsiloxane) and diallyl zwitterionic macromer to the curing agent is 9:1 or 10:1.

An additional method of forming a polysiloxane elastomer comprising a zwitterionic moiety is provided herein. In the method, a vinyl terminated poly(dialkylsiloxane) is mixed with a diallyl tertiary amine compound and a curing agent. The mixture is cured to form a cross-linked tertiary amine modified poly(dialkylsiloxane). The cross-linked tertiary amine modified poly(dialkylsiloxane) is reacted with a substituted saturated heterocyclic compound to introduce a zwitterionic group into the poly(dialkylsiloxane) elastomer.

Example 1

Polydimethylsiloxane (PDMS) is commonly used in medical devices because it is non-toxic and stable against oxidative stress. Relatively high blood platelet adhesion and the need for chemical crosslinking through curing, however, limit its utility. In this example, a biostable PDMS-based poly(urethane urea) bearing zwitterion sulfobetaine (PDMS-SB-UU) was synthesized for potential use in the fabrication or coating of blood-contacting devices, such as conduits, artificial lungs, and microfluidic devices. The chemical structure and physical properties of synthesized PDMS-SB-UU were confirmed by 1H-nuclear magnetic resonance ($^1$H-NMR), X-ray diffraction (XRD), and uniaxial stress-strain curve. In vitro stability of PDMS-SB-UU was confirmed against lipase and 30% $H_2O_2$ for 8 weeks, and PDMS-SB-UU demonstrated significantly higher resistance to fibrinogen adsorption and platelets depositions compared to control PDMS. Moreover, PDMS-SB-UU showed a lack of hemolysis and cytotoxicity with whole ovine blood and rat vascular smooth muscle cells (rSMCs), respectively. The PDMS-SB-UU was successfully processed to small-diameter (0.80±0.05 mm) conduits by electrospinning and coated onto PDMS-, polyurethane-, and polypropylene-based blood-contacting biomaterials due to its unique physicochemical characteristics from its soft- and hard-segments.

Materials and Methods

Materials: Poly(dimethylsiloxane), bis(hydroxyalkyl) terminated (PDMS-diol, Mn ~5,600), poly(dimethylsiloxane), bis(3-aminopropyl) terminated (PDMS-diamine, Mn ~2,500), N-methyldiethanolamine (MDEA, ≥99%), 4,4'-diphenylmethane diisocyanate (MDI, 98%), Tin(II) 2-ethylhexanoate (Sn(Oct)2, 92.5-100.0%), 1,2-dichloroethane (DCE, anhydrous, 99.8%), methanol (MeOH, anhydrous, 99.8%), 1,3-propanesultone (PS, 98%), tetrahydrofuran (THF, anhydrous, ≥99.9%), hexamethyldisilazane (HMDS, ≥99%), hydrogen peroxide solution ($H_2O_2$, 30%), and lipase from *Thermomyces lanuginosus* (≥100,000 u/g) were purchased from Sigma-Aldrich (St. Louis, MO, USA). 1,1,1,3,3,3 Hexafluoro-2-propanol (HFIP) was purchased from Oakwood Chemical (Estill, SC, USA). Drabkin's reagent was purchased from RICCA Chemical Company (Arlington, TX, USA). Lactate dehydrogenase (LDH) activity assay kit was purchased from Takara Bio Inc. (Kusatsu, Shiga Prefecture, Japan). Sylgard® 182 Silicone Elastomer Kit was purchased from Dow Corning Corporation (Midland, MI, USA). Celltiter 96 AQueous One Solution Cell Proliferation Assay (MTS assay) was purchased from Promega (Madison, WI, USA). Dulbecco's modified eagle medium (DMEM), heat inactivated fetal bovine serum (HI FBS), and penicillin-streptomycin (Pen Strep) were purchased from Gibco® (Gaithersburg. MD, USA). Micro BCA protein assay kit was purchased from Thermo Fisher Scientific (Waltham, MA, USA). ePTFE vascular graft (IMPRA® ePTFE Flex) was obtained from Becton Dickinson (Covington, GA, USA).

Synthesis of PDMS-based zwitterionic polyurethane-urea copolymer (PDMS-SB-UU): A new PDMS-PUU copolymer was synthesized from Poly(dimethylsiloxane), bis(hydroxyalkyl) terminated (PDMS-diol), poly(dimethylsiloxane), bis (3-aminopropyl) terminated (PDMS-diamine), N-methyldiethanolamine (MDEA), and 4,4'-diphenylmethane diisocyanate (MDI) (FIG. 2). Briefly, 1 gram (g) MDEA and 11.9 g PDMS-diol were dissolved in 150 mL DCE at 40° C. with nitrogen inlet-outlet equipment. 3.2 g of MDI and a catalytic amount of stannous octoate $(Sn(Oct)_2)$ were added to the reactor followed by the reaction at 40° C. After 3 hours of reaction time, 5.3 g PDMS-diamine in 50 milliliters (mL) DCE was slowly dropped in the reactor for another 12 hours of reaction time at 40° C. After the reaction, final product was precipitated and washed with excess methanol. 16 g product (PDMS-MDEA-UU, yield: 75%) was obtained after drying under vacuum at 60° C.

Figure 5A:
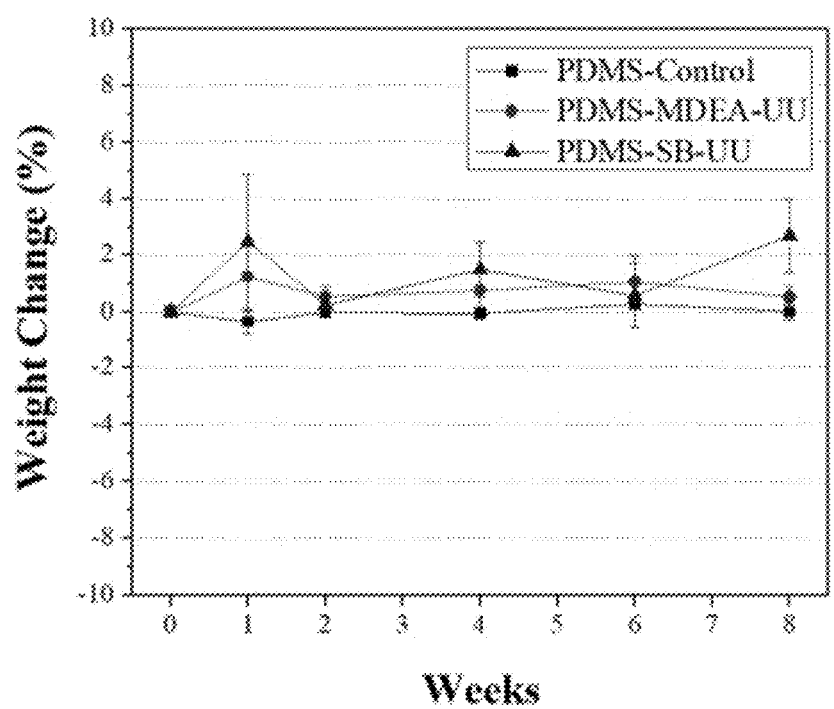
FIGS. 5A-5B are graphs depicting the in vitro long-term stability studies in an enzyme solution using 100 U/mL lipase (FIG. 5A) and oxidative treatment using 30% H$_2$O$_2$ solution (FIG. 5B). The weight change versus exposure time was determined over 8 weeks (n=3) for FIG. 5B.
Figure 5B:
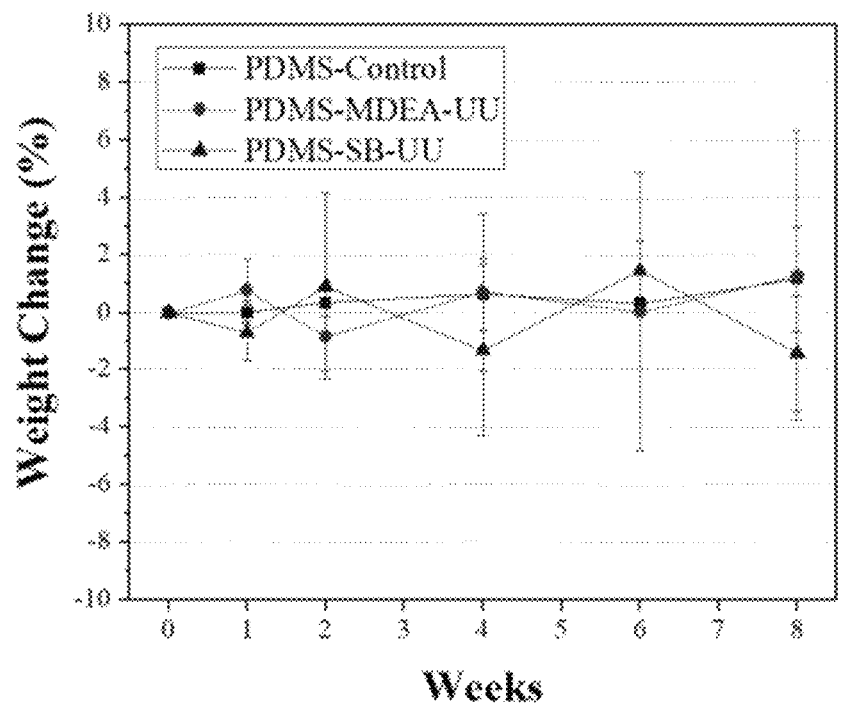

The PDMS-MDEA-UU was converted to zwitterionic PDMS-PUU bearing SB by reaction with 1,3-propanesultone (PS). Briefly, 5 g PDMS-MDEA-UU and 0.8 mL PS were dissolved in a mixture of 100 mL dichloroethane and 50 mL THF and then reacted at 50° C. overnight. After the reaction, the reaction solution was condensed under vacuum at 50° C. and then precipitated in excess MeOH. 3.9 g fine powder (PDMS-SB-UU, yield: 67%) was obtained after the precipitate was filtered and dried under vacuum. The chemical structure of synthesized copolymers PDMS-MDEA-UU and PDMS-SB-UU were confirmed by $^1$H-nuclear magnetic resonance ($^1$H NMR, Bruker, Karlsruhe, Germany, Avance III, 400 MHz) (FIG. 5).

Characterization of synthesized PDMS-based zwitterionic polyurethane-urea copolymer: The PDMS-MDEA-UU and PDMS-SB-UU were fabricated as films via simple solvent-casting. Briefly, 0.5 g copolymer was dissolved in 10 mL HFIP and poured into a Teflon dish (diameter: 6 cm). The copolymer solution was dried at room temperature overnight to obtain a film (thickness: 0.12±0.02 mm). PDMS-control films were fabricated from a Sylgard® 182 Silicone Elastomer Kit. Briefly, Sylgard® 182 and Sylgard 182® curing agent were mixed at 10:1 and poured into a Teflon dish (diameter: 6 cm). The PDMS was moved to a fume hood for 30 min and then moved to an oven at 60° C. to obtain a film (thickness: 0.12±0.03 mm). Sample films were cut into dumbbell-shaped strips (2×18 mm) and their mechanical strength assessed using an MTS Tytron 250 MicroForce Testing Workstation with a crosshead speed of 25 mm/min. Based on the evaluation, the initial modulus, tensile strength, and breaking strain were calculated. The prepared solvent-cast films were also characterized by an X-ray diffraction (XRD, Bruker, Karlsruhe, Germany, D8 Discover) system to confirm their typical semi-crystalline characteristics.

In vitro stability studies against enzyme using lipase and against oxidative stress using $H_2O_2$ solution: PDMS-MDEA-UU and PDMS-SB-UU films were prepared by solvent casting, and PDMS-control films were fabricated as described above. These films were punched in to circular samples (diameter: 8 mm) and then washed with 50% EtOH and Dulbecco's Phosphate Buffered Saline (DPBS) several times before use. Dried samples were weighed (W0) and then immersed in 10 mL of 100 U lipase or 30% $H_2O_2$ for storage at 37° C. The 100 U lipase or 30% $H_2O_2$ was refreshed every other week. At time points of 1, 2, 4, 6, and 8 weeks, three samples of each copolymer or control film were removed and washed several times with 1% Triton® X-100 surfactant solution, 50% ethanol, and distilled water in sequential order. The weight of washed samples ($W_1$) was recorded after drying under vacuum at 60° C. for 2 d. The degradation of samples was evaluated by a change of mass (%) as $((W_1-W_0)-1)\times 100$.

In vitro gas permeability test of solvent-cast PDMS-SB-UU film: The gas permeability of PDMS-control and PDMS-SB-UU films for $CO_2$ and $O_2$ were evaluated using previously described methods (Merkel, T. C. et al., Gas sorption, diffusion, and permeation in poly(dimethylsiloxane. *J. Polym. Sci. Part B Polym. Phys.*, 2000, 38, 415-434; Eash, H. J. et al. Evaluation of plasma resistant hollow fiber membranes for artificial lungs. *ASAIO J.*, 2004, 50, 491-497). Briefly, circular film samples (diameter: 10 mm, thickness: 0.10±0.03 mm) were assessed at room temperature within a custom acrylic test fixture. The test fixture positions the film between sealed inlet and outlet gas manifolds and supports the film with a porous metal mesh to prevent film deflection under application of transmural gas pressure. The inlet manifold was connected to a gas ($O_2$ or $CO_2$) source via a pressure regulator while the outlet manifold was connected to a capillary bubble flow meter (Supelco Inc, Bellefonte, PA, USA). A digital manometer (Series 490A Hydronic Differential Pressure Manometer, Dwyer Instruments Inc, Michigan City, IN, USA) was connected to the gas inlet and outlet to continuously measure transmural pressure across the film. After purging the entire system with the test gas, the pressure regulator was adjusted to induce a transmural pressure of 350 mmHg. Volumetric gas flow rate through the film was measured in triplicate via the bubble flow meter and used to calculate permeability based on previously described methods (Merkel et al.). Four samples across two different fabrication batches were used for evaluation of each film type.

In vitro anti-fouling studies against fibrinogen and platelet: Anti-fouling activity of PDMS-control, PDMS-MDEA-UU, and PDMS-SB-UU films was evaluated against fibrinogen and platelets. For the studies, films were punched in to circular samples (diameter: 8 mm, thickness: 0.12±0.02 mm) and washed with 50% EtOH and then DPBS several times.

For the fibrinogen adsorption test, circular film samples were immersed in 5 mL of 0.45 g/10 mL fibrinogen solution in no additive (Z) tubes (BD Vacutainer®, Becton, Dickinson and Company, Franklin, NJ, USA) separately. The tubes were gently rocked for 2 hours, the fibrinogen solution was drained, and the samples were rinsed with DPBS to remove non-adherent fibrinogen. After washing, the samples were immersed in 1 mL of 1% sodium dodecyl sulfate (SDS) solution separately using fresh polystyrene round-bottom tubes. The samples in 1% SDS were sonicated for 30 min at 50-60 Hertz (Hz) using an ultrasonic cleaner (Laboratory Supplies CO., INC, Hicksville, NY, USA) followed by vortexing for 5 minutes using a vortexer (Barnstead International, Dubuque, IA, USA). The sonication and vortexing were performed three times for detaching attached fibrinogen on the surface. After debris of the solution was spun down using a centrifuge (Sorvall® Legend RT, Marshall Scientific, Hampton, NH, USA) at 2,000 g for 15 minutes, 100 microliters (µL) of supernatant from each tube was transferred to a 96 well plate. Diluted fibrinogen standard solution and Micro BCA working reagent were prepared following the Micro BCA protein assay kit instruction. 100 µL of BCA reagent was added to the supernatant in each well of the plate and incubated at 37° C. for 1 hour. The absorbance of the plate was read at 562 nm using a microplate reader (SpectraMax, Molecular Devices, San Jose, CA, USA).

Platelet deposition on the PDMS-SB-UU was quantified from contact with whole ovine blood collected in sodium citrate tube by jugular venipuncture. National Institutes of Health (NIH) guidelines for the care and use of laboratory animals were observed, and all animal procedures were approved by the Institutional Animal Care and Use Committee (IACUC) at the University of Pittsburgh. Circular film samples of PDMS-control, PDMS-MDEA-UU, PDMS-SB-UU were prepared as described above. The samples were immersed in 5 mL of fresh ovine blood in no additive (Z) tubes separately and then the tubes were gently rocked for 3 hours at 37° C. After rinsing of non-adherent platelets with DPBS, the number of deposited platelets on the samples was quantified by LDH assay or observed by scanning electron microscope (SEM, JSM 6335F, JEOL, Tokyo, Japan).

For the LDH activity assay, the washed samples were immersed in 1 mL of 2% Triton™×100 in DPBS and then stirred for 20 min to lyse the deposited platelets on the sample. The lysis solution was centrifuged at 250 g for 10 minutes and then its supernatant was reacted with the LDH reagent. The absorbance of the reacted solution was recorded at 490 and 650 nm to quantify the amount of platelet deposition. To observe the morphology of the deposition of platelets on the surface of samples, after the washing, attached platelets were fixed by immersing in 2.5% glutaraldehyde solution for 2 h. The fixed platelets were dehydrated using 30, 50, 75, 95, and 100% EtOH and then treated with hexamethyldisilazane in sequence. SEM images were taken after sputter coating with gold/palladium.

In vitro hemolysis assay: Hemocompatibility of PDMS-MDEA-UU, PDMS-SB-UU, and ePTFE was evaluated following the Standard Practice for Assessment of Hemolytic Properties of Materials from the American Society for Testing and Materials (ASTM F756-17). Briefly, the hemoglobin concentration of fresh ovine blood collected in sodium citrate tube by jugular venipuncture was evaluated by a Radiometer OSM3 Hemoximeter (Kestrel Labs, Inc., Boulder, CO, USA) and then adjusted to 8 grams per deciliter (g/dL) with calcium and magnesium free phosphate-buffered saline (PBS) at pH 7.4. PDMS-MDEA-UU, PDMS-SB-UU, and ePTFE samples washed with 50% EtOH and DPBS were immersed in 5 mL of the whole blood in no additive (Z) tubes at 37° C. for 3 hours, separately. After contacting the samples, the blood was removed and centrifuged at 750 g for 15 minutes. 1 mL of supernatant was taken to react with 1.0 mL Drabkin's reagent for 15 minutes. The absorbance of the reacted solution was recorded at 540 nanometers (nm). The adjusted ovine blood was used as a negative control. The % hemolysis (hemolytic index) was calculated as: % hemolysis=(supernatant hemoglobin concentration×100%)/(total hemoglobin concentration in tube). According to the ASTM F756-17, a material is considered nonhemolytic if the % hemolysis is less than 2%, slightly hemolytic if between 2% and 5%, and hemolytic if greater than 5%.

In vitro cytotoxicity test: Cytotoxicity of PDMS-MDEA-UU and PDMS-SB-UU was evaluated by the extract test (Wang, M. O. et al. Evaluation of the in vitro cytotoxicity of cross-linked biomaterials. *Biomacromolecules*, 2013, 14: 1321-1329). Rat vascular smooth muscle cells (rSMC) were cultured in Dulbecco's modified Eagle medium (DMEM) with 10% heat-inactivated fetal bovine serum (HI FBS) and 1% penicillin/streptomycin at 37° C. and 5% $CO_2$ prior to use. For the test, rSMCs were seeded at $2.5 \times 10^4$ per 100 µL per well in 96-well plates and then kept in an incubator overnight to allow attachment of rSMCs. After unattached cells were washed out with DPBS, 100 µL of each elution medium of PDMS-control, PDMS-MDEA-UU, and PDMS-SB-UU were added to each well. The elution medium of samples was prepared by immersing 100 mg of samples in 5 mL of the cell culture medium at 37° C. for 1, 3, 7, 15, or 30 days and then kept at −80° C. prior to use (Kim, S. et al., Reversibly pH-responsive polyurethane membranes for on-demand intravaginal drug delivery. *Acta Biomater.*, 2017, 47, 100-112). Negative control was polymer-free cell culture medium and positive control was 1 molar (M) acrylamide in cell culture medium filtered using a 0.2 micrometer (µm) membrane. After 24 hours from adding the elution medium, 20 µL MTS solution was added to each well followed by incubating at 37° C. and 5% $CO_2$ in an incubator. The absorbance of the plates was recorded at 490 nm using a microplate reader.

In vitro rSMC attachment study Circular samples of PDMS control, PDMS-MDEA-UU and PDMS-SB-UU films were sterilized for 15 minutes in 50% ethanol three times and subsequently washed in PBS for 15 minutes three times. Samples were then exposed to UV light for 20 minutes. All of the samples were immersed in Dulbecco's Modified Eagle Medium (DMEM) with 10% of FBS and 1% of penicillin/streptomycin overnight before use. rSMC were cultured in Dulbecco's Modified Eagle Medium (DMEM) with 10% of FBS and 1% of penicillin/streptomycin. The rSMC were seeded on sterilized sample films using 50 µL of cell suspension at a concentration of $3.75 \times 10^5$ per 100 µL. Seeded sample films were then incubated at 37° C. with 5% $CO_2$ for 4 h. After the incubation time, the seeded films were transferred to 48-well tissue culture plates (one film per well) with 200 µl of fresh medium. To test cell viability, films were transferred to new 48-well tissue culture plates and incubated in 150 µL MTS solution for 1 hour. From each treated sample, 100 µL of supernatant was taken and added in a 96 well plate. The plate was read at 490 nm with a microplate reader at 24 hours, 3 days, and 7 days after cell seeding.

Fabrication of small-diameter conduits using PDMS-SB-UU: Small conduits (inner diameter: 0.80±0.05 mm) were fabricated using PDMS-MDEA-UU and PDMS-SB-UU via electrospinning to confirm polymer processability. Briefly, 12 wt % polymer in HFIP was applied for 30 min to a rod collector (diameter: 1 millimeter (mm)) rotating at 250 revolutions/minute with an applied voltage on the nozzle (8 kV) and collector (−8 kV), a polymer solution feed rate of 1.5 mL/h, and nozzle-to-collector distance of 18 centimeters (cm). The fabricated conduit was dried at room temperature after being washed with 50% EtOH. SEM images of cross-section and lumen surface of the PDMS-SB-UU conduit were taken to observe its morphology.

Suture retention strength of electrospun PDMS-MDEA-UU, PDMS-SB-UU, and ePTFE grafts was evaluated following a protocol adapted from the methods described in ANSI/AAMI/ISO7198:1998/2001/(R) 2004, "Cardiovascular implants tubular vascular prostheses". Briefly, grafts were cut to 1 cm and sutured with Ti-Cron™ coated braided polyester surgical suture at a minimum distance of 2 mm from the samples free end. The suture retention strength was measured using an MTS Tytron 250 MicroForce Testing Workstation with a crosshead speed of 25 millimeters per minute (mm/min).

Coating test of PDMS-SB-UU to cured commercially available PDMS matrix: To evaluate the potential for coating PDMS-SB-UU onto PDMS-based microfluidic devices, 2% (wt/vol) PDMS-SB-UU in HFIP or DCM/HFIP (50/50) mixture were applied to a commercially available PDMS (Sylgard® 182 Silicone Elastomer Kit) matrix after thermal curing. Briefly, PDMS-control film (thickness: 431±34 μm) was fabricated as described in the previous section. The PDMS-control film was punched into a circular sample (diameter: 8 mm). The PDMS-control samples were coated with 2% (weight/volume) PDMS-SB-UU in HFIP by a simple dip-coating method. The sample was dipped in the 2% PDMS-SB-UU and allowed to dry at ambient condition. The procedure was repeated three times. To increase the penetrating amount of PDMS-SB-UU through the PDMS-control matrix, dichloromethane was used as a mixture with HFIP (DCM/HFIP=50/50, vol/vol) to prepare 2% PDMS-SB-UU in the mixed solvent. DCM causes swelling of PDMS elastomer (Rumens, C. V. et al., Swelling of PDMS networks in solvent vapors; applications for passive RFID wireless sensors. *J. Mater. Chem. C*, 2015, 3: 10091-10098) and this swollen status may increase the penetration efficiency of PDMS-SB-UU through the matrix. A PDMS-control sample was immersed in a mixed solvent for 1 hour and then removed for drying. After the swollen coating, the PDMS-control sample was dip-coated as described above as well. The coating was confirmed by scanning electron microscope and energy-dispersive X-ray (SEM and EDX, Scios DualBeam, Thermo Scientific, Waltham, MA, USA) spectroscopy. For the preparation of the cross-section of the samples, coated samples were immersed in liquid nitrogen and cut by a surgical-grade blade (PERSONNA®, Verona, Virgina, USA). The cut samples were mounted and sputter-coated with gold/palladium at 2 nm. Imaging and element analysis were operated with an accelerating voltage of 5 kiloVolts (kV), a beam current of 0.1 nanoamps (nA) and a 10 mm working distance.

PDMS-SB-UU coating tests on blood-contacting medical devices: To evaluate potential application with clinically used medical devices, PDMS-SB-UU was coated on medical grade polyurethane indwelling catheters (ASK-04200-UPM, ARROW® international Inc.), silicone Foley catheters and a commercial polypropylene hollow fiber membrane mat (Celgard™, Membrana, GmbH, Wuppertal, Germany) using 0.2 weight percent (wt %) of PDMS-SB-UU in trifluoroethanol solution by dip-coating.

Statistical analyses: Data are presented as mean±standard deviation (SD). The n-value refers to the number of replicates for each test. One-way ANOVA along with Tukey's test for multiple comparisons was performed. P<0.05 was considered statistically significant.

Results

Synthesis and characterization of PDMS-based zwitterionic poly(urethane urea) copolymer (PDMS-SB-UU): PDMS-PUU was successfully synthesized using PDMS-diol, MDEA, MDI, and PDMS diamine and converted to zwitterionic PDMS-PUU using PS. The PS was reacted with the tertiary amine of MDEA and formed SB. PDMS-diol and PDMS-diamine were used as a soft segment and chain extender of the PDMS-PUUs, respectively. The conversion of MDEA to SB was confirmed from the comparison of $^1$HNMR spectrum of PDMS-DMEA-UU and PDMS-SB-UU (FIG. 5). Typical methylene proton peaks of SB I, m, and n were observed at 2.87~2.98, 1.37~1.48, and 3.11~3.31 ppm, respectively.

$^1$H NMR (CDCl$_3$) of PDMS-MDEA-UU: δ -0.20~0.15 (6H$_{dimethylsiloxane}$, CH$_3$—Si(R)—CH$_3$), 0.38~0.50 (4H$_{PDMS-diamine}$, CH$_2$—CH$_2$—CH$_2$—Si(CH$_3$)$_2$—O), 0.69~0.81 (4H$_{PDMS-diol}$, CH$_2$—CH$_2$—CH$_2$—Si(CH$_3$)$_2$—O), 1.32~1.63 (8H$_{PDMS-diol\ and\ PDMS-damine}$, CH$_2$—CH$_2$—CH$_2$—Si(CH$_3$)$_2$—O), 2.18~3.56 (4H$_{PDMS-damine}$, H$_2$N—CH$_2$—CH$_2$—CH$_2$—Si(CH$_3$)$_2$—O), 2.56~2.72 (8H$_{PDMS-diol}$, OH—CH$_2$—CH$_2$—O—CH$_2$—CH$_2$), 3.07~3.17 (3H$_{MDEA}$, OC—O—CH$_2$—CH$_2$—N$_+$(CH$_3$)—CH$_2$—CH$_2$—O—CO), 3.32~3.40 (4H$_{PDMS-diol}$, OH—CH$_2$—CH$_2$—O—CH$_2$CH$_2$), 3.60~3.84 (2H$_{MDI}$, OCN—C$_6$H$_4$—CH$_2$—C$_6$H$_4$—NCO), 4.09~4.25 (8H$_{MDEA}$, OC—O—CH$_2$—CH$_2$—N$_+$(CH$_3$)—CH$_2$—CH$_2$O—CO), and 6.82~7.26 (8H$_{MDI}$, OCN—C$_6$H$_4$—CH$_2$—C$_6$H$_4$—NCO).

$^1$H-NMR (HFIP-D2) of PDMS-SB-UU: δ -0.09~0.12 (6H$_{dimethylsiloxane}$, CH$_3$—Si(R)—CH$_3$), 0.37~0.47 (8H$_{PDMS-diol\ and\ PDMS-damine}$, CH$_2$CH$_2$—CH$_2$Si(CH$_3$)$_2$—O), 1.37~1.48 (2HSB, OC—O—CH$_2$—CH$_2$—(CH$_3$)N$_+$(CH$_2$—CH$_2$—CH$_2$—SO$_3$—)—CH$_2$—CH$_2$—O—CO), 1.48~1.61 (8H$_{PDMSA-diol\ and\ PDMS-damine}$, CH$_2$—CH$_2$—CH$_2$—Si(CH$_3$)$_2$—O), 2.18~2.28 (4H$_{PDMS-diamine}$, H$_2$NCH$_2$—CH$_2$CH$_2$—Si(CH$_3$)$_2$—O), 2.67~2.87 (8H$_{PDMS-diol}$, OH—CH$_2$—CH$_2$—O—CH$_2$—CH$_2$), 2.87~2.98 (2H$_{SB}$, OC—O—CH$_2$—CH$_2$—(CH$_3$)N$_+$(CH$_2$—CH$_2$—CH$_2$—SO$_3$—)—CH$_2$—CH$_2$—O—CO), 3.11~3.31 (2H$_{SB}$, OC—O—CH$_2$—CH$_2$—(CH$_3$)N$_+$(CH$_2$—CH$_2$—CH$_2$—SO$_3$—)—CH$_2$—CH$_2$—O—CO), 3.12~3.28 (3H$_{SB}$, OC—O—CH$_2$—CH$_2$—(CH$_3$)N$_+$(CH$_2$—CH$_2$—CH$_2$—SO$_3$—)—CH$_2$—CH$_2$—O—CO), 3.40~3.51 (4H$_{PDMS-diol}$, OHCH$_2$—CH$_2$—O—CH$_2$—CH$_2$), 3.60~3.75 (2H$_{MDI}$, OCN—C$_6$H$_4$—CH$_2$—C$_6$H$_4$—NCO), 4.09~4.35 (8H$_{SB}$, OC—O—CH$_2$—CH$_2$—(CH$_3$)N$_+$(CH$_2$—CH$_2$—CH$_2$—SO$_3$—)—CH$_2$—CH$_2$—O—CO), and 6.82~7.15 (8H$_{MDI}$, OCN—$_{C6H4}$-CH$_2$—C$_6$H$_4$—NCO).

Figure 6A:
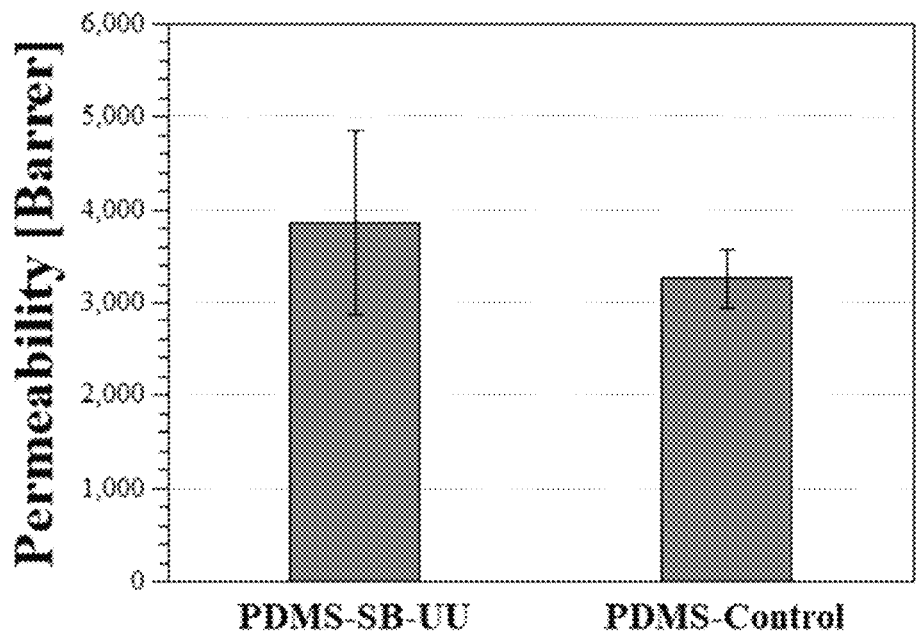
FIGS. 6A-6B are graphs depicting the in vitro CO$_2$ (FIG. 6A) and O$_2$ (FIG. 6B) permeability test using PDMS-SB-UU and PDMS-control films (n=4).
Figure 6B:
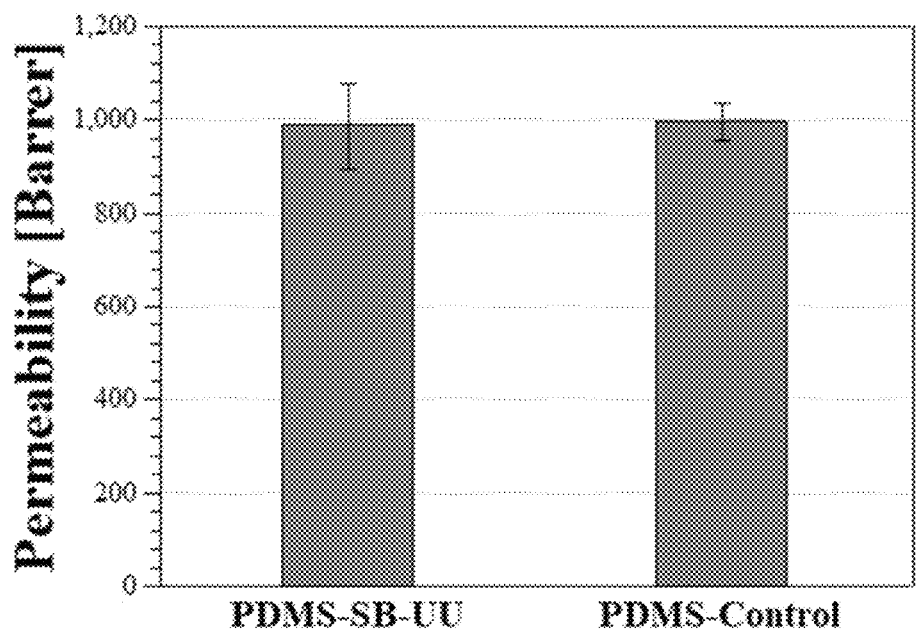

From the XRD spectrum of PDMS-control, PDMS-MDEA-UU, and PDMS-SB-UU (FIG. 6), the typical peak of PDMS at 12° C. was observed for all samples, moreover, the spectrum of PDMS-MDEA-UU and PDMS-SB-UU showed the typical peak of urethane at 20.5° C.

Mechanical properties of PDMS-control, PDMS-MDEA-UU, and PDMS-SB-UU were characterized by uniaxial tests (Table 1).

TABLE 1

Resulting Mechanical properties

| Polymer | Feed Ratio of MDEA or SB (wt. %) | Initial Modulus (MPa) | Tensile Strength (MPa) | Breaking Strain (%) |
|---|---|---|---|---|
| PDMS-control | — | 0.8 ± 0.1 | 2.0 ± 1.0 | 130 ± 36 |
| PDMS-MDEA-UU | 5 | 3.9 ± 0.3 | 8.7 ± 0.4 | 330 ± 25 |
| PDMS-SB-UU | 5 | 3.6 ± 0.3 | 6.1 ± 0.6 | 230 ± 21 |

The PDMS-PUUs showed significantly higher initial modulus (MPa, PDMS-MDEA-UU: 3.9±0.3 and PDMS-SB-UU: 3.6±0.3), tensile strength (MPa, PDMS-MDEA-UU: 8.7±0.4 and PDMS-SB-UU: 6.1±0.6), and breaking strain (%, PDMS-MDEA-UU: 330±25 and PDMS-SB-UU: 230±21) compared to PDMS-control values of 0.8±0.1 MPa, 2.0±1.0 MPa, and 130±36%, respectively.

Figure 7:
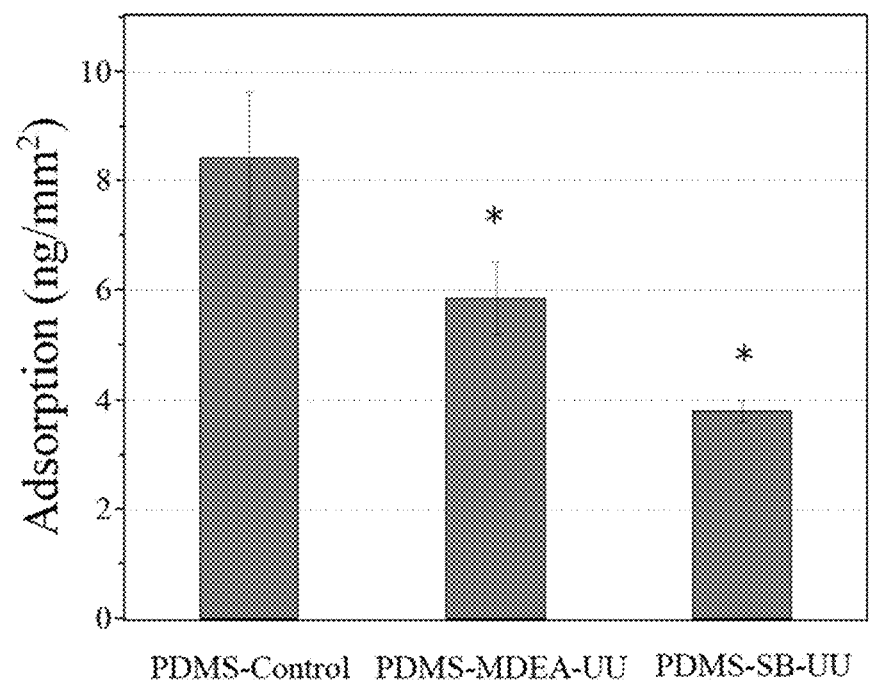
FIG. 7 is a graph depicting the protein (fibrinogen) adsorption assay of PDMS-control, PDMS-MDEA-UU, and PDMS-SB-UU films (n=3).

The stability of PDMS-MDEA-UU and PDMS-SB-UU against lipase (FIG. 7A) or $H_2O_2$ was compared to commercially available PDMS for 8 weeks (FIG. 7B). The stability was evaluated by the change of mass of the samples at 1, 2, 4, 6, and 8 weeks. There was no significant difference in change of mass relative to the control over the period.

Figure 8:
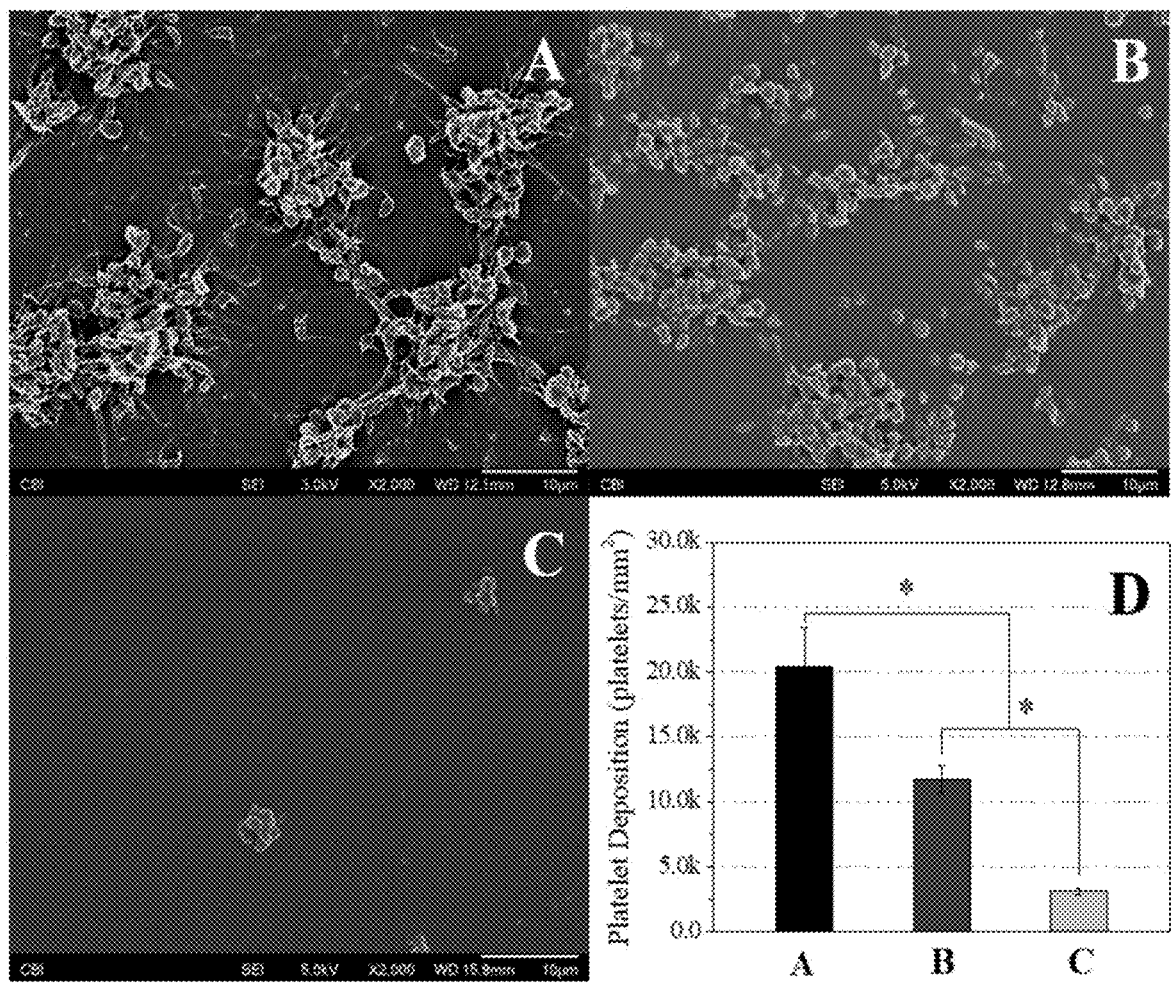
FIG. 8 depicts platelet deposition studies to (A) PDMS-control, (B) PDMS-MDEA-UU, (C) PDMS-SB-UU films observed by SEM after contact with ovine blood (citrated) for 3 h at 37° C. (n=3), and (D) deposited platelet number quantified by LDH assay (n=3).

$CO_2$ and $O_2$ permeability through the solvent-cast PDMS-SB-UU films were compared with those through PDMS-control films (FIGS. 8A-8B). PDMS-SB-UU exhibited no significant difference in permeability of both $CO_2$ (3900±1000 barrer) and $O_2$ (990±90 barrer) relative to PDMS-control. The $CO_2$ and $O_2$ permeability of PDMS-control films were 3260±310 barrer and 995±39 barrer, respectively, and are relatively similar to previously reported data for PDMS $CO_2$ and $O_2$ permeability.

Figure 9:
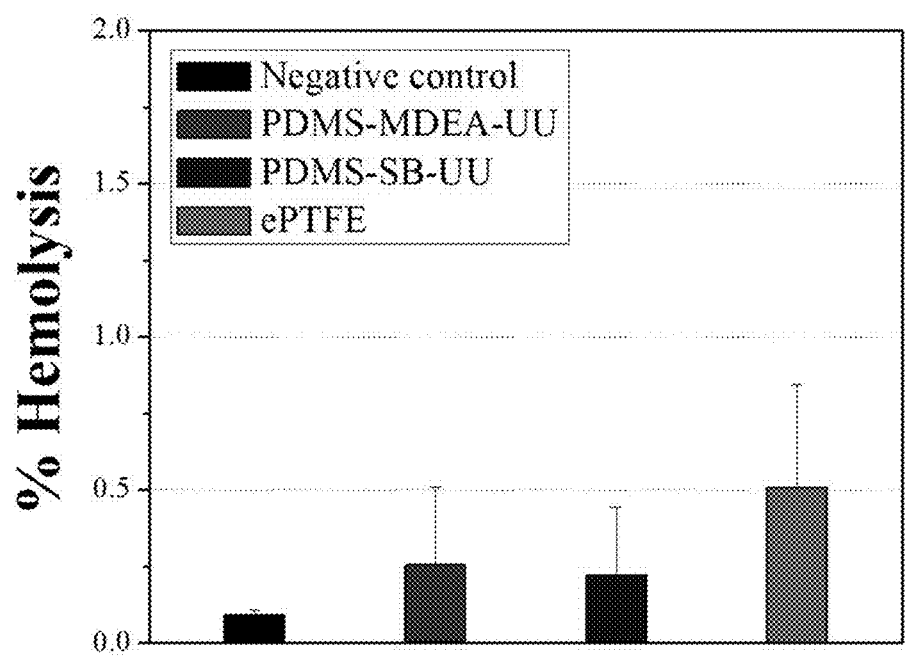
FIG. 9 is a graph depicting Hemolysis % of negative control, PDMS-MDEA-UU film, PDMS-SB-UU film, and ePTFE graft against whole ovine blood (8 g/dL of hemoglobin) (n=3).

In vitro anti-fouling properties of PDMS-SB-UU: The antifouling effect of covalently immobilized zwitterionic SB group on the PDMS-PUU was evaluated. From the fibrinogen adsorption test (FIG. 9), PDMS-SB-UU showed a significantly lower fibrinogen deposition compared to PDMS-control. The amount of attached fibrinogen to the surface of PDMS-SB-UU (3.8±0.2 ng) was less than half of that of PDMS-control (8.4±0.1 ng). Fibrinogen deposition on PDMS-MDEA-UU (5.8±0.7 ng) was significantly lower than that of PDMS-control but larger than that of PDMS-SB-UU.

Figure 10:
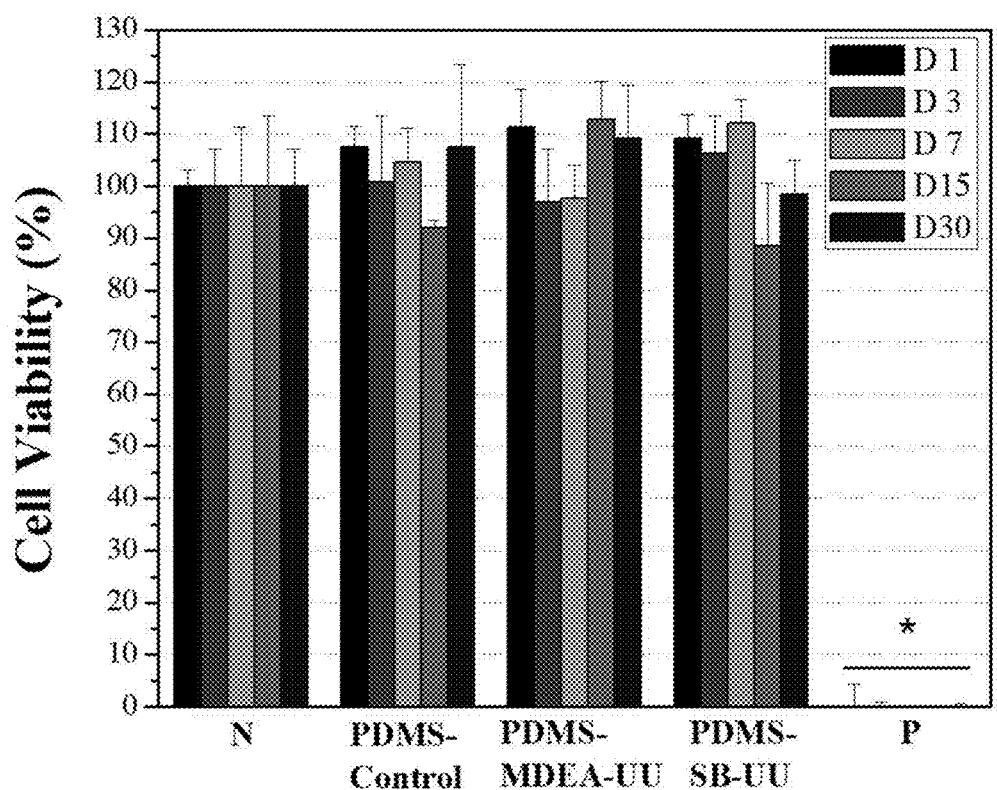
FIG. 10 is a graph depicting in vitro cytotoxicity of PDMS-control, PDMS-MDEA-UU, and PDMS-SB-UU films tested with rat aorta smooth muscle cells (rSMCs). MTS assay was conducted for analyzing cell viability. Data are normalized to the negative control and expressed as mean±SD (n=3). Negative control (N) includes cells cultured in the medium only. To induce cell death in positive control (P), 1 M acrylamide dissolved in regular cell culture medium was used. For each group (N, PDMS-control, PDMS-MDEA-UU, and PDMS-SB-UU), D1, D3, D7, D15, and D30 are presented, left to right.

Platelet deposition on the PDMS-SB-UU was also significantly reduced compared to both PDMS-control and PDMS-MDEA-UU. From SEM images of the whole ovine blood test (FIG. 10(A-C), it was clear that the surface of PDMS-control was covered by activated platelets, whereas there were few platelets and minimal evidence of activation on the surface of PDMS-SB-UU. The amount of deposition on the samples' surface was quantified, and the result showed that the PDMS-SB-UU had almost 6.5 times less platelets deposition than PDMS-control (FIG. 10(D)). The PDMS-MDEA-UU showed only 1.7 times lower platelet deposition as compared to that for the PDMS-control.

Figure 11:
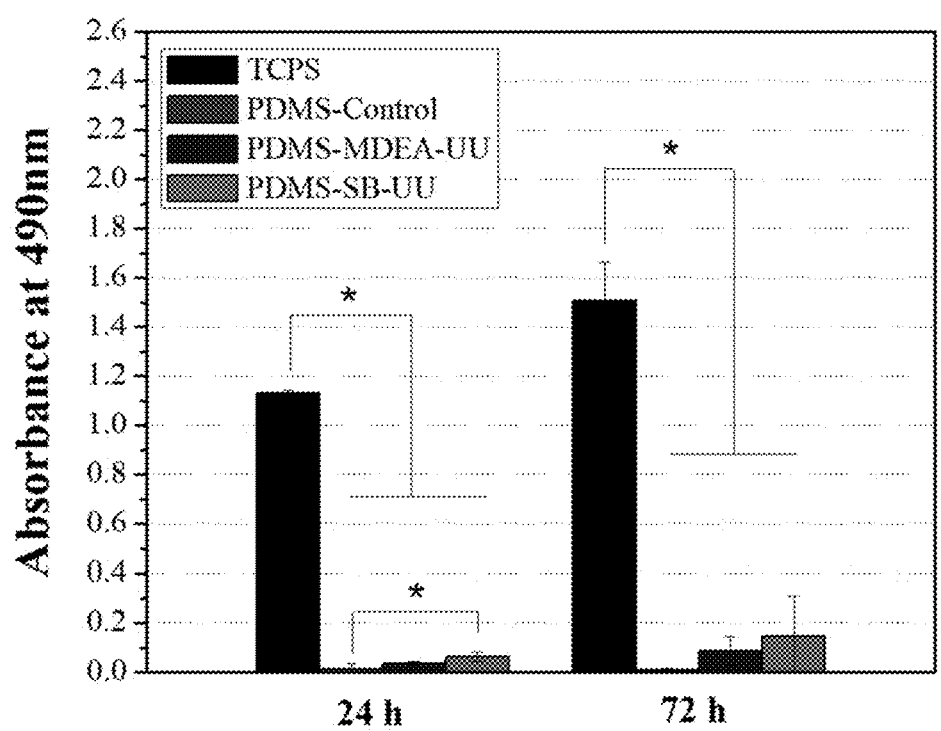
FIG. 11 is a graph depicting the proliferation of rat aorta smooth muscle cells (rSMCs) on tissue culture polystyrene (TCPS), PDMS control, PDMS-MDEA-UU, and PDMS-SB-UU. MTS assay was performed for the evaluation. Data are expressed as mean±SD (n=3).

In vitro biocompatibility of PDMS-SB-UU. A hemolysis assay was performed to evaluate the hemocompatibility of PDMS-PUUs (PDMS-MDEA-UU and PDMS-SB-UU) compared to ePTFE (FIG. 11). The hemolytic index (% hemolysis) was 0.09±0.02 for the negative control, 0.3±0.2 for PDMS-MDEA-UU, 0.2±0.2 for PDMS-SB-UU, and 0.5±0.3 for ePTFE. All tested samples demonstrated a nonhemolytic effect since their hemolytic index was less than 2%. Moreover, the hemolytic index of PDMS-MDEA-UU, PDMS-SB-UU, and ePTFE showed no significant difference relative to the negative control (polymeric sample-free).

Figure 12:
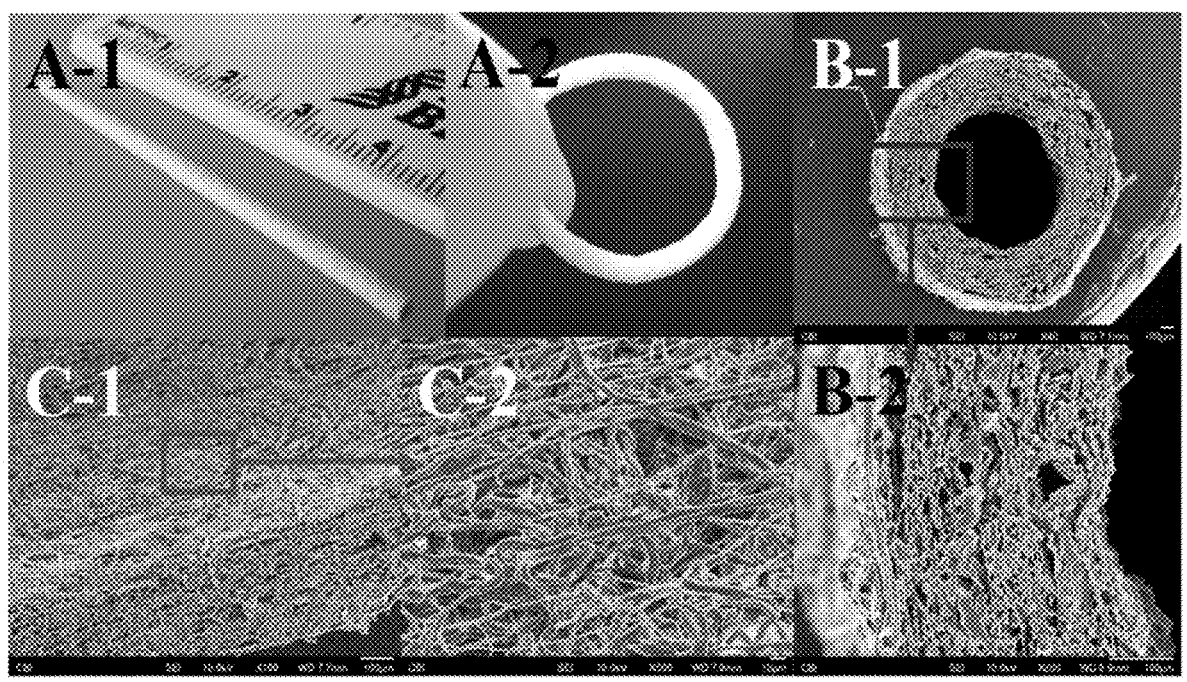
FIG. 12 depicts macroscopic images (A-1, A-2) and SEM images (B-1, B-2, C-1, C-2) of electrospun small diameter PDMS-SB-UU conduit.
Figure 13:
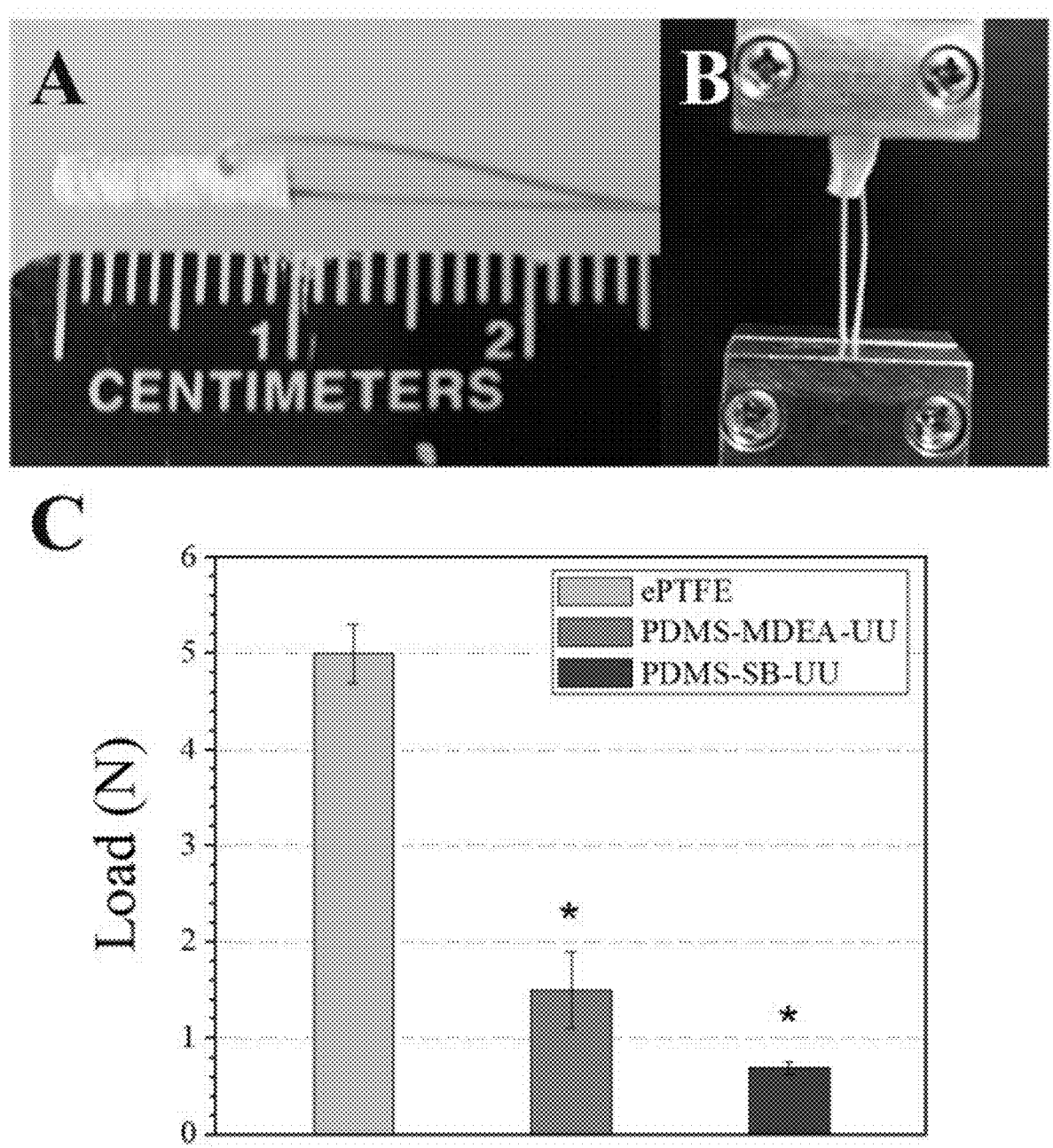
FIG. 13 depicts a suture retention test of electrospun PDMS-SB-UU conduit as compared to ePTFE and PDMS-MDEA-UU. Ti-Cron™ coated braided polyester (5×18") was sutured at a distance of 3 mm from the sample's (thickness: 300 μm) free end. Test Speed: 25 mm/min (n=3).

Cell cytotoxicity study by elution medium of PDMS-control, PDMS-MDEA-UU, and PDMS-SB-UU showed no significant toxic effect for all samples compared to the negative control (polymer-free cell medium) against rSMC for 30 d (FIG. 12). The cell attachment of rSMC on the surface of PDMS-control, PDMS-MDEA-UU, and PDMS-SB-UU films were compared to tissue culture polystyrene (TCPS) (FIG. 13). The PDMS-control and PDMS-UUs showed a significantly lower attachment at 72 hours, but PDMS-UUs showed an increase in the number of cells over the period even at a low ratio.

Figures 14, 15:
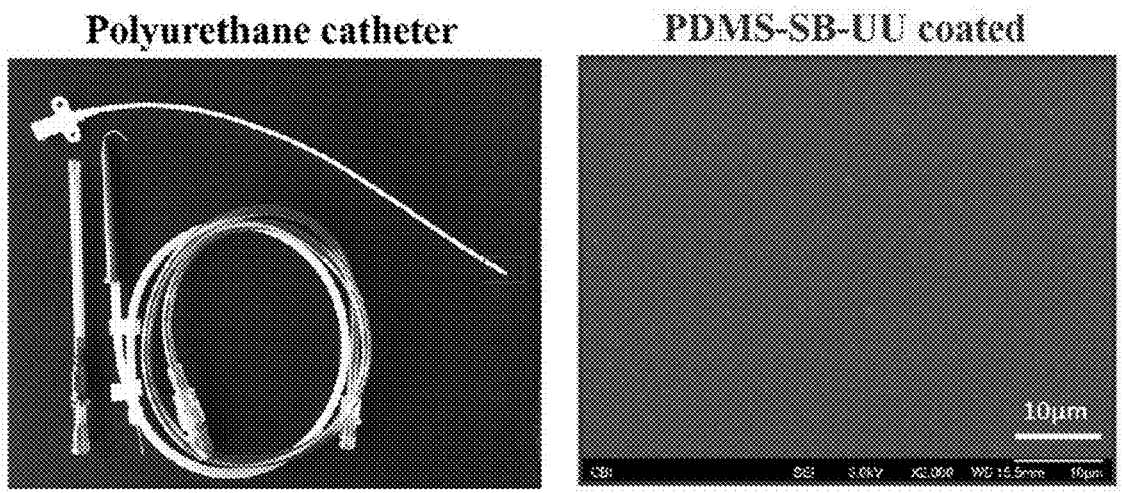
FIG. 14 depicts a PDMS-control coating with PDMS-SB-UU. (A) Cross-section image for analysis. (B) Atomic % of carbon, nitrogen, oxygen, silicon, and sulfur for non-coated PDMS (C) atomic % of carbon, nitrogen, oxygen, silicon, and sulfur for dip-coating using 2% (wt/vol) in HFIP, and (D) atomic % of carbon, nitrogen, oxygen, silicon, and sulfur of dip-coating using 2% (wt/vol) in HFIP/DCM (1/1). Data are expressed as mean±SD.
FIG. 15 is a photograph depicting a central venous catheterization kit with polyurethane indwelling catheter and an electron micrograph of PDMS-SB-UU coated the polyurethane catheter surface.

Fabrication of small diameter PDMS-SB-UU artificial conduit by Electrospinning: PDMS-DMEA-UU and PDMS-SB-UU processed via electrospinning into small-diameter conduits (inner diameter: 0.80±0.05 mm) are shown in FIG. 14. The length, wall thickness, and diameter of deposited fibers of the PDMS-SB-UU conduit were 5±0.3 cm, 375±30 µm, and 2.2±0.6 µm, respectively. Also, suture retention strength of electrospun PDMS-MDEA-UU and PDMS-SB-UU was evaluated and compared with ePTFE (FIG. 15). Retention strength for PDMS-MDEA-UU (1.5±0.4 N) and PDMS-SB-UU (0.69±0.06 N) was significantly lower than that of ePTFE (5±0.3 N).

Figure 16:
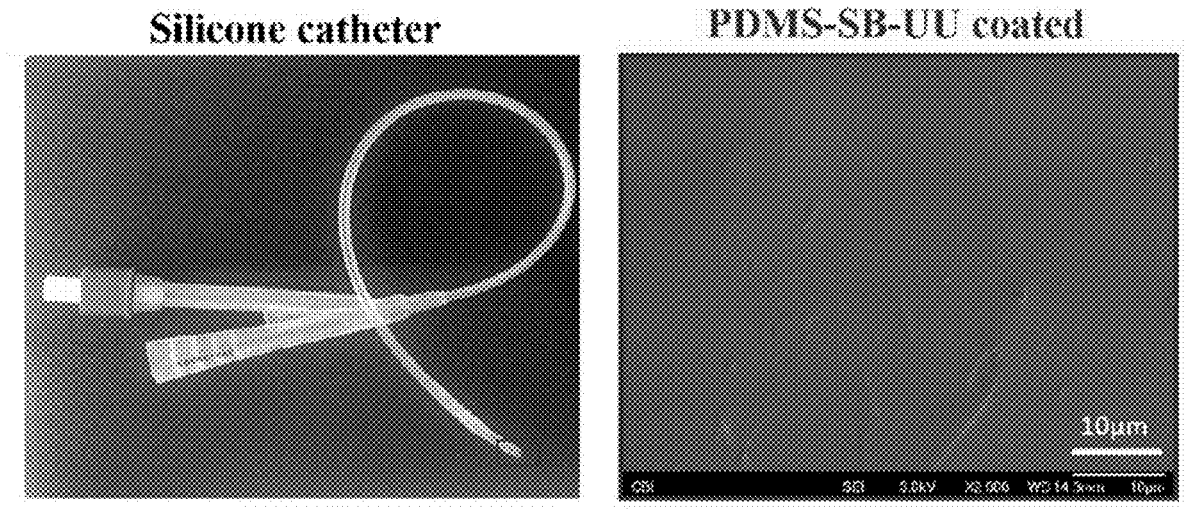
FIG. 16 is a photograph depicting a two-way silicone foley catheter and an electron micrograph of PDMS-SB-UU coated on the silicone catheter surface.

PDMS-based material coating with PDMS-SB-UU: To evaluate the potential for using PDMS-SB-UU in the fabrication of a microfluidic device, the new zwitterionic PDMS-based polyurethane elastomer PDMS-SB-UU was coated onto commercially available PDMS (Sylgard® 182 Silicone Elastomer Kit). From the result (FIG. 16), PDMS-SB-UU showed a successful coating on PDMS-control deep into the middle point of the cross-section. Results for PDMS-SB-UU solution in DCM/HFIP (element % of S at surface to 75 µm, 75 to 150 µm, and 150 to 225 µm was 0.13±0.04, 0.10±0.03, and 0.10±0.06, respectively) were more penetrating relative to those HFIP alone (element % of S at surface to 75 µm, 75 to 150 µm, and 150 to 225 µm was 0.10±0.03, 0.10±0.03, and 0.06±0.02, respectively).

PDMS-SB-UU coating on blood-contacting devices: To explore the potential for PDMS-SB-UU coatings on blood contacting devices, PDMS-SB-UU was applied on the surface of medical grade catheters and a commercial polypropylene hollow fiber membrane commonly used in artificial lungs. After the coating, the PDMS-SB-UU was observed to be conformally coated onto the catheter surfaces and the coated samples were smooth and exhibited no observable difference in morphology relative to the uncoated control surface. The outer surfaces of uncoated polypropylene hollow fiber control showed numerous micro- to nano-sized pores. The PDMS-SB-UU coated surface was smooth and the pores appeared to be covered by the thin coating layer (<1 µm).

PDMS-SB-UU was designed as a polymer for use in blood-contacting medical devices based on its expected biostability, fouling resistance, and semi-crystalline properties stemming from the PDMS based zwitterionic PUU structure consisting of soft- and hard-segment bearing SB. Its use could enable a straightforward method of improved thrombogenicity for blood-contacting devices such as vascular conduits, artificial lungs, and microfluidic devices.

Dacron (polyethylene terephthalate) and ePTFE are commercially available polymeric materials widely applied for the fabrication of large diameter (≥6 mm i.d.) artificial vascular grafts. Biostable polymeric grafts have the advantages of being ready to implant and relatively low cost compared to tissue-engineered biodegradable artificial grafts, which have not entered the clinic beyond limited exploratory studies (Kim, S. et al., Smart and Biostable Polyurethanes for Long-Term Implants. *ACS Biomater. Sci. Eng.*, 2018, 4:1479-1490). Although Dacron and ePTFE materials have been demonstrated to perform adequately in replacing large diameter blood vessels, this success decreases with the diameter of vessel replacement to the point where small diameter synthetic vascular grafts (<4 mm i.d.) are not commonly utilized. A major reason for this failure is acute occlusion triggered by early platelet deposition, or later term hyperplasia at the anastomotic sites. Efforts to improve synthetic vascular graft biocompatibility to reduce these failure mechanisms have spanned decades, but no adequate solutions have been found (Adipurnama, I. et al., Surface modification and endothelialization of polyurethane for vascular tissue engineering applications: a review. *Biomater. Sci.*, 2017, 5-22-37; Pashneh-Tala, S. et al., The tissue-engineered vascular graft—past, present, and future. *Tissue Eng.—Part B Rev.*, 2016, 22: 68-100). Related to the blood biocompatibility challenges of vascular grafts is the morbidity that stems from the placement of other polymeric devices acutely into the bloodstream, such as various types of catheters for sensing, delivery, collection and manipulation. Such devices need to resist thrombotic deposition on regions of action (e.g., a sensor) and generally to avoid serving as a source of thromboembolism. Blood-contacting catheters are commonly made from polysiloxanes and polyurethanes, and although these materials perform adequately in most instances, improved blood biocompatibility is desirable (Z. Zhang et al.).

Surface-immobilized zwitterions such as sulfobetaine (SB), phosphorylcholine (PC), or carboxybetaine (CB) have shown an antifouling effect putatively due to electrostatic hydrogen bonds between the zwitterions and water molecules to form a hydration layer (Singha, P. et al., A review of the recent advances in antimicrobial coatings for urinary catheters. *Acta Biomater.*, 2017, 50: 20-40). However, the effect is dependent on the density and length of the zwitterion. Surface modification schemes to attach zwitterions may also not be feasible for medical devices that consist of multiple materials with different physicochemical characteristics. PDMS is broadly utilized in the medical device industry due to its excellent stability against oxidative stress, good biocompatibility in many applications, and elastomeric characteristics. However, it has also shown problematic platelet deposition in some applications and has limited processing options based on the need for chemical cross-linking and, thus, a lack of thermo-plastic behavior. Accordingly, a novel zwitterionic polyurethane-urea based PDMS was synthesized and evaluated with the aim of improving the anti-fouling properties and processability of PDMS.

For synthesis of the new PDMS-based zwitterionic polyurethaneurea, an aromatic diisocyanate, MDI, was employed to increase stability in an aqueous environment. Polyurethane products of aromatic diisocyanates have stronger hydrophobic intramolecular interactions than aliphatic diisocyanates. 18 MDEA was immobilized to react with PS to form an SB since its short side chain has a lower steric hindrance relative to longer side chains. Therefore, PDMS-diol, MDEA, and MDI were used for the synthesis of the prepolymer, PDMS-based polyurethane-urea (PDMS-MDEA-UU). The prepolymer was processed to the PDMS-based polyurethane-urea by adding a chain extender PDMS-diamine which was chosen to increase PDMS content of the final product considering biostability. Finally, PDMS-MDEA-UU was converted to zwitterionic PDMS-PUU (PDMS-SB-UU) by reaction with PS.

The chemical structures of PDMS-MDEA-UU and PDMS-SB-UU were confirmed by the $^1$H-NMR spectra using hexafluoro-2-propanol (HFIP-d2, relative polarity: 0.969) and chloroform (relative polarity: 0.259), respectively (FIG. 5). Since PDMS is a part of the polyurethaneurea, the PDMS-PUUs are soluble in organic solvents, although cured PDMS by heat or ultraviolet (UV) radiation does not dissolve in organic solvents. PDMS-SB-UU showed a low solubility in chloroform and this may reveal that the PDMS-MDEA-UU became more polar after conversion to PDMS-SB-UU due to the sulfur trioxide group. Moreover, the XRD spectra of PDMS-MDEA-UU and PDMS-SB-UU showed the typical intensity of both PDMS and urethane. 1H-NMR and XRD spectrum results confirmed the successful synthesis of desired PDMS-PUUs.

PDMS-control, PDMS-MDEA-UU, and PDMS-SB-UU film samples showed soft and elastomeric properties during mechanical characterization. The results for all samples showed lower initial modulus than tensile strength and strain recovery until reaching the breaking strain (Table 1). Moreover, PDMS-MDEA-UU and PDMS-SBUU showed higher tensile strength and breaking strain than those of the PDMS-control. These improved mechanical properties may be due to the chemical structure of PDMS-UUs consisting of the PDMS soft-segment and strong urethane urea hard-segment. PDMS-SB-UU demonstrated similar $CO_2$ and $O_2$ permeability relative to the PDMS control due to the soft-segment of PDMS-SB-UU consisting of PDMS, although it has a hard segment which forms a well-arranged macromolecular domain by hydrogen bonding. Given that PDMS has been applied in a variety of blood oxygenator devices as a gas permeable membrane (Leung et al.; Wu, W. I. et al., Lung assist device: development of microfluidic oxygenators for preterm infants with respiratory failure. *Lab Chip*, 2013, 13: 2641-2650; Dabaghi, M. An artificial placenta type microfluidic blood oxygenator with double-sided gas transfer microchannels and its integration as a neonatal lung assist device. *Biomicrofluidics*, 2018, 12(4): 044101) these gas transport characteristics indicate the applicability of the new polymer as membrane materials with improved thromboresistance.

Polymeric biomaterials can be subject to degradation in situ by oxidative stress and enzymatic activity. Oxidative stress occurs when reactive oxygen species (ROS) are transiently or chronically enhanced (Collin, F. Chemical basis of reactive oxygen species reactivity and involvement in neurodegenerative diseases. *Int. J. Mol. Sci.*, 2019, 20: 1-17). ROS are oxygen-containing chemically-reactive radical or molecular species such as peroxides, superoxides, hydroxyl radicals, and singlet oxygen. For instance, macrophages play a major role in the formation of peroxynitrite, which contributes to polymer degradation (Sutherland, K. et al., Degradation of biomaterials by phagocyte-derived oxidants. *Clin. Invest.*, 1993, 92: 2360-2367). On the other hand, lipase is a major enzyme in tissues that can broadly attack the bonds common in lipids (and synthetic polymers). To confirm the biostability of newly synthesized PDMS-PUUs, the solvent-cast film of PDMS-MDEA-UU and PDMS-SB-UU were exposed to 30% $H_2O_2$ or 100 U/mL lipase at 37° C. for 8 weeks. PDMS-MDEA-UU and PDMS-SB-UU showed no measurable change in mass for 8 weeks. Moreover, there was no significant difference in mass compared to commercially available PDMS-control which was cured by heat treatment. This stability of PDMS-MDEA-UU and PDMS-SB-UU can be explained by its semi-crystalline chemical structure consisting of the PDMS soft-segment and arranged hard segment. PDMS has superior resistance to oxidation and hydrolysis due to the unique siloxane bonded structure and hydrophobicity. A crystalline arrangement of the hard segment of PUU decreases enzymatic degradation (Kim et al., 2018).

The anti-fouling properties of PDMS-MDEA-UU and PDMS-SB-UU were evaluated at a basic level using fibrinogen adsorption and platelet deposition from whole ovine blood to assess the acute resistance to these phenomena which occur over a longer time frame in the more complex in vivo setting of blood contacting medical devices. Fibrinogen was chosen as a model protein since fibrinogen is one of the coagulation factors and plays a major role in blood clotting and the support of platelet adhesion (Weisel, J. W. et al., Fibrin formation, structure and properties. *Subcell. Biochem.*, 2017, 82: 405-456). Also, it has been reported that fibrinogen can support vascular smooth muscle cell adhesion and migration (Naito, M. et al., Substrate-bound fibrinogen, fibrin and other cell attachment-promoting proteins as a scaffold for cultured vascular smooth muscle cells. *Athero-* sclerosis, 1992, 96: 227-234). The amount of deposition of fibrinogen was significantly less for PDMS-PUUs compared to PDMS-control (8±1 ng/mm$^2$) with PDMS-SB-UU showing the least deposition (3.79±0.02 ng/mm$^2$). This was attributed to PDMS-UUs having more hydrophilic surfaces due to the ionic groups and urethane-urea bonding. Moreover, SB has a near zero value of zeta potential, although MDEA may contribute attractive electrostatic interaction with the negative net surface charge proteins at neutral pH.

An absence of hemolysis induced by a biomaterial is a fundamental requirement for its consideration for use in a blood contacting medical device. PDMS-PUUs were evaluated for hemolytic potential related to the commonly utilized polymer for cardiovascular devices, ePTFE. Both PDMS-PUUs and ePTFE showed no elevated hemolytic activity against whole ovine blood.

To evaluate cytocompatibility of PDMS-MDEA-UU and PDMS-SB-UU, both an elution medium test and cell attachment test were conducted using rSMC. The vascular smooth muscle cell is a principal component of the normal blood vessel wall and is involved in many 'housekeeping' functions of the body, but the over-proliferation of vascular smooth muscle cells contributes to the incidence of restenosis of artificial vascular conduits (Gu, X. et al., Biodegradable, elastomeric coatings with controlled anti-proliferative agent release for magnesium-based cardiovascular stents. *Colloids Surfaces B Biointerfaces*, 2016, 144: 170-179). In this regard, the proposed material (PDMS-SB-UU) demonstrated potentially attractive behavior in terms of no cytotoxicity and significantly lower rSMC attachment.

Figure 17A:
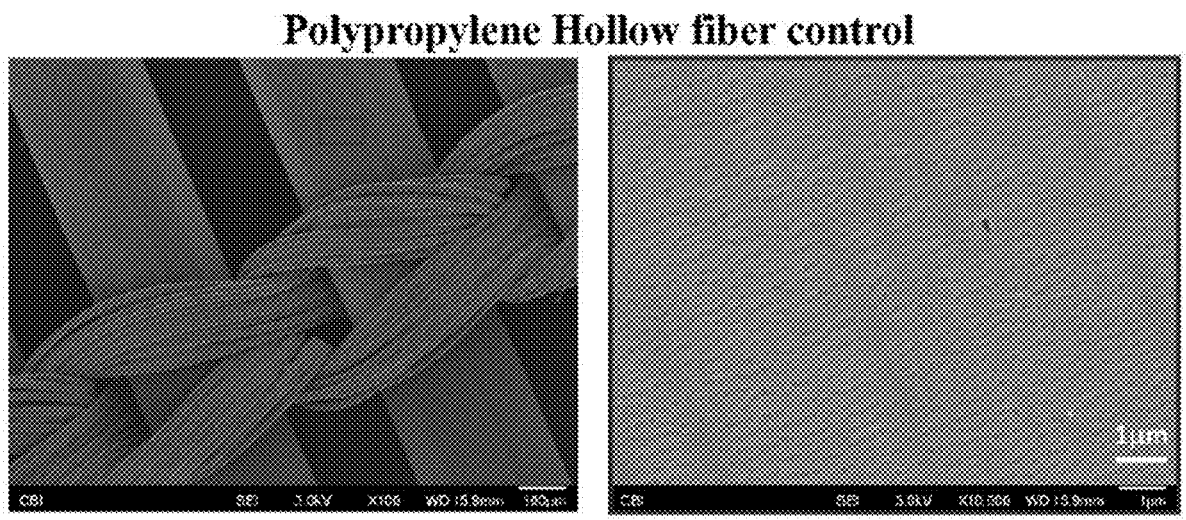
FIG. 17A-17B are electron micrographs of a commercial polypropylene hollow fiber mat and the high magnification image of the hollow fiber surface (FIG. 17A). Electron micrographs of the PDMS-SB-UU coated polypropylene hollow fiber mat and the high magnification image of the coated hollow fiber surface (FIG. 17B).
Figure 17B:
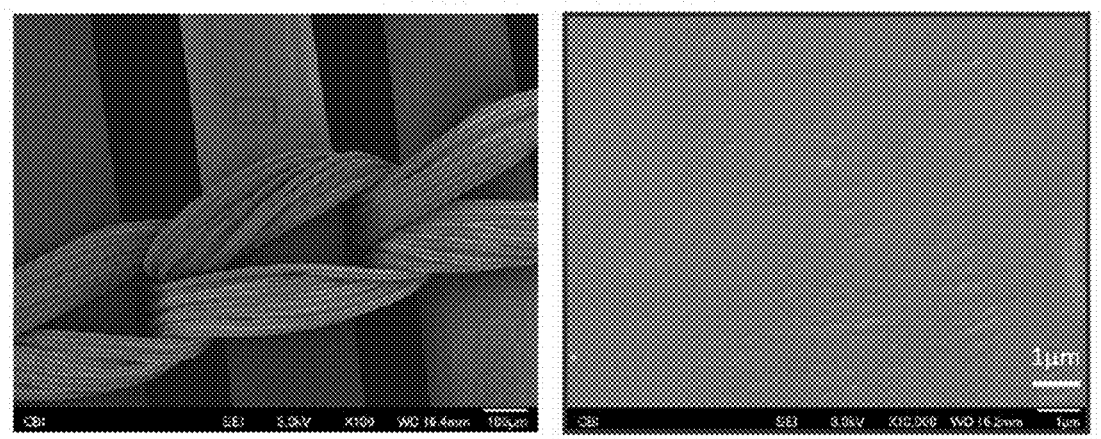
Figure 18:
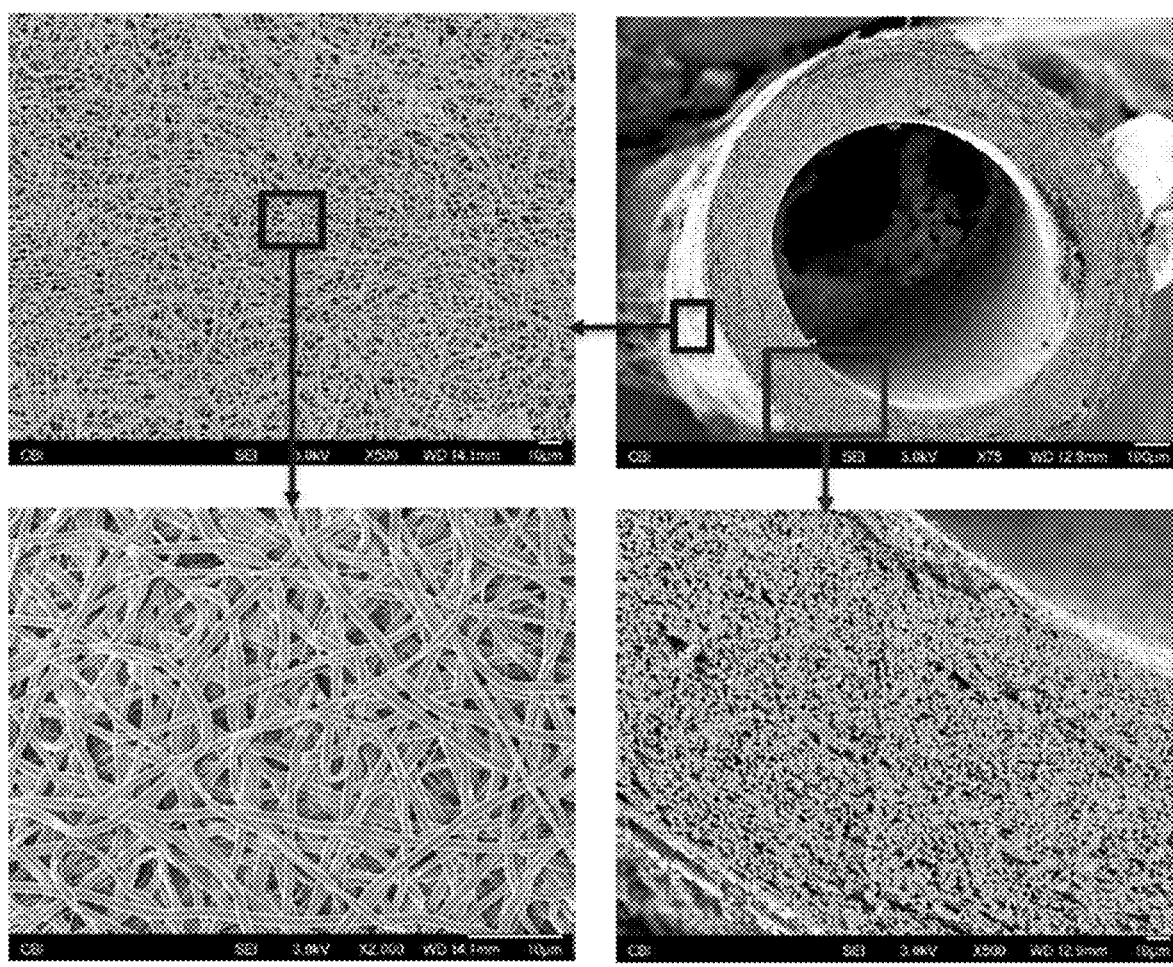
FIG. 18 is an electron micrograph of an electrospun tubular sample formed from PDMS-SB-UU.
Figure 19:
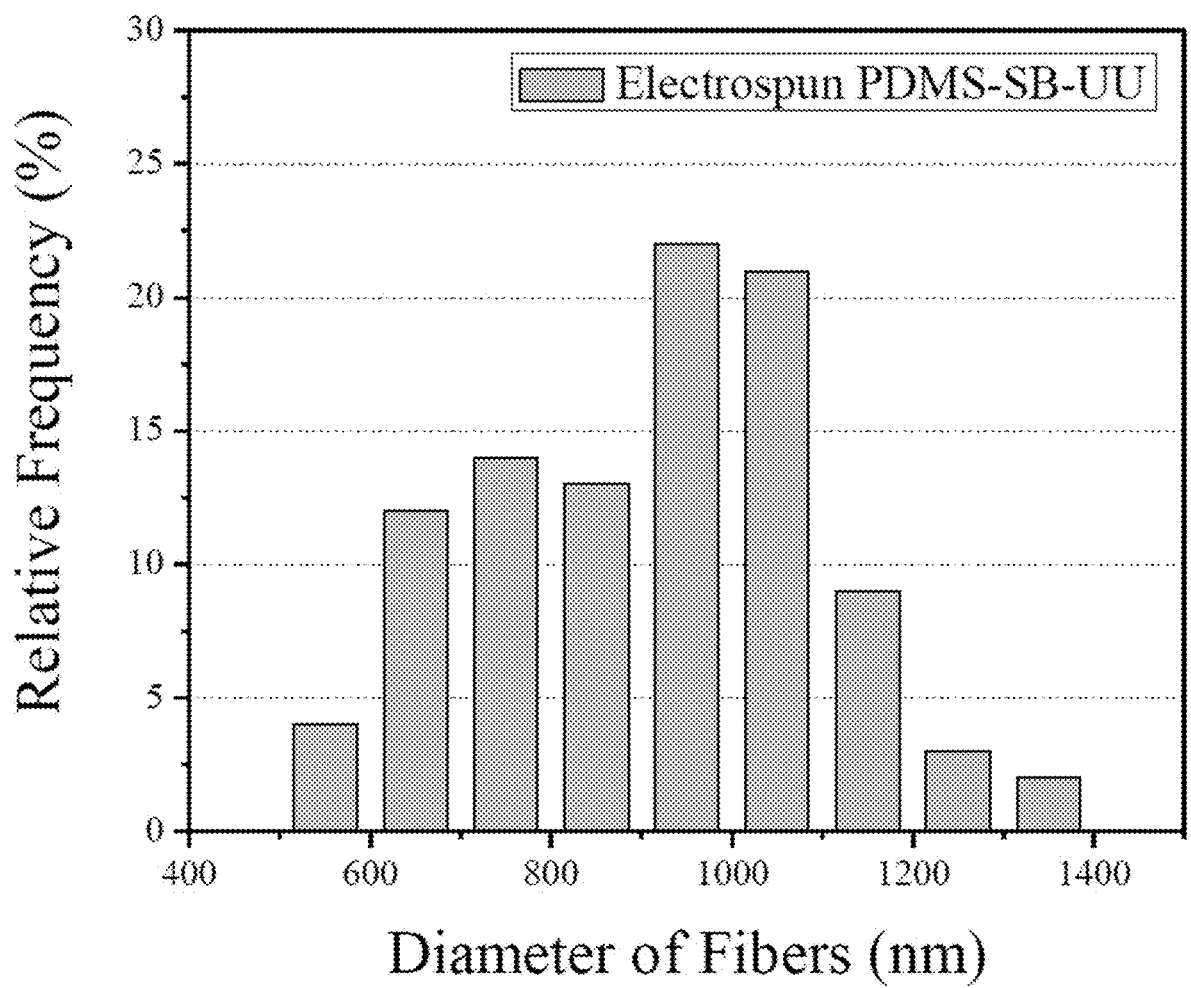
FIG. 19 is a graph depicting the relative frequency of the diameter of fibers (nm) formed during the electrospun PDMS-SB-UU.

The feasibility of PDMS-SB-UU testing and use in blood-contacting devices was explored by the fabrication of small diameter PDMS-SBUU conduits by electrospinning and coating PDMS with PDMS-SB-UU. Biostable artificial conduits and artificial lungs are good examples of blood-contacting medical devices where anti-fouling, lack of cytotoxicity, and low SMC attachment characteristics are required. PDMS-SB-UU showed good processability and the potential for use in fabrication of small diameter biostable artificial conduits. Also, PDMS-SB-UU was successfully applied to commercially available PDMS, polyurethane, and polypropylene which are the major materials used in fabricating medical-grade catheters (FIGS. 17 and 18), and hollow fiber membranes for artificial lungs (FIG. 19A-19B), although future evaluation efforts are necessary to specifically confirm the functionality of such components. The goal of this initial report was to demonstrate the synthesis and processing potential of this new polymer, PDMS-SB-UU, that could be used for either the entire matrix or surface coating of several candidate blood-contacting medical devices.

Example 2

A tubular sample was prepared using PDMS-SB-UU elastomer prepared in Example 1.

Figure 20:
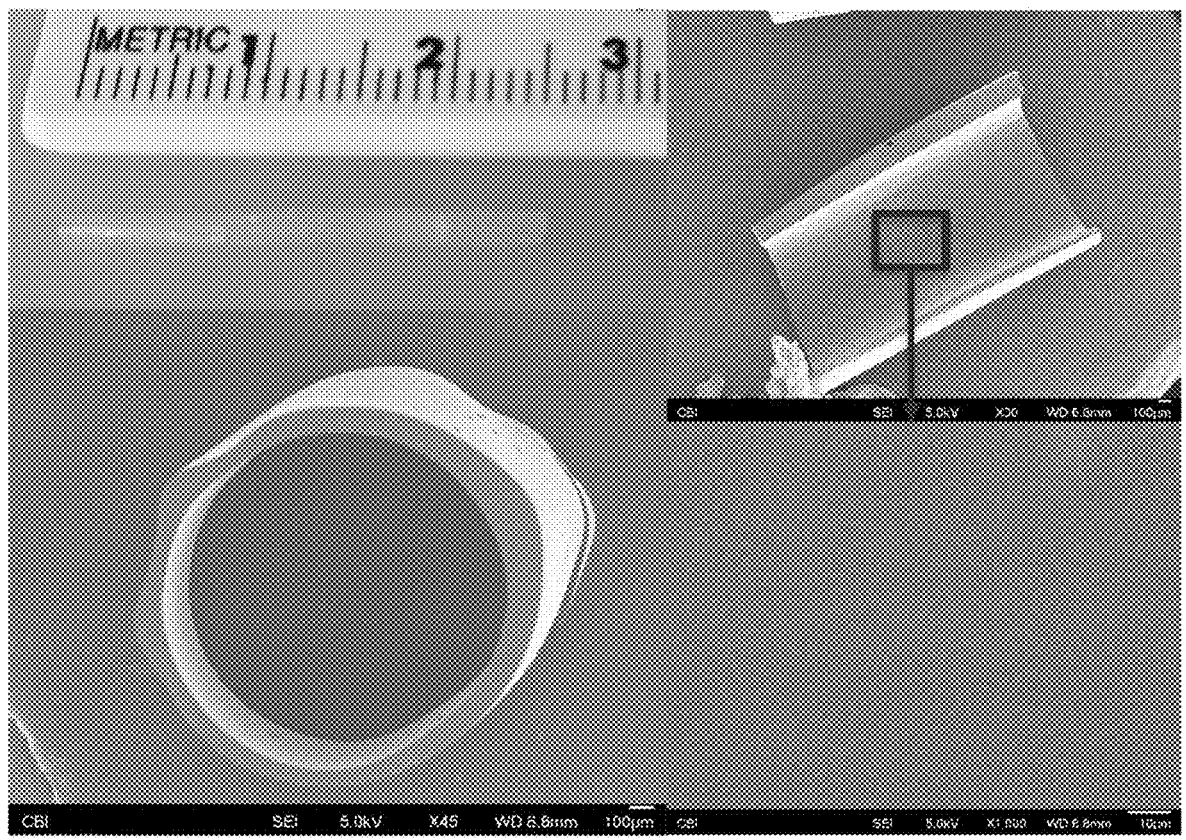
FIG. 20 depicts photographs and electron micrographs of fabricated small diameter PDMS-SB-UU tube by dip-coating onto a Teflon-coated rod using a 20 wt. % polymer solution in HFIP.

A 20 wt % solution of PDMS-SB-UU in HFIP was applied for 30 min to a rod collector (diameter: 1.0 mm) rotating at 250 revolutions/minute with an applied voltage on the nozzle (8 kV) and collector (−8 kV), a polymer solution feed rate of 1.5 mL/hour, and nozzle-to-collector distance of 17 cm. SEM images of cross-section and lumen surface of the PDMS-SB-UU electrospun tubular sample were taken to observe the morphology (FIG. 20).

Figure 21:
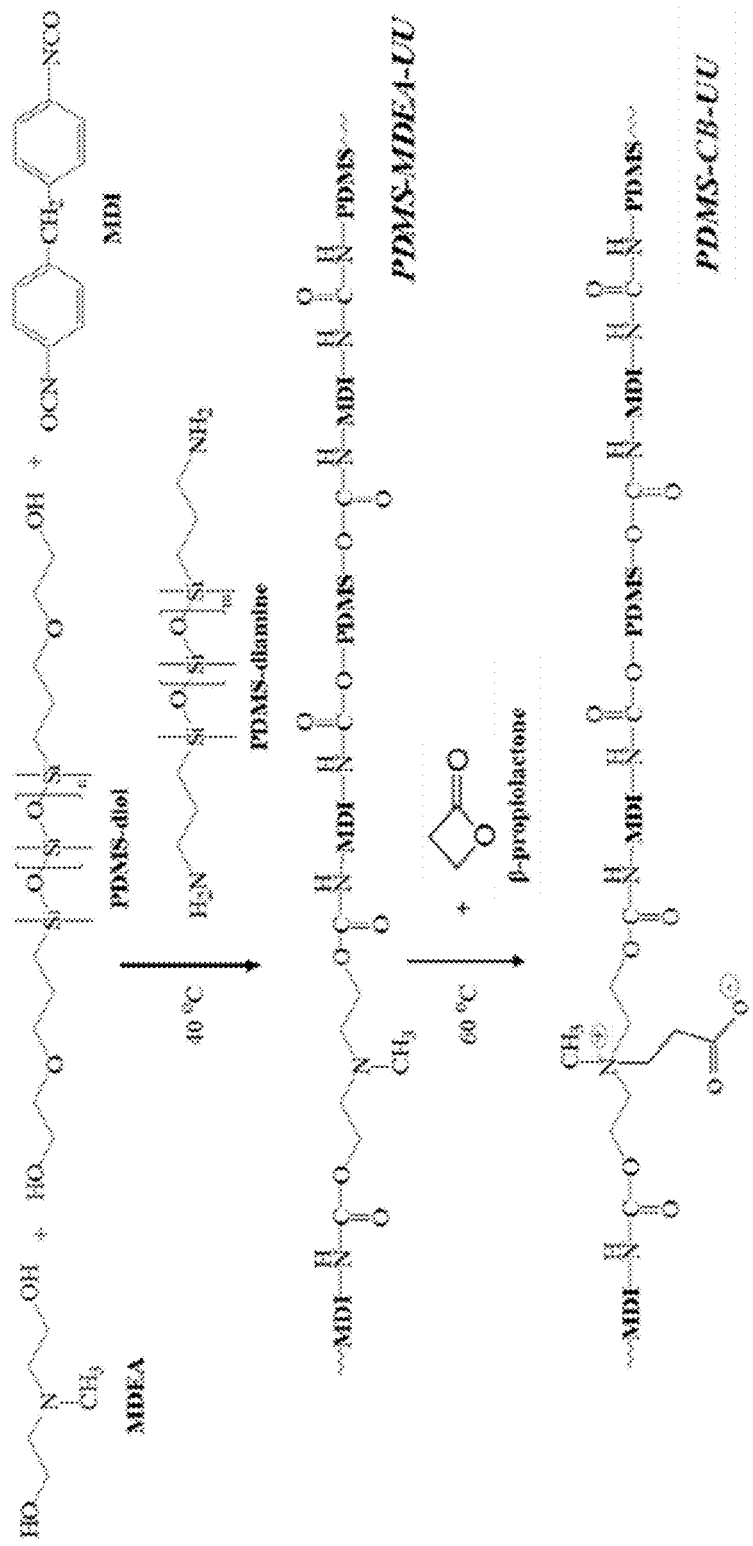
FIG. 21 is a synthesis schematic of PDMS-based polyurethane-urea (PDMS-MDEA-UU) and zwitterionic polyurethane-urea (PDMS-CB-UU).

The average diameter of the fibers within the tubular sample was 910±185 nm (n=100). The relative frequency of various fiber diameters can be found in FIG. 21. The average thickness of the electrospun tubular sample was 201±13 μm.

Example 3

A tubular sample was prepared by using the PDMS-SB-UU elastomer prepared in Example 1.

Figure 22:
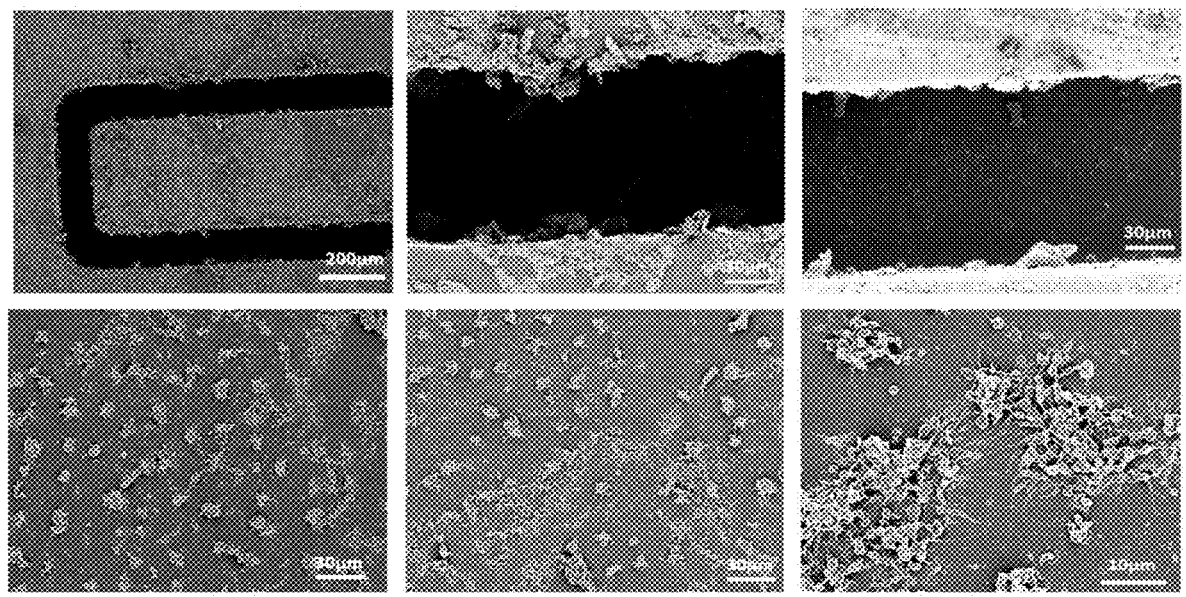
FIG. 22 depicts electron micrographs at different magnifications of a Sylgard® 184 microfluidic device from the whole ovine blood test, where the surface was covered by activated platelets.

A 1.3 mm diameter, 101±32 μm thick Teflon-coated rod was dip coated in a 20 wt. % solution of PDMS-SB-UU in HFIP. SEM images of the cross-selection and lumen surface of the PDMS-SB-UU coated tubular sample were taken to observe the morphology (FIG. 22).

Example 4

Figure 23:
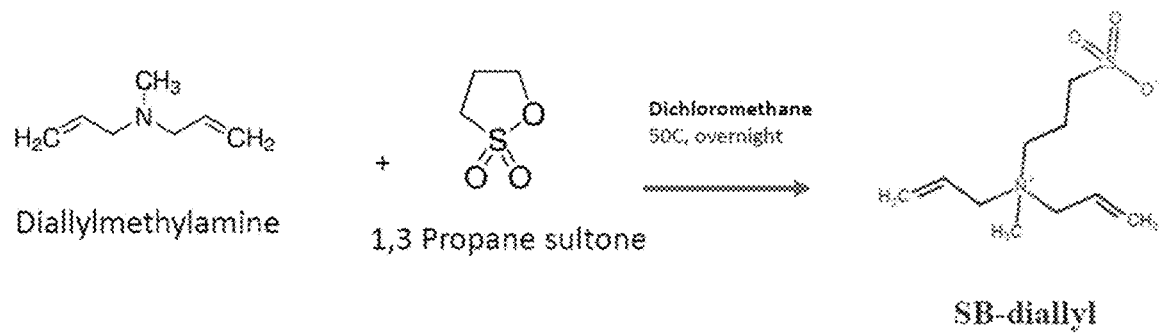
FIG. 23 is a synthesis schematic of the diallyl-functional sulfobetaine monomer (SB-diallyl).

Synthesis of PDMS-based zwitterionic polyurethane-urea copolymer (PDMS-CB-UU): A new PDMS-PUU copolymer was synthesized from Poly(dimethylsiloxane), bis(hydroxyalkyl) terminated (PDMS-diol), poly(dimethylsiloxane), bis (3-aminopropyl) terminated (PDMS-diamine), N-methyldiethanolamine (MDEA), and 4,4'-diphenylmethane diisocyanate (MDI) (FIG. 23). Briefly, MDEA and PDMS-diol were dissolved in DCE at 40 degrees Celsius (° C.) with nitrogen inlet-outlet equipment. MDI and a catalytic amount of Sn(Oct)$_2$ were added to the reactor followed by the reaction at 40° C. After 3 hours of reaction time, PDMS-diamine in DCE was slowly dropped in the reactor for another 12 hours of reaction time at 40° C. After the reaction, final product was precipitated and washed with excess methanol. The final product was dried under vacuum at 60° C.

The PDMS-MDEA-UU was converted to zwitterionic PDMS-PUU bearing CB by reaction with β-propriolactone. Briefly, PDMS-MDEA-UU and CB were dissolved in a mixture of dichloroethane and THF and then reacted at 60° C. for 15 hours. After the reaction, the reaction solution was condensed under vacuum at 50° C. and then precipitated in excess MeOH. The final powder product was filtered and dried under vacuum.

Example 5

The compatibility of the synthesized materials to conventional microfabrication processes, more specifically soft lithography, which are of importance to typical microfluidic applications, are determined (Jo, B. H. et al., Three-dimensional microchannel fabrication in polydimethylsiloxane (PDMS) elastomer. *Journal of Microelectromechanical Systems*, 2000, 9:76-81). In all cases, the developed zwitterionic PDMS polymers are with commercial PDMS to ensure the performance is suitable so that the former can replace the latter in device designs. In order to be useful for microfabrication processes, a spin curve is generated for the polymers so that a desired thickness can be reliably produced in a spin coater (650 Series, Laurell Technologies). The synthesized polymers (PDMS-SB-UU in Example 1 or PDMS-CB-UU in Example 4) can be spin-coated on silicon substrates at selected spin speeds in the range of 1000-5000 rpm, which is expected to result in micro-membrane thicknesses. The thickness of each sample can be measured by a surface profiler (AlfaStep IQ, KLA-Tencor). Multiple measurements across the area of the sample can be averaged to account for any nonuniformity. The process is expected to result in the ability to determine if spinning to very small thicknesses still results in a uniform coating and if it is possible to handle the material at those small thicknesses.

Further of interest is the bonding performance, which is relevant to the fabrication of more complicated and advanced structures. Commercial PDMS can be bonded to itself or to glass by $O_2$ plasma treatment, which is indispensable to the soft lithography process when fabricating microchannel devices and preventing any leaks between two layers. To test this, a mold is fabricated from SU-8 negative photoresist (MicroChem) on Si wafer which features a 3 mm diameter "blister" and an input port. The PDMS is cast over this mold, then cut away and bonded to pieces of plain PDMS or glass by $O_2$ plasma treatment (Zepto Plasma System, Deiner Electronic). The input port is connected to a regulated gas supply and the blister is pressurized. The pressure at which the bond fails can be noted and used as a measure of the bond strength.

The molding performance of the developed polymer in the soft lithography process also can be characterized. This can be determined in a more qualitative fashion. As mentioned previously, molds can be commonly fabricated from SU-8 on silicon. The performance of the molding can be judged based on the ability of the material to hold the shape of the mold, and the ability to remove the material from the mold easily without damaging the material or mold itself. The test can be performed at different length scales which may be seen in typical fabrication processes including the previously mentioned 3 mm mold for the blister and a mold for a microchannel at 100 μm channel height.

Example 6

The synthesized PDMS-based polyurethanes (PDMS-MDEA-UU or PDMS-CB(SB)-UU) can be evaluated in the form of thin-coating. They can be directly coated on a prefabricated PDMS microfluidic device as a thin, dense or porous microstructure membrane via a solvent/non-solvent fabrication technique (see, e.g., Pasman, T. et al., Flat and microstructured polymeric membranes in organs-on-chips. *J R Soc Interface.* 2018, 15(144)). To improve the coating stability, an interpenetrating polymer network (IPN) coating technique can be also investigated which PDMS-CB(SB)-UU polymer can be interlaced on PDMS network during the swelling in a solvent (tetrahydrofuran). A post-transition method can be also considered. A precursor polymer (PDMS-MDEA-UU) can be coated first on a PDMS substrate, and then zwitterionic (CB or SB) groups can be generated later on just the surface where the anti-fouling property is required.

Example 7

Figure 24:
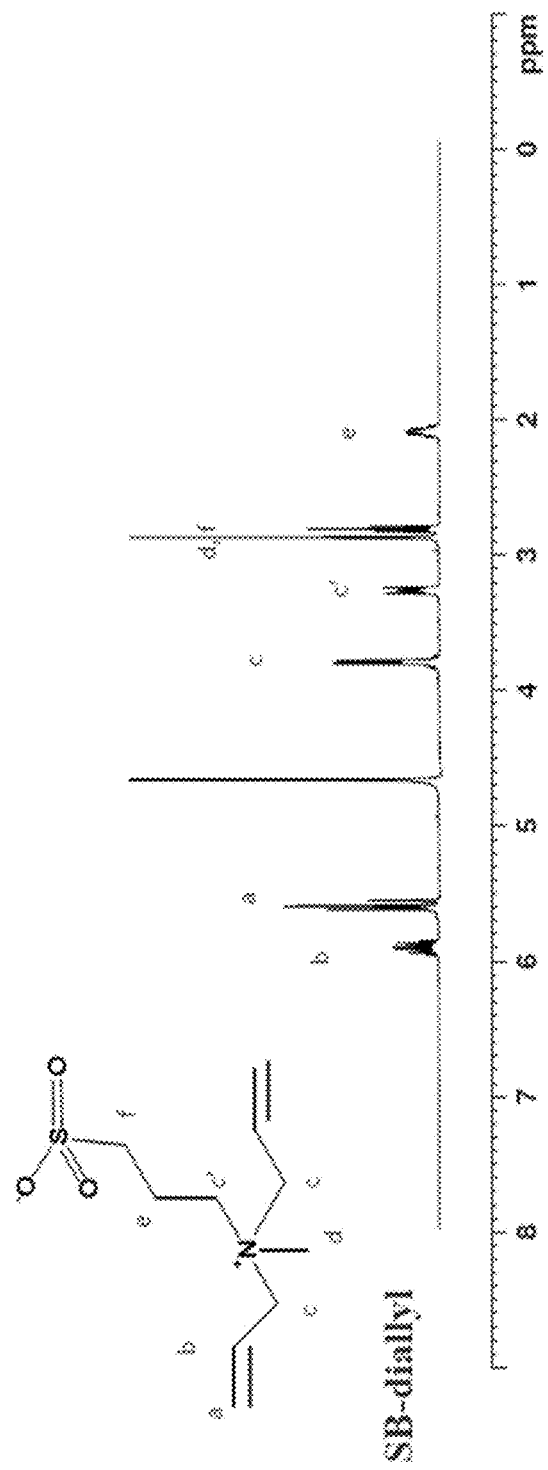
FIG. 24 is the $^1$H-NMR spectrum for the diallyl-functional sulfobetaine monomer (SB-diallyl).

A sulfobetaine bearing polydimethylsiloxane (PDMS-SB) for biomedical microfluidic devices was developed. From the SEM images of the whole ovine blood test (FIG. 24), it is clear that the surface of Sylgard® 184 microfluidic device control, without sulfobetaine was covered by activated platelets.

Figure 25:
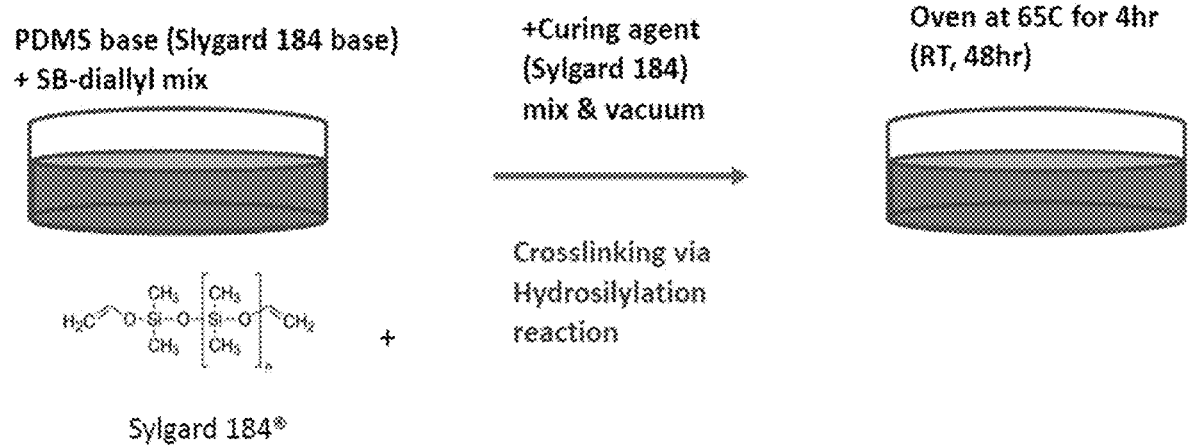
FIG. 25 is the synthesis schematic of a commercial PDMS membrane material Sylgard® 184 functionalized with a SB-diallyl.
Figure 26:
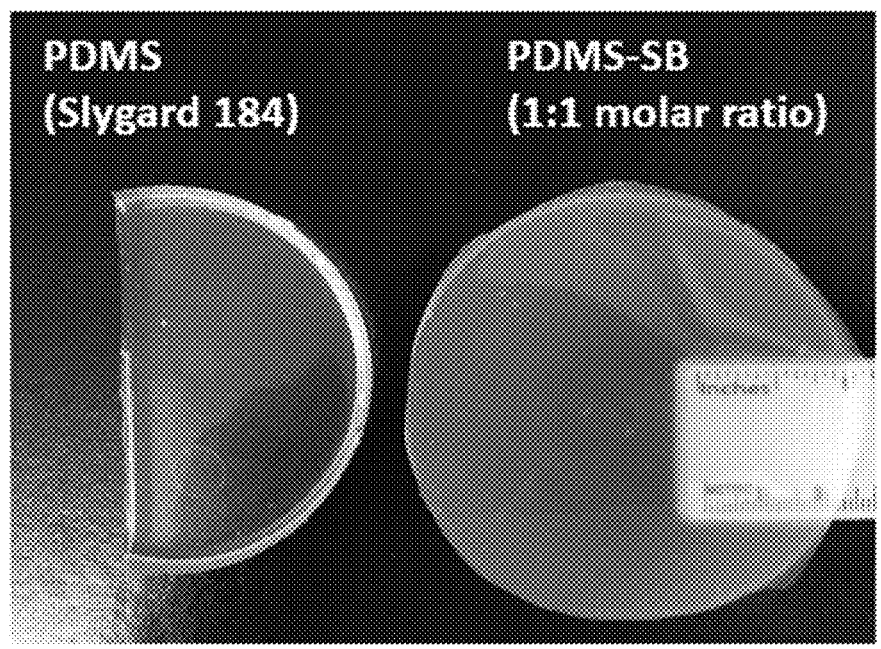
FIG. 26 is a photograph comparing an unmodified Sylgard® 184 membrane to a Sylgard® 184 membrane functionalized with SB-diallyl.

Synthesis of a diallyl-functional sulfobetaine monomer. Diallylmethylamine was reacted with 1,3-propanesultone in DCM at 50° C. overnight (FIG. 25). The resulting diallyl-functional sulfobetaine monomer (SB-diallyl) was analyzed using 1H-NMR (FIG. 26).

Figure 27:
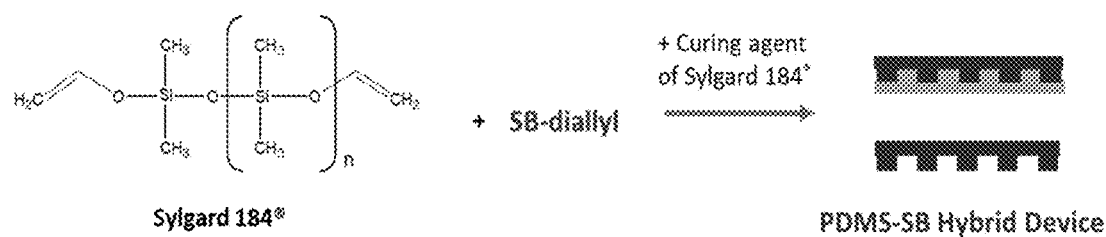
FIG. 27 depicts schematically a described microfabrication process using a diallyl siloxane and a diallyl sulfobetaine.

Synthesis of a PDMS-SB membrane: Sylgard® 184 and the SB-diallyl monomer were mixed. The mixing ratios of Sylgard® 184 to SB-diallyl were 1:1, 3:7, and 1:9, respectively. The Sylgard® 184 curing agent and the Sylgard® 184/SB-diallyl mixture were mixed at a 1:9 ratio and poured into a Teflon dish (diameter: 6 cm) (FIG. 27). The mixture was condensed under vacuum and cured in the oven at 65° C. for 4 hours or at room temperature for 48 hours to obtain a membrane film.

Figure 28:
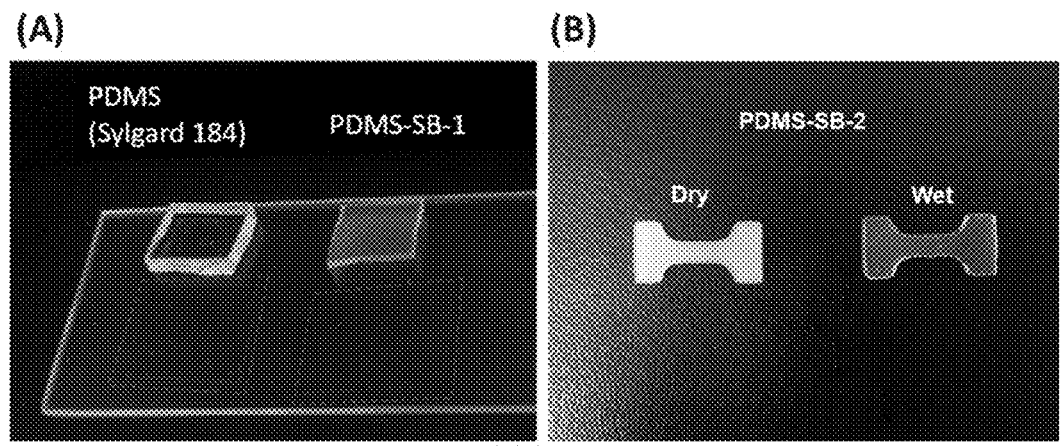
FIG. 28 provides images (A) Thick sections (upper), and thin membranes (lower) of PDMS and PDMS-SB transferred to a glass slide. Thick PDMS-SB has a slightly cloudy appearance. (B) shows irreversible optical transparency changes of PDMS-SB hybrid membranes between the dry and wet states.

Photographs of the resulting PDMS-SB membrane, as compared to the Sylgard® 184 control, can be found in FIG. 28.

Example 8

SB-diallyl was synthesized from diallylmethylamine and 1,3-propanesultone (See, FIG. 25). Briefly, the two monomers were dissolved together in dichloromethane under argon injection for 20 min with the flask sealed and the mixture stirred for 48 h at 40° C. The solvent was then removed using a centrifuge and the obtained white precipitate was further washed with ether and dichloromethane and dried under vacuum. The chemical structure of SB-diallyl was confirmed by proton nuclear magnetic resonance ($^1$H NMR, BrukerBiospin Co., Billerica, MA).

The synthesized SB-diallyl was dissolved in HFIP (50 wt %) and directly mixed with a commercial PDMS base (Sylgard 184®, vinyl-terminated PDMS, Dow, Midland, MI) as well as the curing agent at a 10:1 ratio. The mixed solution was placed under vacuum for 30 min and then moved to an oven at 60° C. for 4 hr. The mixing ratio of SB-diallyl: PDMS base were determined based on the approximate molar ratio (0.5:1, 1:1 or 1:2). The actual mixing ratio of SB-diallyl were 0.5, 1.0, or 2 wt % vs. Sylgard® base and those are denoted as PDMS-SB-1, PDMS-SB-2, and PDMS-SB-3, respectively.

Uniaxial tensile strength and strain of sample films were measured using an MTS Tytron 250 Microforce Testing Workstation after cutting the films into dumbbell-shaped strips (2×18 mm) and immersing in DI water for 15 hr.

In vitro thrombotic deposition on the PDMS-SB and PDMS control (Sylgard 184®) was assessed by a simple rocking test with citrated fresh ovine blood. Whole ovine blood was collected by jugular venipuncture. Each test tube (BD Vacutainer®, no additive) with a sample was filled with 5 mL of ovine blood and gently rocked for 2 hr at 37° C. on a hematology mixer (Fisher Scientific, Pittsburgh, PA). After ovine blood contact, the polymer membrane surfaces were rinsed with Dulbecco's Phosphate-Buffered Saline (DPBS) to remove any nonadherent blood elements. The surface was then observed by scanning electron microscopy (SEM; JSM-6330F, JEOL USA, Inc., Peabody, MA) after fixing the surface adherent platelets and then serially dehydrating with solutions of increasing ethanol content. Deposited platelets on each surface were also quantified by a lactate dehydrogenase (LDH) assay with an LDH Cytotoxicity Detection Kit (Clontech Laboratories, Inc. Mountain View, CA).

Hemocompatibility of the PDMS-SB hybrid was evaluated using fresh ovine blood collected in a sodium citrate tube following the Standard Practice for Assessment of Hemolytic Properties of Materials from the American Society for Testing and Materials (ASTM F756-17). Briefly, the hemoglobin concentration of the whole blood was adjusted to 8 g/dL with DPBS (Ca and Mg free). PDMS-SB samples were washed with 70% EtOH and DPBS in sequence. The washed samples were separately immersed in 5 mL of the whole blood in the test tubes and the tubes were rocked at 37° C. for 3 hr. The blood after contact with the sample was centrifuged at 750 g for 15 min to collect 1 mL of supernatant. The supernatant was reacted with 1 mL Drabkin's reagent at 37° C. for 15 min and its absorbance at 540 nm was recorded. The % hemolysis was calculated from the equation (A×100)/B, where A=supernatant hemoglobin concentration and B=total hemoglobin concentration in tube. According to ASTM F756-17, the sample was considered as nonhemolytic if the % hemolysis above the negative control was lower than 2%, slightly hemolytic if between 2% and 5%, and hemolytic if higher than 5%. Non-sample contacted ovine blood was used as a negative control.

The cytotoxicity of PDMS-SB samples was investigated by an indirect test (an elution medium test according to the ISO10993-5 standard) and Live/Dead assay. Briefly, primary rat smooth muscle cells (rSMCs) were cultured in a cell medium consisting of Dulbecco's modified Eagle medium with 10% heat-inactivated fetal bovine serum and 1% penicillin/streptomycin at 37° C. and 5% $CO_2$ in an incubator. The cells were seeded at $2.5 \times 10^6$ per 1 mL per well in 6-well plates and then kept in an incubator overnight to allow cell attachment to the surface. The cell medium was removed, and 7 mL of fresh cell medium was added. 7 mg of PDMS-SB sample was placed into a sterilized transwell insert having a 40 μm nylon mesh to contact with the cell medium indirectly. The PDMS-SB samples were washed with DPBS and 70% EtOH, and then sterilized by UV for 10 min before use. The 6-well plate was kept at 37° C. and 5% $CO_2$. At 24 and 72 hr time points the transwell insert and cell medium were removed and then 100 μL MTS solution (CellTiter 96® AQueous One Solution Cell Proliferation Assay, Promega Corp., WI) in 1 mL cell medium was added to each well. The 6-well plate was kept in the incubator for 1 hr, and then the absorbance was recorded at 490 nm using a microplate reader (SpectraMax, Molecular Devices, San Jose, CA). Blank cell medium without PDMS-SB was used as negative control and 1 M acrylamide in cell medium was used as positive control. At the time point of 72 hr, images with the Live/Dead assay were taken by fluorescence microscopy (TE2000-E, Nikon, Tokyo, Japan) after live/dead staining with a Promokine Live/Dead Cell Staining Kit.

If the developed PDMS-SB hybrid is to be a replacement for commercial PDMS in typical Micro-Electro-Mechanical Systems and microfluidic device fabrications, it is important to characterize its performance in those processes compared to the standard preparation of commercial PDMS (Sylgard 184®) with a 10:1 ratio of elastomer base to curing agent.

A spin curve was established for both the PDMS-SB-1 and PDMS-SB-2 as well as the PDMS control (PDMS-C, Sylgard 184®) so that the thickness of the material can be reliably selected for membrane applications. The material was dispensed onto Si wafer chips in a spin coater (Laurell Technologies, North Wales, PA) and spun at 500 rpm for 10 s to spread, then at the final spin speed for 30 s to reach the final thickness. The selected final spin speeds were on the range of 1000-3000 rpm. After curing, the membrane thickness was measured with a surface profiler (KLA-Tencor, Milpitas, CA) at multiple locations across the area to account for any nonuniformity. In addition, the bonding performance is of interest. It is well established that commercial PDMS can be bonded to itself or to glass by $O_2$ plasma treatment. This process is necessary in the soft lithography process to fabricate microchannel devices and prevent any leaks between the layers. To test this, a 600 μm thick mold was fabricated from SU-8 negative photoresist (MicroChem, Newton, MA) on an Si wafer which featured a 3 mm diameter "blister" and an input port. The PDMS was cast over this mold, then cut away and bonded to pieces of unpatterned PDMS or a cleaned glass slide by $O_2$ plasma treatment (Deiner Electronic, Ebhausen, Germany) at 0.25 mbar for 25 s. 33-gauge stainless steel tubing was inserted into the input port, sealed with epoxy, and connected to a regulated gas supply and the blister pressurized. The pressure from the regulator was increased gradually until the bond failed and the corresponding pressure was recorded as a measure of the bond strength.

SU-8 negative photoresist was deposited onto an Si wafer with a thickness of 200 μm and patterned into the shape of the microchannel. The design features a branching path where the smallest channel width is 200 μm. PDMSC control and PDMS-SB were cast over the resulting mold, then peeled away and bonded to cleaned glass slides via $O_2$ plasma to form the complete microchannel with a 200 μm×200 μm square cross section at the smallest point. The inlet and outlet were opened with a biopsy punch and PTFE tubing was inserted into the opening. Water and blood were flowed through the microchannels via syringe pump.

Gas Transfer Performance. The gas transfer performance of the material was also assessed. A proof-of-concept microchannel device was fabricated with a 20 μm membrane of either PDMS-C or PDMS-SB spread over a PMMA acrylic substrate with breathing holes to interface with open air. A 400 μm thick layer of commercial PDMS was cut in the shape of the channel to form a wall, then an acrylic top plate with input and output ports was placed over top. $CO_2$ saturated water was supplied through the input port by a syringe pump (Harvard Apparatus, Holliston, MA) at 0.1 mL/min and flowed through the microchannel. The water was collected from the output port. The pH was measured with a pH meter (Horiba, Kyoto, Japan) before and after as a measure of how much $CO_2$ was transferred out of the water through the membrane during the flow.

Blood Flow Testing with PDMS-SB Microfluldic Channels. The blood compatibility of the microchannels was compared in a continuous blood flow test setting. Minimally anticoagulated fresh ovine blood (0.5 to 0.625 U heparin/mL blood) was continuously flowed (0.02 mL/min) through each the PDMS and PDMS-SB microchannels for approximately 1 hr using a syringe pump. The outlet tubing of the devices was left open and positioned above a collection reservoir in order to allow blood to freely flow out of the device at an atmospheric outlet pressure. The devices were immersed in PBS warmed to 37° C. throughout testing. The perfusion pressure at each device inlet was monitored via a digital manometer (Dwyer Instruments Inc., Michigan City, IN) and recorded every 30 s. Device samples were collected following the experiment for subsequent scanning electron microscopy. Data are presented as mean±standard deviation (SD). Data were analyzed by one-way ANOVA followed by a post hoc Neuman-Keuls test. Significant differences were considered to exist at p<0.05.

SB-diallyl was synthesized from diallylmethylamine and 1,3-propanesultone with over 90% average yields. The chemical structure of SB-diallyl was characterized by $^1H$ NMR and confirms successful synthesis and purification. The SB-diallyl shows the peaks at 5.80-6.0 ppm and 5.50-5.65 ppm from the protons of carbon double bonds $(CH_2=CH)_2$ as well as the typical peaks from SB groups, 2.0-2.15 (2H, $CH_2CH_2SO_3$), 2.75-2.85 (2H, $CH_2SO_3$), 2.85-2.95 (3H, CHAN), 3.20-3.3 (2H, $CH_2N$), and 3.65-3.90 (4H, $(CH_2)_2N$) at the ppms.

PDMS-SB hybrid samples were fabricated by mixing the synthesized SB-diallyl and a commercial PDMS (Sylgard 184®, vinyl-terminated PDMS) to produce PDMS-SB hybrid membranes or microfluidic devices (FIG. 27). Although a thick PDMS-SB sample was observed to have a slightly cloudy appearance, a thin PDMS-SB membrane prepared by spin coating exhibited good optical transparency similar to the PDMS control. The PDMS-SB-2 hybrid samples with an increased the SB-diallyl blending ratio had increased opacity. However, under wet conditions the material became transparent in an irreversible manner. The PDMSSB-2 hybrid membranes showed good optical transparency after immersion in DI water (wet) (FIG. 28).

FIG. 27 depicts schematically the described reaction of a diallyl siloxane and a siallyl sulfobetaine.

Mechanical properties of the fabricated samples characterized by uniaxial testing are shown in Table 3. The initial modulus and ultimate tensile strength of PDMS-SB hybrids (PDMS-SB-1, PDMS-SB-2 and PDMS-SB-3) did not show significant differences compared to PDMS-C, while the breaking strains of PDMS-SB-2 and PDMS-SB-3 were decreased compared to both the PDMS-C and PDMS-SB-1 ($p<0.05$, $n=5$). However, the mechanical properties of PDMS-SB hybrid could be varied and simply adjusted by controlling the mixing ratio of SB-diallyl, the amount of the curing agent as well as the curing temperature, similar to conventional PDMS processing.

TABLE 3

SB-diallyl mixing ratio and the mechanical properties of PDMS-SB hybrid membranes.

| | SB-diallyl mixing ratio (wt %) | Initial Modulus (MPa) | Tensile Strength (MPa) | Breaking Strain (%) |
|---|---|---|---|---|
| PDMS-C | 0 | 1.2 (±0.4) | 4.5 (±1.3) | 167 (±27) |
| PDMS-SB-1 | 0.5 | 1.4 (±0.2) | 4.1 (±0.4) | 149 (±19) |
| PDMS-SB-2 | 1.0 | 1.7 (±0.1) | 4.7 (±1.1) | 123 (±12)* |
| PDMS-SB-3 | 2.01.6 | 1.6 (±0.2) | 3.6 (±0.4) | 112 (±13)* |

*p <0.05 vs PDMS-C and PDMA-SB-1, n = 5

Figure 29:
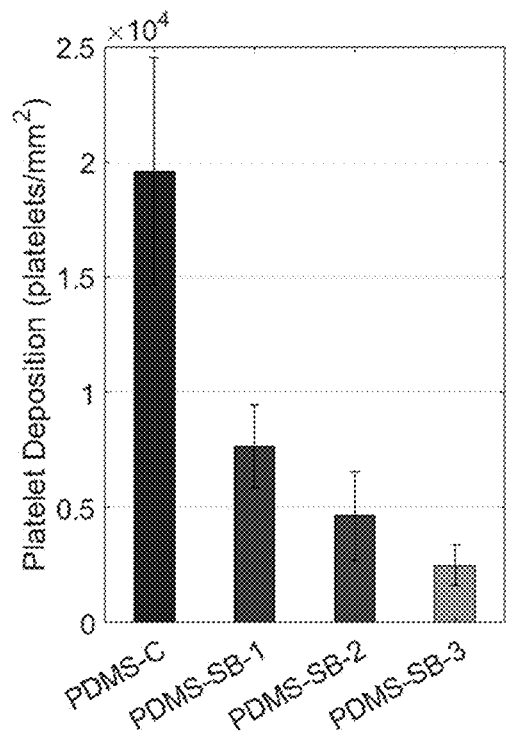
FIG. 29. provides a graph showing the amount of platelet deposition quantified using a lactate dehydrogenase (LDH) assay after contact with citrated ovine whole blood for 2 h at 37° C. (*$p<0.05$ vs. PDMS-C, **$p<0.05$ vs PDMS and PDMS-SB-1, n=5).

Blood-biocompatibility of PDMS-SB Hybrid. Platelet deposition onto PDMS samples after fresh ovine blood contact for 2 hr was imaged using electron micrograph. The commercial PDMS control (PDMS-C, Sylgard 184®) surfaces showed relatively high levels of platelet deposition in organized thrombi with activated platelet aggregates as evidenced by pseudopodia extension and spreading. Platelet deposition and aggregate formation were remarkably reduced and the deposited platelets were mostly in a resting morphology on PDMS-SB hybrid sample surfaces. The LDH results (FIG. 29) confirmed visual observations that the amount of platelet deposition on all PDMS-SB samples was markedly decreased compared with the PDMS control ($p<0.01$, $n=5$) and the amount of deposition was further decreased at higher SB content ($p<0.05$, PDMS-SB-3 vs. PDMS-SB-1).

The hemolytic index (% hemolysis) of the PDMS-SB hybrids demonstrated a nonhemolytic effect (since less than 2% compared to the negative control) and showed no significant difference compared to the PDMS control ($p<0.01$, $n=5$). In addition, the cytotoxicity caused by contact with elution medium of PDMS control and PDMS-SB hybrid samples showed no significant effect on rSMCs, with cell viability and growth in the elution media not affected versus the negative control, polymer contact-free cell medium.

Figure 30:
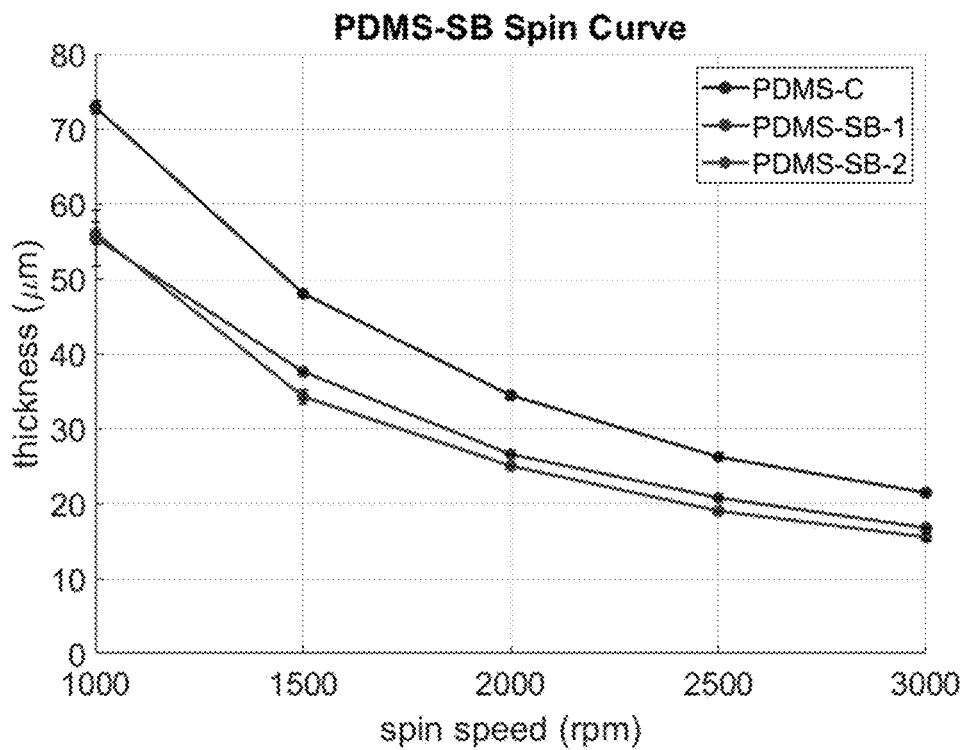
FIG. 30 is a graph showing a spin curve generated for both the PMDS-SB-1 and PDMS-SB-2.

Characterization of Microfabrication Performance and Processes. The spin curve generated for both the PMDS-SB-1 and PDMS-SB-2 is presented in FIG. 30. From the data, it is seen that PDMS-SB-2 and PDMS-SB-1 are thinner than PDMS-C ($p<0.05$). This is seen as neither an advantage nor a disadvantage, however, since a desired thickness can be chosen as long as the spin curve is known.

The results of the bond strength testing are shown in Table 4. Each value represents the average of three trials. It is clear from these results and by visual inspection and that bonding was achieved, so the $O_2$ plasma treatment remains an option for bonding with both concentrations of PDMS-SB compared to PDMS-C. In most cases, except for the bonding of PDMS-C to itself, the mechanism of failure was by material break, rather than delamination of the bonded layers, indicating that the true bond strength may be stronger than the material itself, and is not the limiting factor for bonding performance. Though this difference in failure mechanism is expected to have played a role in the somewhat high variability in the results of the test, the results clearly show comparable performance in bond strength between both concentrations of the PDMS-SB and PDMS-C, indicating that the PDMS-SB should readily be able to replace the commercial PDMS in device fabrications involving bonding.

TABLE 4

Bond strength of PDMS-SB hybrid membranes

| | Top Material | | |
|---|---|---|---|
| Bottom material | PDMS-C | PDMS-SB-1 | PDMS-SB-2 |
| Glass | 68 (±7.0) | 61 (±5.5) | 67 (±7.0) |
| Itself | 50 (±10) | 51 (±5.5) | 55 (±0.6) |

Figure 31:
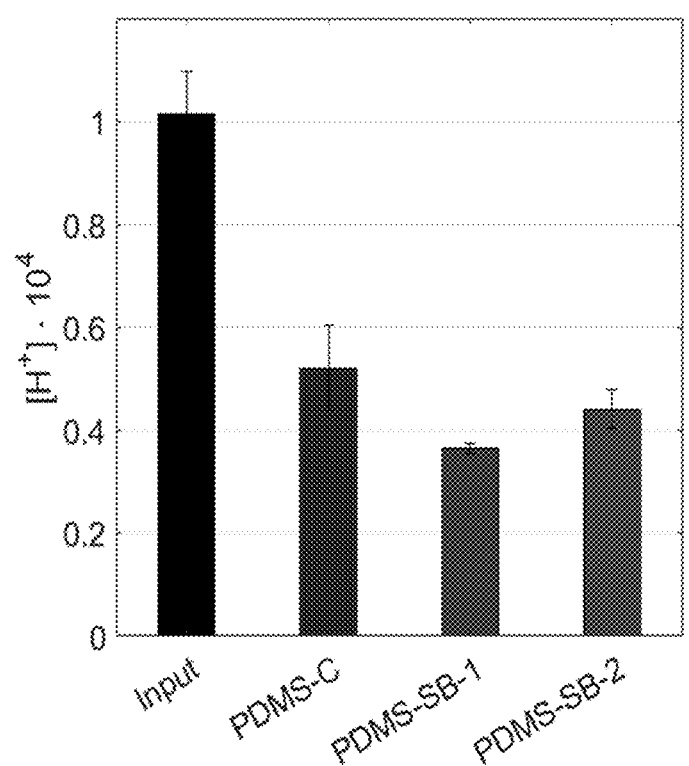
FIG. 31 is a graph showing the gas permeability of PDMS-SB hybrid membrane vs a control (Sylgard® 184).

Gas Transfer Performance. The concentration of $H^+$ calculated from the measured pH as an indicator of the transfer of $CO_2$ out of a microchannel flow through the PDMS membrane in a proof-of-concept gas transfer experiment was determined. $CO_2$-saturated water was supplied at an inlet and the difference of pH at the inlet and an outlet were indicative of how much $CO_2$ was transferred out of the water through the membrane during the flow. Each value represents the average of three trials. Both PDMS-SB hybrid membranes showed gas transfer out of the channel through the membrane of comparable magnitude to the PDMS-C membrane (FIG. 31).

Blood Flow Test with PDMS-SB Microfluldic Channels. Fabrication of a simplified microfluidic channel was also successful. The PDMS-SB could be cast over an SU-8 microchannel mold and retained its shape when removed, without damaging the material or the mold, exhibiting compatibility with the soft lithography processes for microscale devices. After the pieces were bonded with $O_2$ plasma, both water and blood were able to flow through the channel via delivery from a syringe with good optical transparency in the wet state (FIG. 32 (A)).

Figure 32:
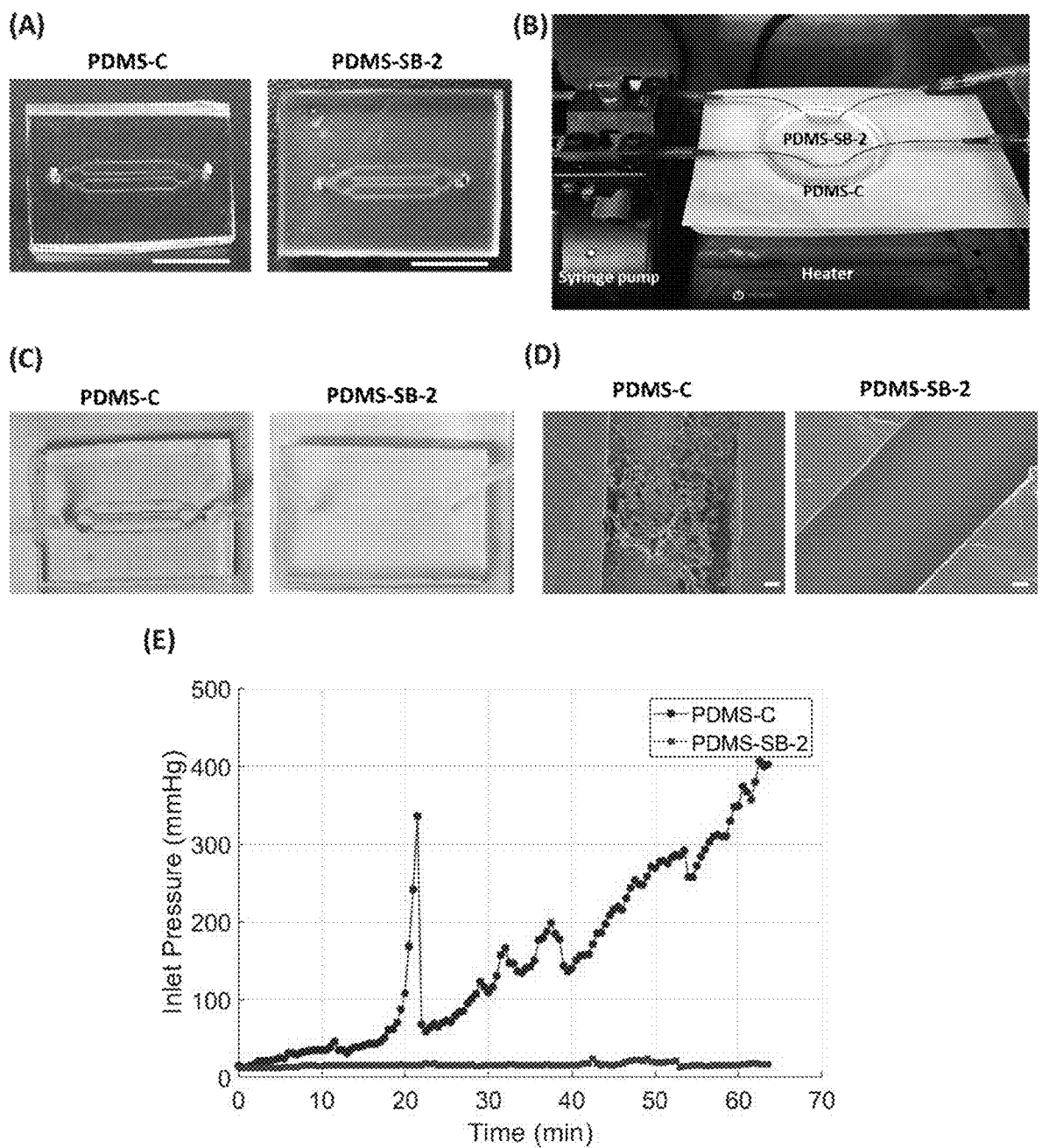
FIG. 32. (A) shows a microchannel device fabricated by PDMS and PDMS-SB hybrid polymers (scale bars—1 cm). (B) shows a continuous blood test setting with fresh ovine blood. (C) shows macroscopic images of the microchannels after blood contact for 1 hr (flow rate=0.02 mL min$^{-1}$. (D) provides scanning electron micrographs of PDMS control and PDMS-SB hybrid microchannels after blood contact (scale bars=20 µm. (E) is a graph showing pressure changes of the PDMS and PDMS-SB microchannel devices during a continuous blood contact test setting with fresh ovine blood (heparin 0.625 U mL$^{-1}$, flow rate=0.02 mL min$^{-1}$.

The blood compatibility of the microfluidic channel was assessed (FIG. 32 (B)), and the ability to resist thrombus formation was clearly different between the microfluidic channels of PDMS and the PDMS-SB-2 hybrid. The PDMS-C microfluidic channel became progressively more occluded over 1 hr by thrombi, which were clearly observed macroscopically as well as microscopically (FIG. 32 (C) & (D)). Conversely, the microfluidic channel made from the PDMS-SB hybrid remained patent during the test and thrombotic deposition in the microchannel was visually confirmed to be markedly lower compared to the PDMS-C after continuous blood contact. The inlet pressure change (FIG. 32 (E)) of the blood flow pathway also supported these results. The inlet pressures of PDMS-C microfluidic channel increased with some peaks and valleys that were attributed to clogging and opening with thrombotic deposition in the microchannel. In contrast, the pressure for the PDMS-SB-2 microchannel was stable during the continuous ovine blood perfusion for 1 hr.

In sum, we synthesized a vinyl-terminated sulfobetaine (SB-diallyl) to integrate into a commercial PDMS (Sylgard® 184) curing process. By direct and equivalent mixing of the SB-diallyl and Sylgard® 184 base (vinyl-terminated PDMS) with the curing agent, this approach was considered a way to fabricate an anti-fouling PDMS-SB hybrid membrane or microfluidic device using conventional microfabrication process without additional steps for PDMS surface modification. Although the mechanical properties of PDMS-SB membranes were slightly altered with the amount of SB-diallyl introduced compared to the PDMS control, the mechanical properties could be controlled, with the initial modulus and breaking strain being tunable with the curing condition (data not shown). The PDMS-SB hybrid showed a decrease of optical transparency with the increased SB-diallyl additive and the thicker samples were opaque. However, the optical transparency was improved with exposure to wet conditions and microfluidic channel visibility was not an issue. This interesting characteristic could be explained with the rearrangement of the PDMS-SB molecular chains under dry and wet conditions since the hydrophilic SB groups would move to the surface under an aqueous solution. The fabricated PDMS-SB hybrid membranes showed a significant reduction of platelet deposition after fresh whole blood contact and were not hemolytic or cytotoxic to a primary vascular cell (rSMC). Importantly, the thickness of PDMS-SB membranes could be predictably adjusted with spin coating and showed a sufficient bonding strength between glass as well as the PDMS-SB itself. These characteristics allow the fabrication of a precise, thin membrane as well as designed micro/nano microfluidic devices using conventional microfabrication processes as would be the case with commercial PDMS. Because the synthesized SB-diallyl is a powder, HFIP was used as the solvent to mix it uniformly with the Sylgard® 184 base and curing agent. Although other solvents (e.g., MeOH, water, 2-propanol) also could be used, the best results for PDMS-SB hybrid membrane formation were obtained when the HFIP solvent was used for SD-diallyl, since SB-diallyl could be dissolved in HFIP up to 50 wt % and mixed well with Sylgard® 184 and the curing agent. Also, the HFIP solvent could be quickly evaporated during the mixing and air pocket elimination step under vacuum before moving to the curing process (at 60° C. for 4 hr or at 90° C. for 1 hr) because it is highly volatile. However, further refinement of the method may require improving miscibility or minimizing phase separation defects.

There is a limitation on the current hybridization method to maximize the SB content in PDMS-SB to enhance blood compatibility. The current study focuses on a simple blending method using a SB-diallyl functional molecule to modify a commercial PDMS and to adapt the conventional microfabrication process, however, other surface-focused modification routes are also possible to increase the SB moiety on the blood contacting surface. For instance, a pre-PDMS hybrid could also be fabricated by blending with diallylmethylamine instead of the SB-diallyl and then the SB groups could be generated after device fabrication by fluxing with 1,3-propanesultone to generate surface SB groups. Other simple surface-focused modifications would be possible by using a Si-H functionalized PDMS and then an allyl functional SB monomer could be grafted to the surface via the hydrosilylation reaction using a Karstedt catalyst. These noted post-modification methods might have an advantage to improve antifouling properties by increasing the SB moieties on the surface, however, this comes at the expense of additional processing steps after the device fabrication. The current approach has a clear advantage for scaled up production for antifouling PDMS devices and the benefit of a more complicated approach is not apparent at this point.

In this study we demonstrated a simple method to produce PDMS-SB hybrid membranes as well as microfluidic devices using a common micro-fabrication process. The development of blood compatible devices or surface coatings to reduce thrombotic deposition on commercially available extra- and intra-corporeal blood contacting devices are extremely important for patients who face a higher risk of developing thromboembolic events (e.g., COVID-19 patients). Using devices with surfaces comprised of more blood biocompatible (non-thrombogenic) materials could reduce the level of anticoagulation therapy required and reduce complications associated with thrombosis risk, as well as anticoagulation-related bleeding risk. Other potential applications using PDMS-zwitterionic hybrid polymers may include blood contacting PDMS microfluidic devices, antifouling flexible and implantable biosensors, bioinspired vascular grafts, or antifouling marine coatings.

The present invention has been described with reference to certain exemplary embodiments, dispersible compositions and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiments.

The invention claimed is:

1. A crosslinked copolymer composition, comprising:
a poly(dialkylsiloxane) residue;
an N-dialkyl monomer residue comprising a zwitterion moiety comprising a quaternary amine and an anionic moiety pendant from the quaternary amine.

2. The copolymer composition of claim 1, wherein the zwitterionic N-dialkyl monomer residue has the structure:

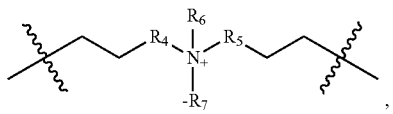

where:
$R_4$ and $R_5$ are, independently,

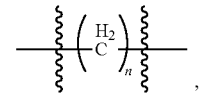

where n is at least one,
$R_6$ is linear alkyl, and
$R_7$ is an anionic moiety forming a betaine with the quaternary amine.

3. The copolymer composition of claim 1, wherein the poly(dialkylsiloxane) residue is a poly(dimethylsiloxane) residue.

4. The copolymer composition of claim 1, wherein the zwitterionic moiety is a sulfobetaine or carboxybetaine moiety.

* * * * *